(12) United States Patent
Steenblik et al.

(10) Patent No.: US 7,468,842 B2
(45) Date of Patent: Dec. 23, 2008

(54) IMAGE PRESENTATION AND MICRO-OPTIC SECURITY SYSTEM

(75) Inventors: Richard A. Steenblik, Alpharetta, GA (US); Mark J. Hurt, Duluth, GA (US); Gregory R. Jordan, Cumming, GA (US)

(73) Assignee: Nanoventions Holdings, LLC, Alpharetta, GA (US)

(*) Notice: Subject to any disclaimer, the term of this patent is extended or adjusted under 35 U.S.C. 154(b) by 2 days.

(21) Appl. No.: 11/438,081

(22) Filed: May 18, 2006

(65) Prior Publication Data

US 2007/0058260 A1   Mar. 15, 2007

Related U.S. Application Data

(63) Continuation-in-part of application No. 10/995,859, filed on Nov. 22, 2004, now Pat. No. 7,333,268.

(60) Provisional application No. 60/682,231, filed on May 18, 2005, provisional application No. 60/683,037, filed on May 20, 2005.

(51) Int. Cl.
*G02B 27/10* (2006.01)
*B42D 15/00* (2006.01)

(52) U.S. Cl. .................... 359/619; 359/626; 283/72

(58) Field of Classification Search ......... 359/619–626; 283/72; 162/40; 977/730
See application file for complete search history.

(56) References Cited

U.S. PATENT DOCUMENTS 992,151 A   5/1911   Berthon

| 1,824,353 A | 9/1931 | Jensen |
| 1,849,036 A | 3/1932 | Ernst |

(Continued)

FOREIGN PATENT DOCUMENTS

GB   2362493   11/2001

(Continued)

OTHER PUBLICATIONS

Hutley, M.C., et al., The Moire Magnifier, Pure Appl. Opt. 3, 1994, 133-142, IOP Publishing Ltd., U.K.

(Continued)

*Primary Examiner*—Alicia M Harrington
(74) *Attorney, Agent, or Firm*—Thomas, Kayden, Horstemeyer & Risley LLP; Todd Deveau

(57) ABSTRACT

Am image presentation system employing microstructured icon elements to form an image. In one form a synthetic optical image system is provided that includes an array of focusing elements, and an image system that includes or is formed from an array or pattern of microstructured icon elements, such as those described below, wherein the microstructured icon elements are designed to collectively form an image or certain desired information, and wherein the array of focusing elements and the image system cooperate, for example through optical coupling, to form a synthetic optical image which image may optionally be magnified. In another form an image presentation system is provided that includes or is formed from an array or pattern of microstructured icon elements, such as those described below, wherein the microstructured icon elements are designed to collectively form an image or certain selected information, and wherein the image system is designed to stand alone and be the image viewed or the information read by use of a magnifying device, such as a magnifying glass or microscope, that is provided separately from the image system.

90 Claims, 44 Drawing Sheets

U.S. PATENT DOCUMENTS

| | | | |
|---|---|---|---|
| 1,942,841 A | 1/1934 | Shimizu |
| 2,268,351 A | 12/1941 | Tanaka |
| 2,355,902 A | 8/1944 | Berg |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz |
| 3,264,164 A | 8/1966 | Jerothe |
| 3,312,006 A | 4/1967 | Rowland |
| 3,357,772 A | 12/1967 | Rowland |
| 3,463,581 A | 8/1969 | Clay |
| 3,643,361 A | 2/1972 | Eaves |
| 3,811,213 A | 5/1974 | Eaves |
| 4,185,191 A | 1/1980 | Stauffer |
| 4,498,736 A | 2/1985 | Griffin |
| 4,756,972 A | 7/1988 | Kloosterboer et al. |
| 4,765,656 A | 8/1988 | Becker et al. |
| 4,892,336 A * | 1/1990 | Kaule et al. | 283/91 |
| 4,892,385 A | 1/1990 | Webster, Jr. et al. |
| 4,920,039 A | 4/1990 | Fotland et al. |
| 5,232,764 A | 8/1993 | Oshima |
| 5,254,390 A | 10/1993 | Lu |
| 5,623,368 A | 4/1997 | Calderini et al. |
| 5,695,346 A | 12/1997 | Sekiguchi et al. |
| 5,712,731 A | 1/1998 | Drinkwater et al. |
| 5,723,200 A | 3/1998 | Oshima |
| 5,812,313 A | 9/1998 | Johansen |
| 5,886,798 A | 3/1999 | Staub et al. |
| 5,995,638 A | 11/1999 | Amidror |
| 6,060,143 A | 5/2000 | Tompkin |
| 6,195,150 B1 | 2/2001 | Silverbrook |
| 6,256,149 B1 | 7/2001 | Rolfe |
| 6,288,842 B1 | 9/2001 | Florczak et al. |
| 6,301,363 B1 | 10/2001 | Mowry, Jr. |
| 6,329,040 B1 | 12/2001 | Oshima et al. |
| 6,381,071 B1 | 4/2002 | Dona |
| 6,424,467 B1 | 7/2002 | Coggins |
| 6,467,810 B2 * | 10/2002 | Taylor et al. | 283/72 |
| 6,712,399 B1 | 3/2004 | Drinkwater et al. |
| 6,726,858 B2 | 4/2004 | Andrews |
| 6,761,377 B2 | 7/2004 | Taylor et al. |
| 6,819,775 B2 | 11/2004 | Amidror |
| 6,856,462 B1 | 2/2005 | Scarbrough et al. |
| 6,870,681 B1 | 3/2005 | Magee |
| 6,900,944 B2 | 5/2005 | Tomczyk |
| 6,935,756 B2 | 8/2005 | Sewall et al. |
| 2002/0012447 A1 | 1/2002 | Amidror et al. |
| 2002/0018299 A1 | 2/2002 | Daniell |
| 2003/0151815 A1 * | 8/2003 | Hannington et al. | 359/536 |
| 2004/0001604 A1 | 1/2004 | Amidror |
| 2004/0076310 A1 | 4/2004 | Hersch |
| 2006/0018021 A1 * | 1/2006 | Tomkins et al. | 359/573 |
| 2006/0227427 A1 | 10/2006 | Dolgoff |

FOREIGN PATENT DOCUMENTS

| | | |
|---|---|---|
| JP | 11189000 | 7/1999 |
| JP | 2003039583 | 2/2002 |
| WO | WO9926793 | 6/1999 |
| WO | WO0139138 | 5/2001 |
| WO | WO2004036507 | 4/2004 |

OTHER PUBLICATIONS

Lippmann, g., C R Acad Sci Paris (1908) 146, 446-451.
Hutley, et al., Microlens Arrays, Physics World, Jul. 1991, pp. 27-32.
Hutley, M.C., Integral Photography, Superlenses and the Moire Magnifier, European Optical Society, vol. 2, (1993), pp. 72-75.
Liu, et al., Artistic Effect and Application of Moire Patterns in Security Holograms, Applied Optics, vol. 34, No. 22, (1995) pp. 4700-4702.
Zhang, X., et al., Concealed Holographic Coding for Security Applications by Using a Moire Technique, Applied Optics, vol. 36, No. 31 (1997), pp. 8096-8097.
Kamal, et al., Properties of Moire Magnifiers, Opt. Eng., vol. 37, No. 11, (1998) pp. 3007-3014.

* cited by examiner

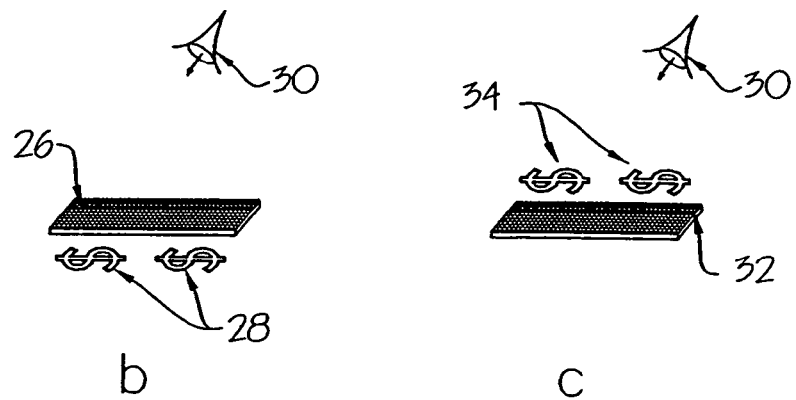
Figs 2b,c
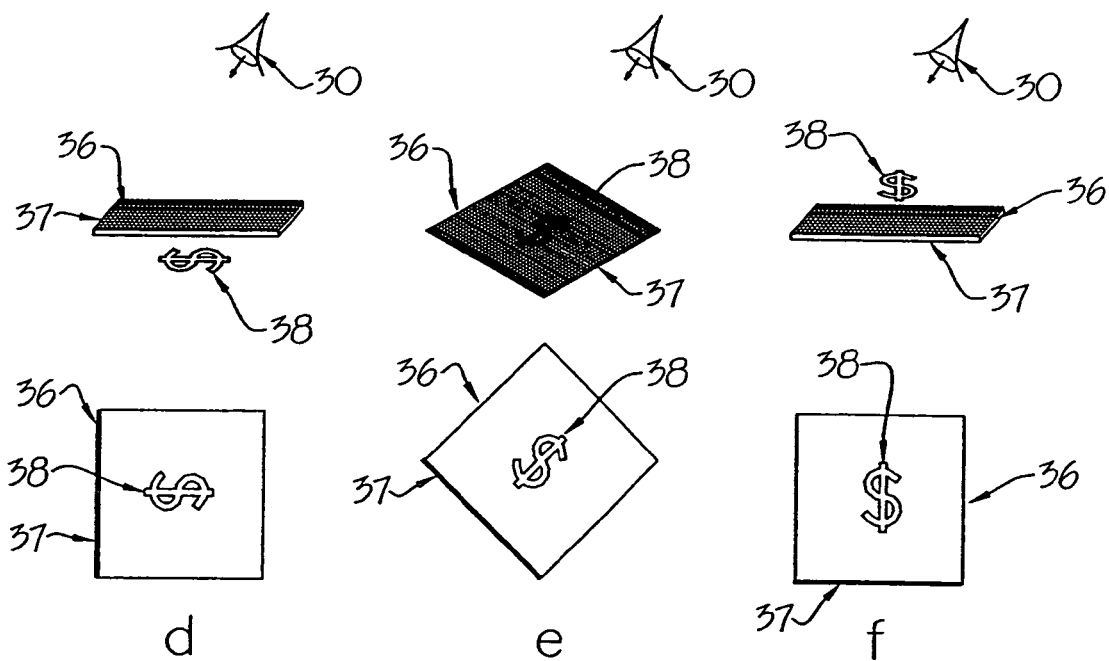
Figs 2d,e,f

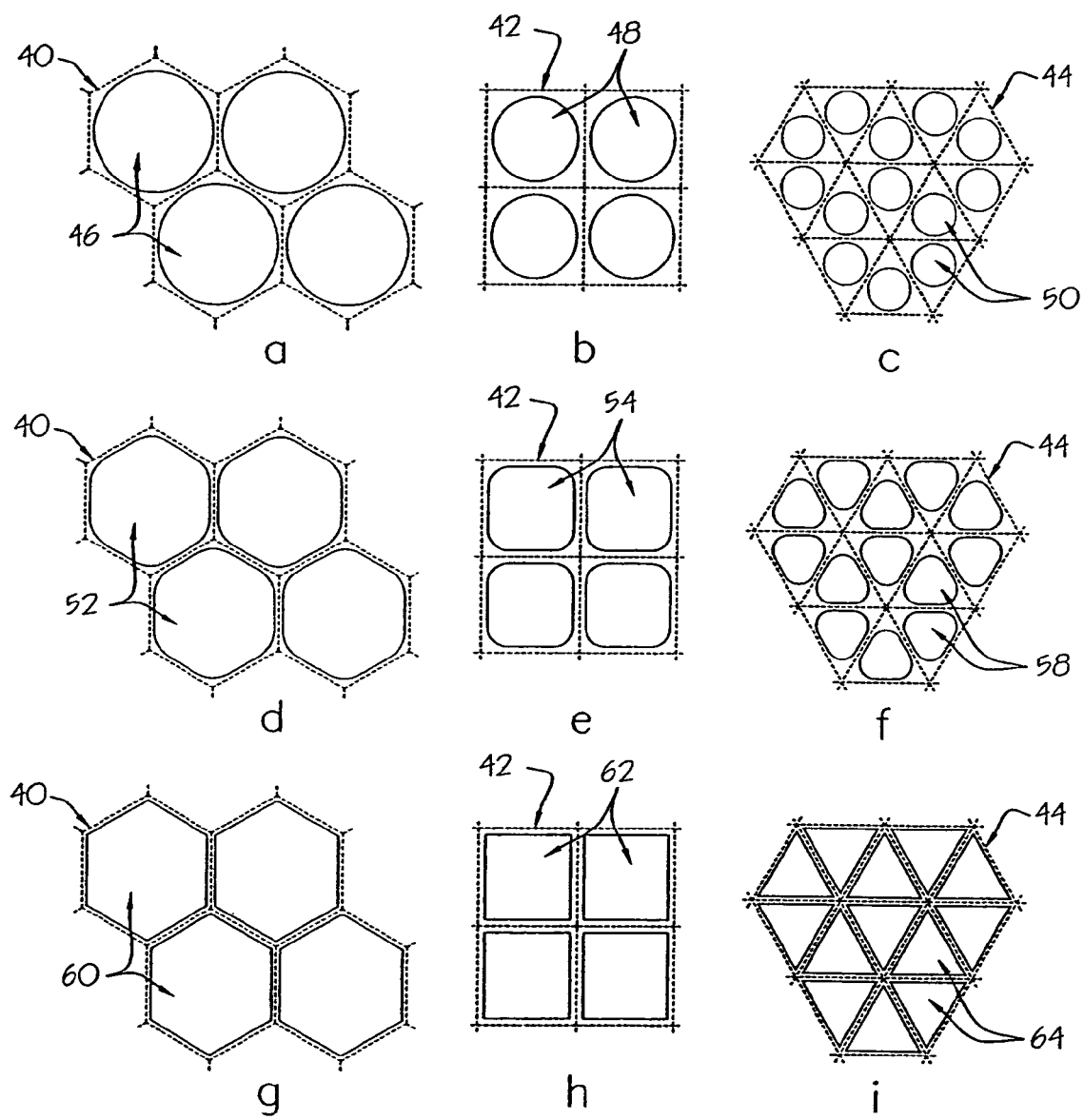
Figs 3a-i

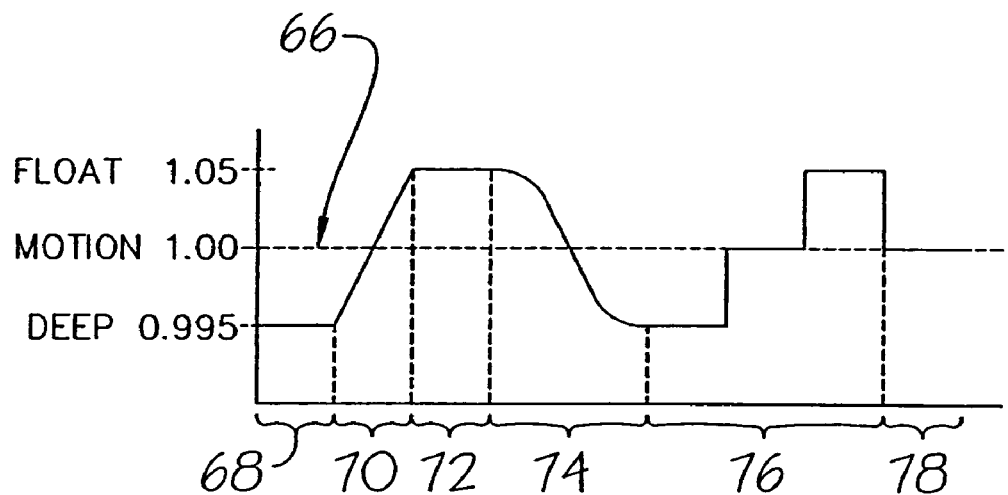
Fig. 4
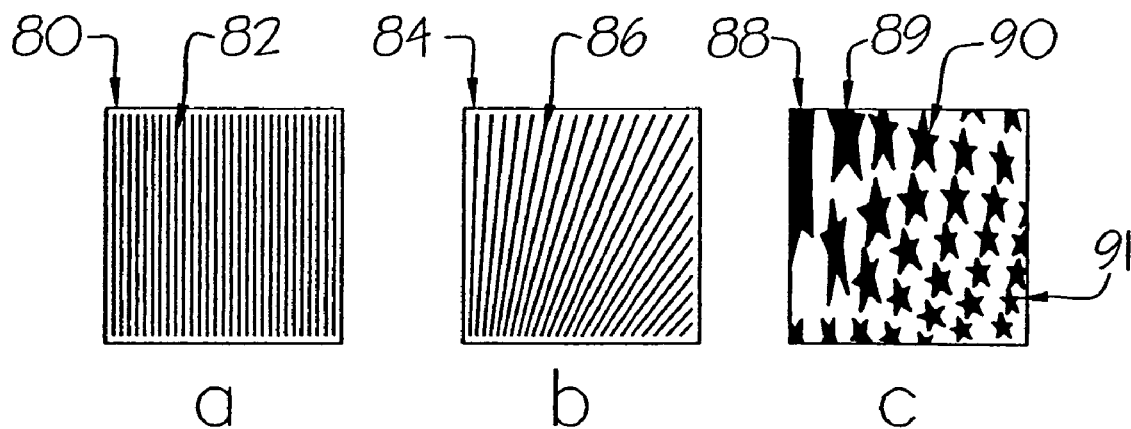
Figs. 5a-c

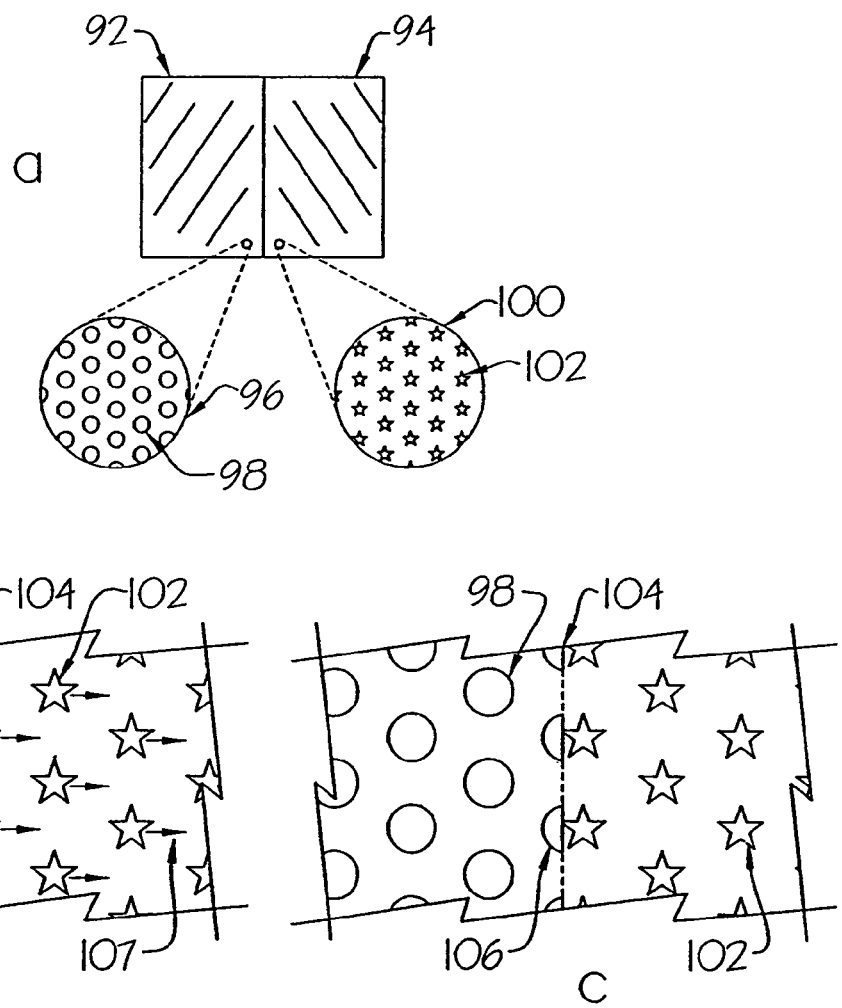
Figs. 6a-c

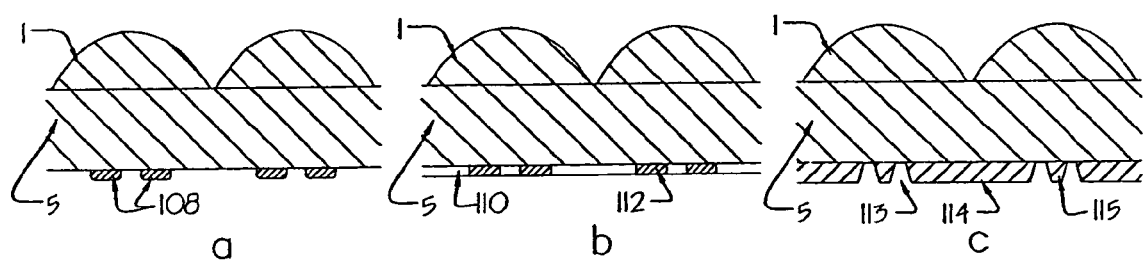
Figs. 7a-c
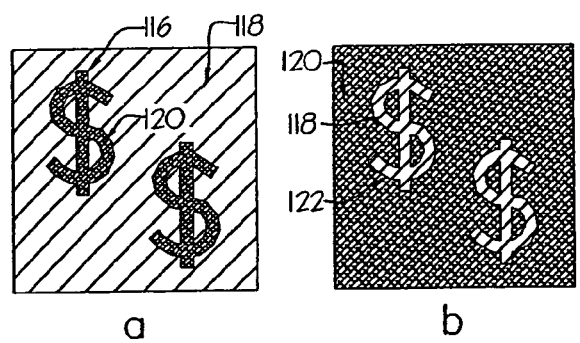
Figs. 8a-b

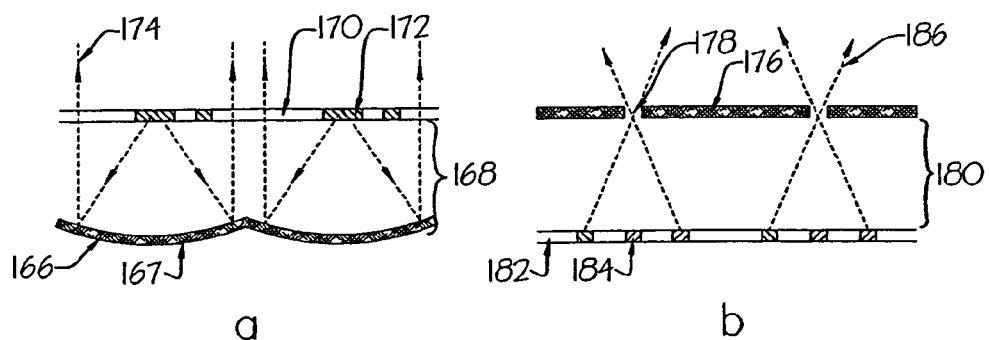
Figs. 11a-b
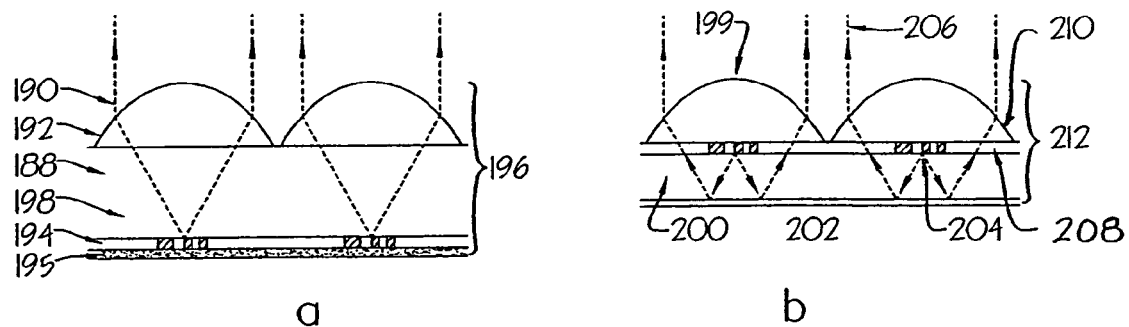
Figs. 12a-b

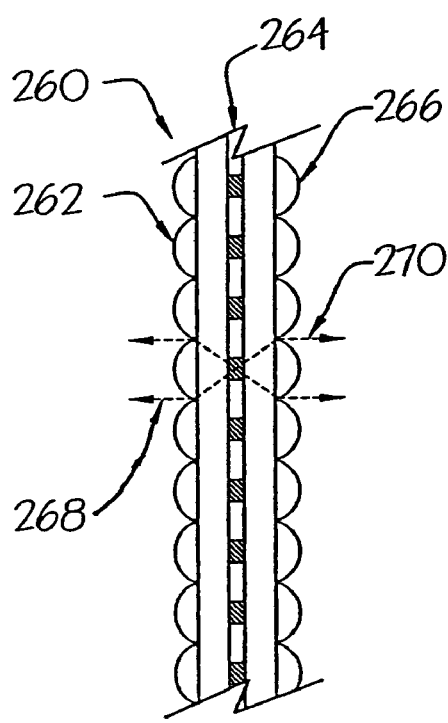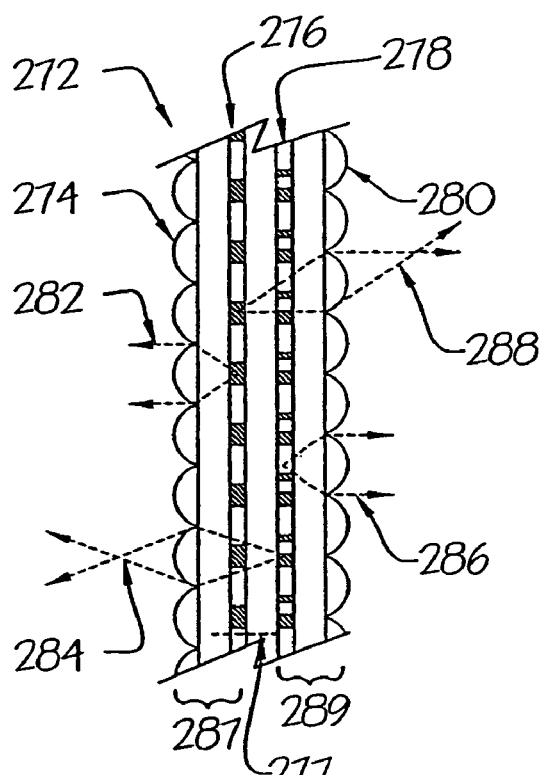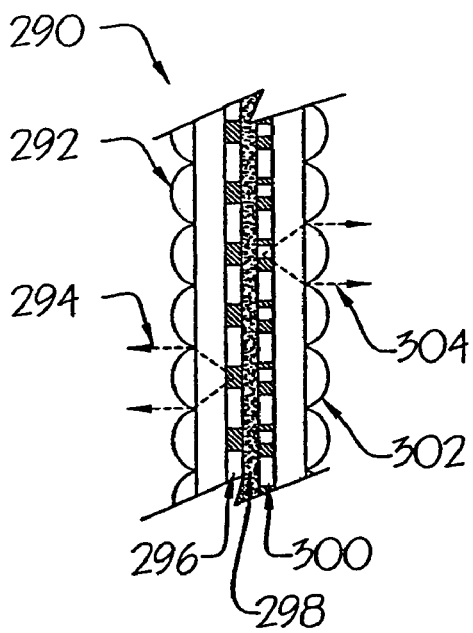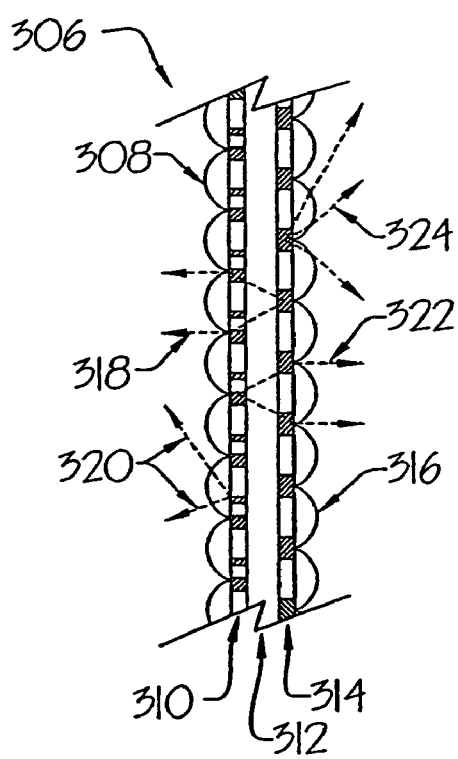
Figs. 15a–d

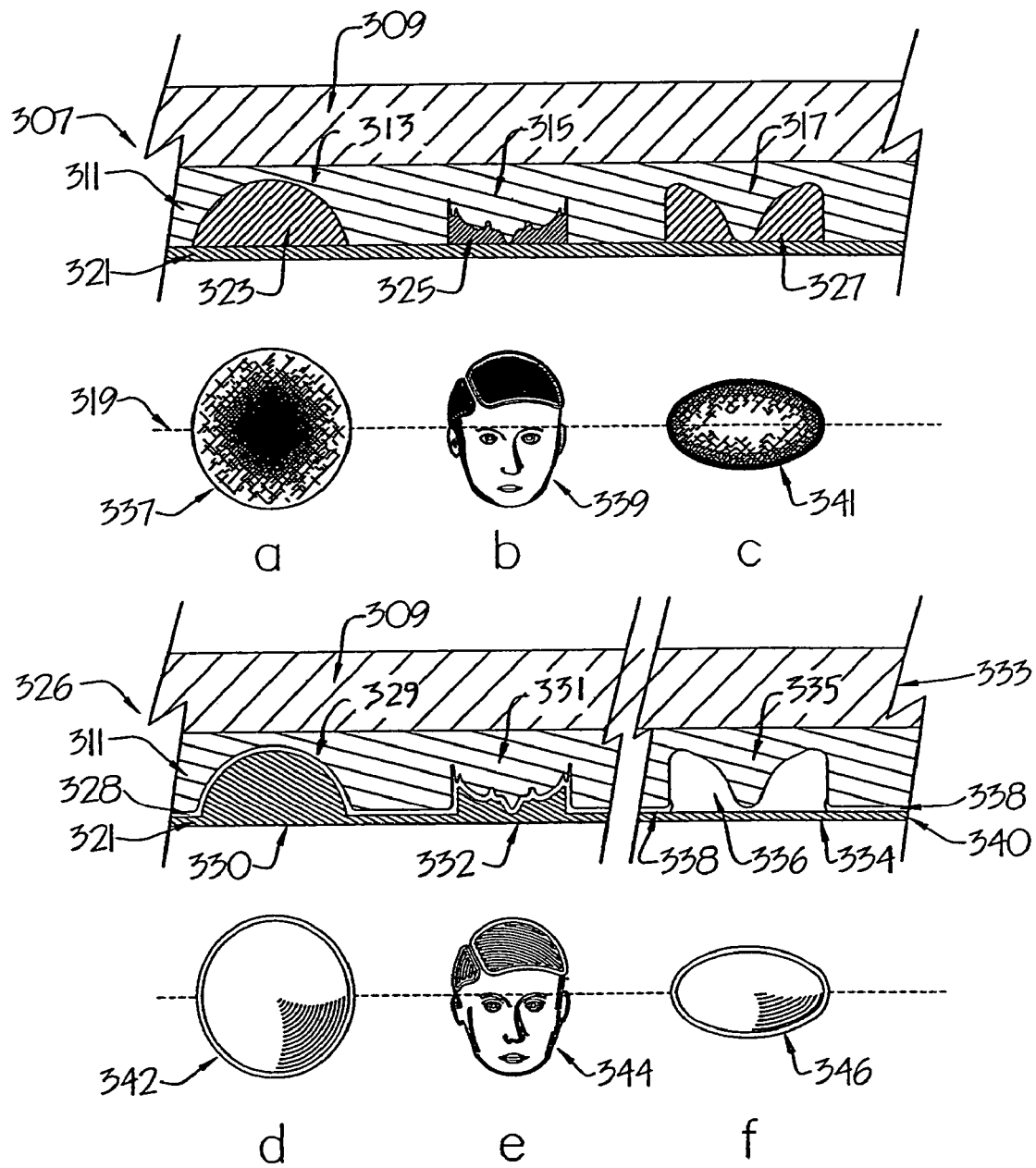
Figs. 16a-f

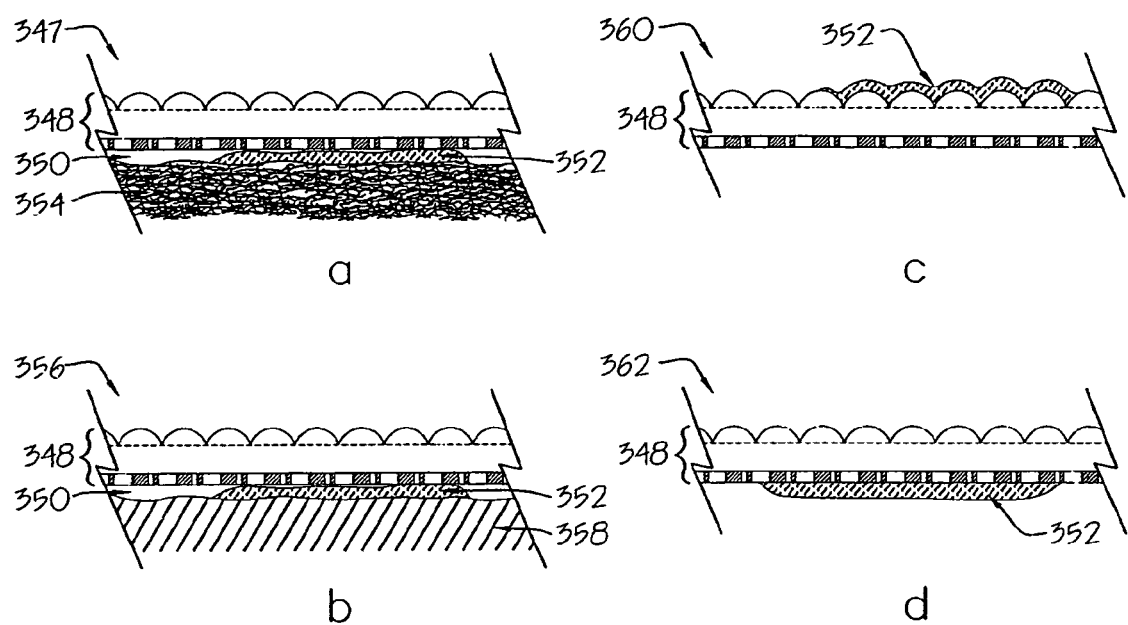
Figs. 17a-d

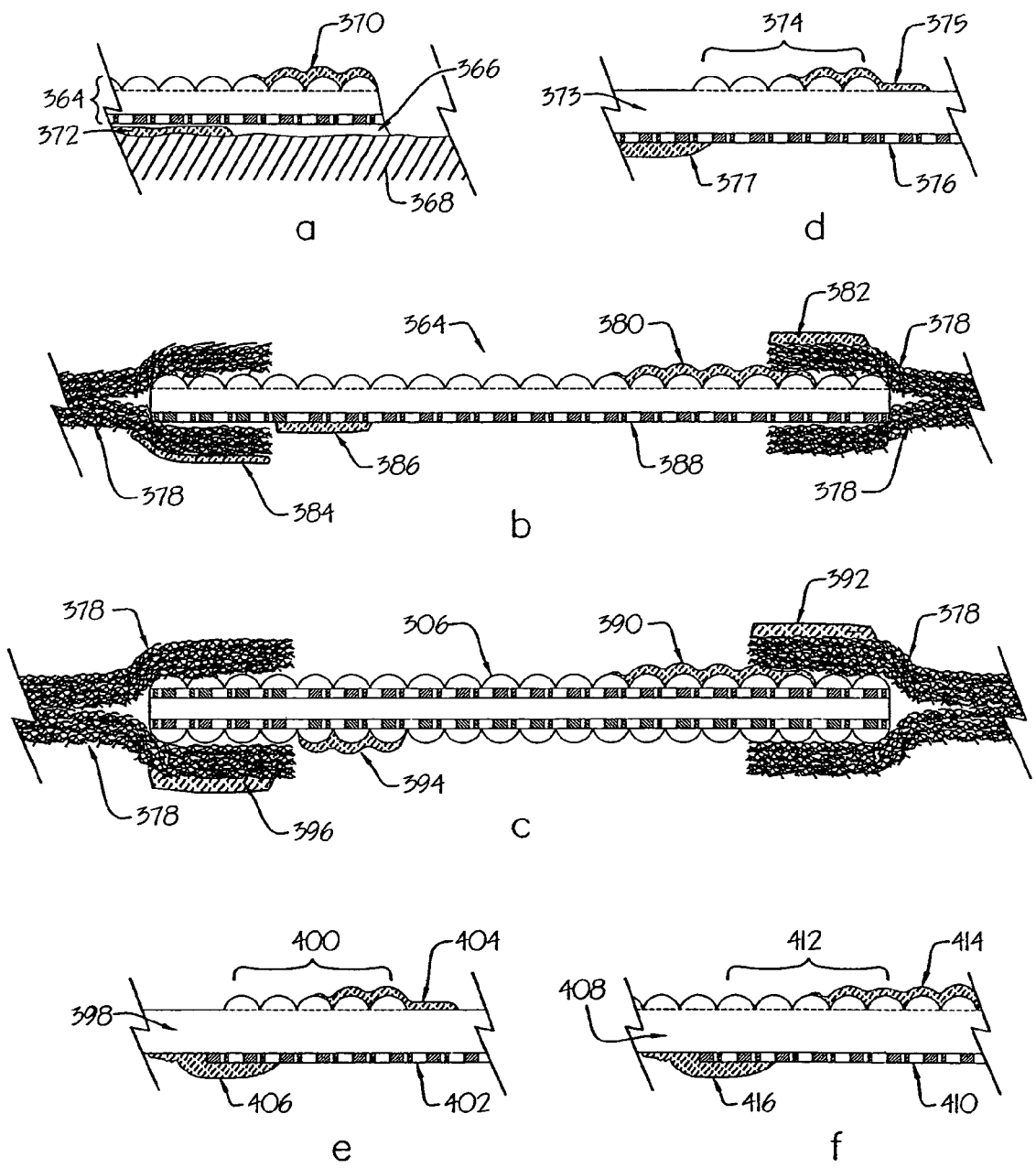
Figs. 18a-f

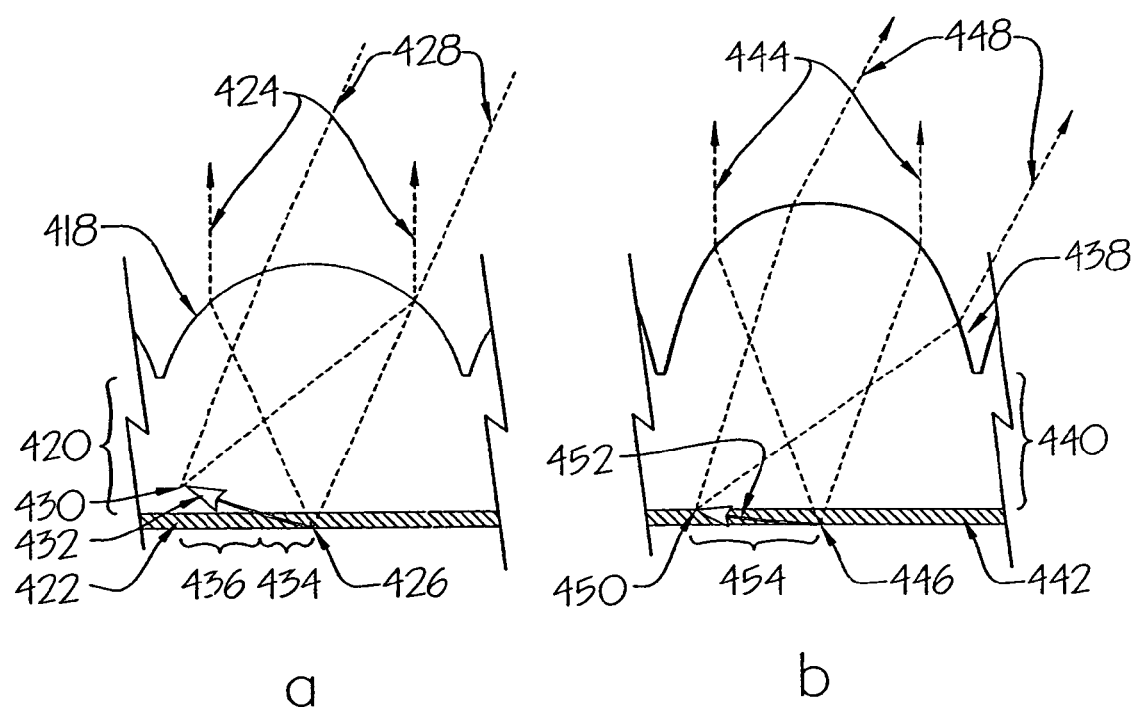
Figs. 19a-b

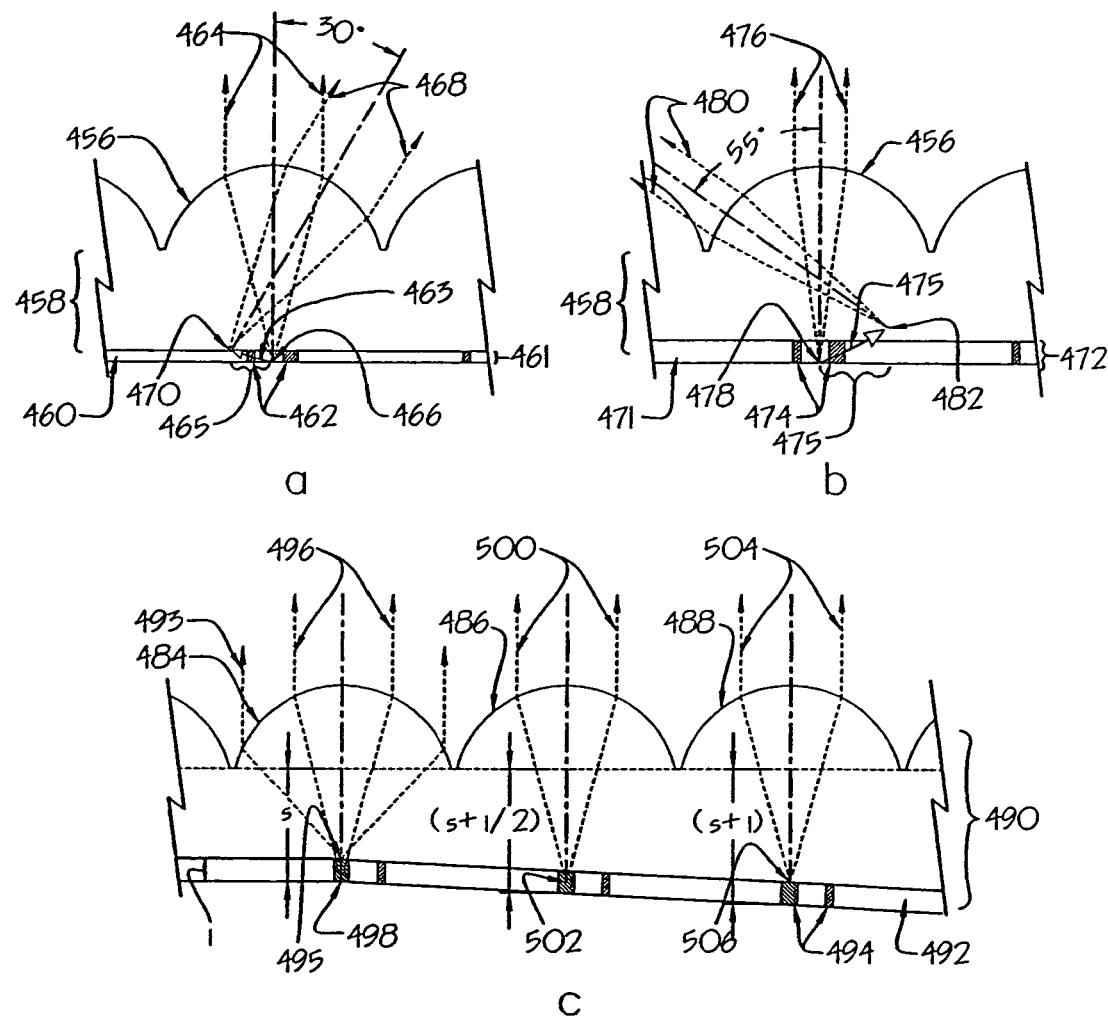
Figs. 20a-c

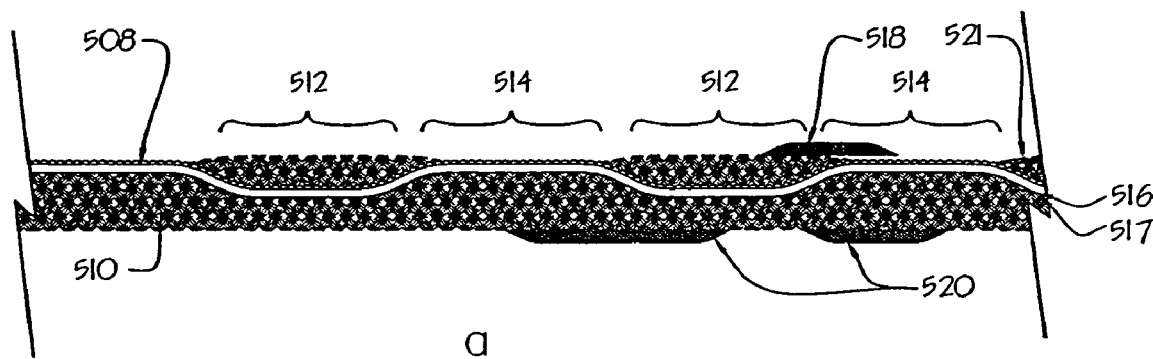
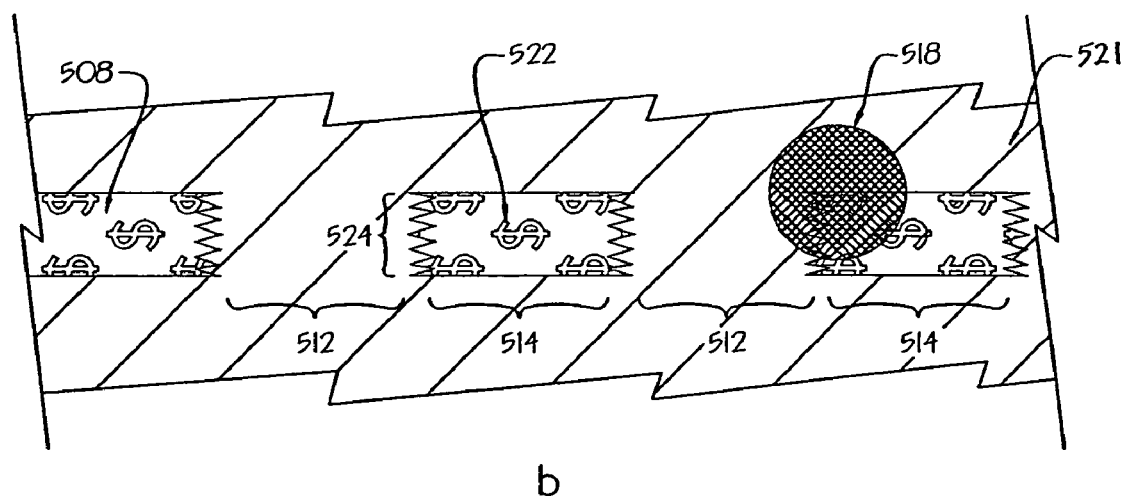
Figs. 21a,b

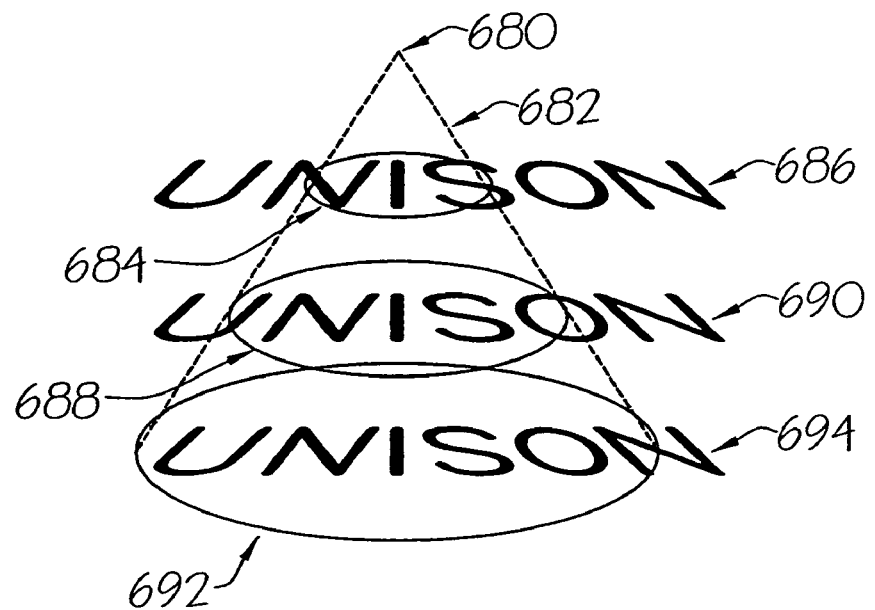
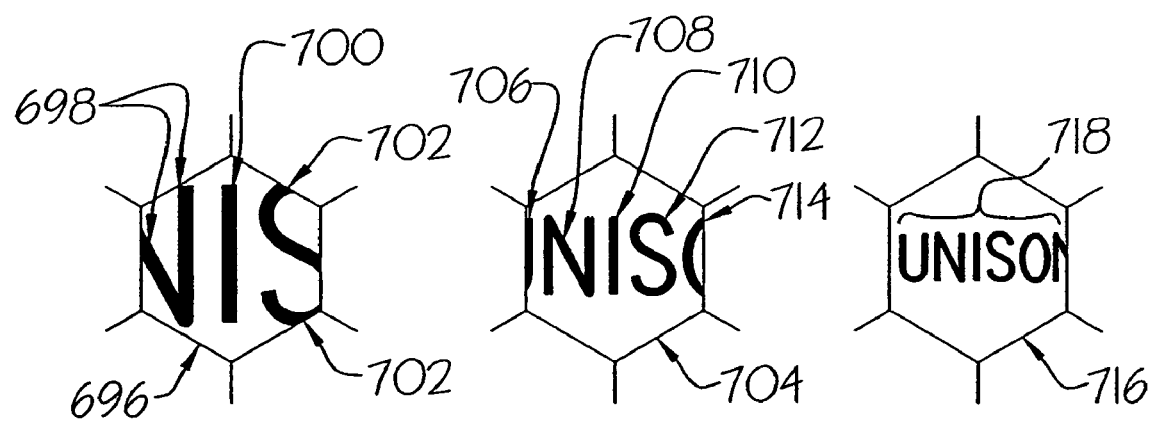
Fig. 27

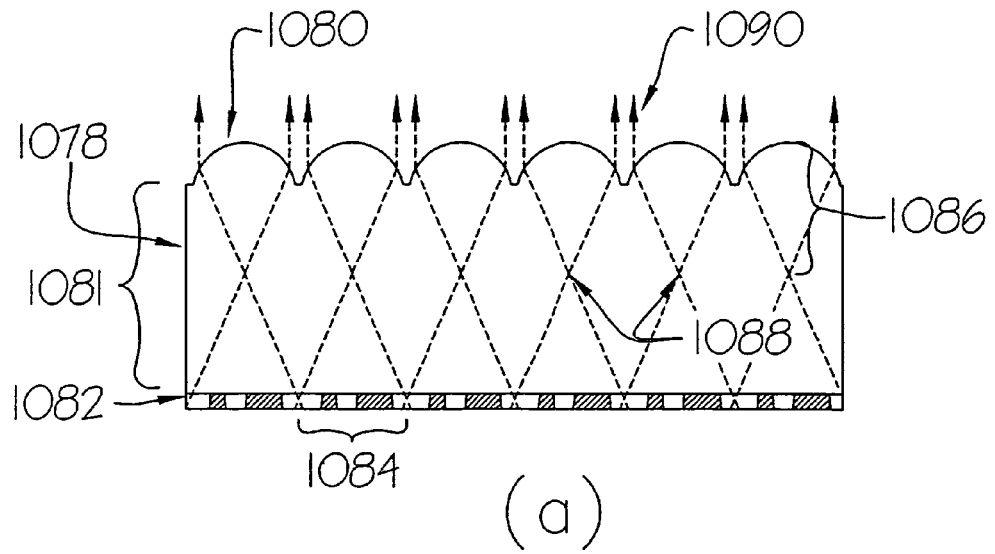
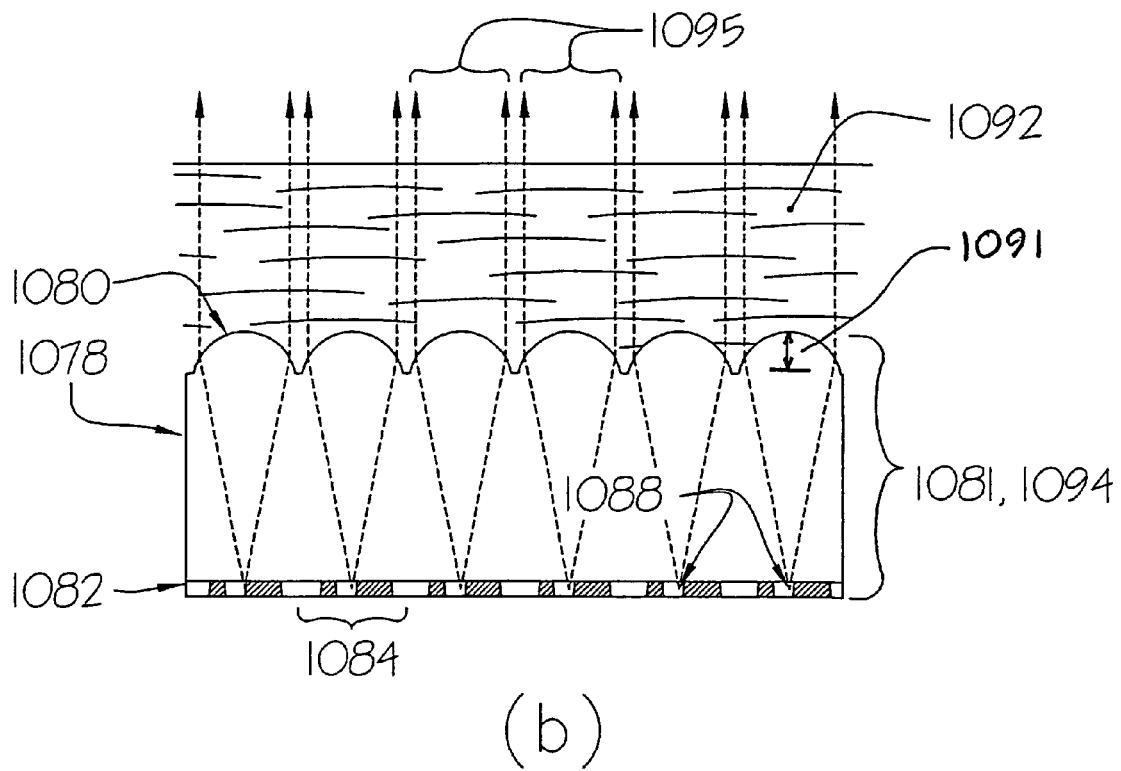
Fig. 44 (a,b)

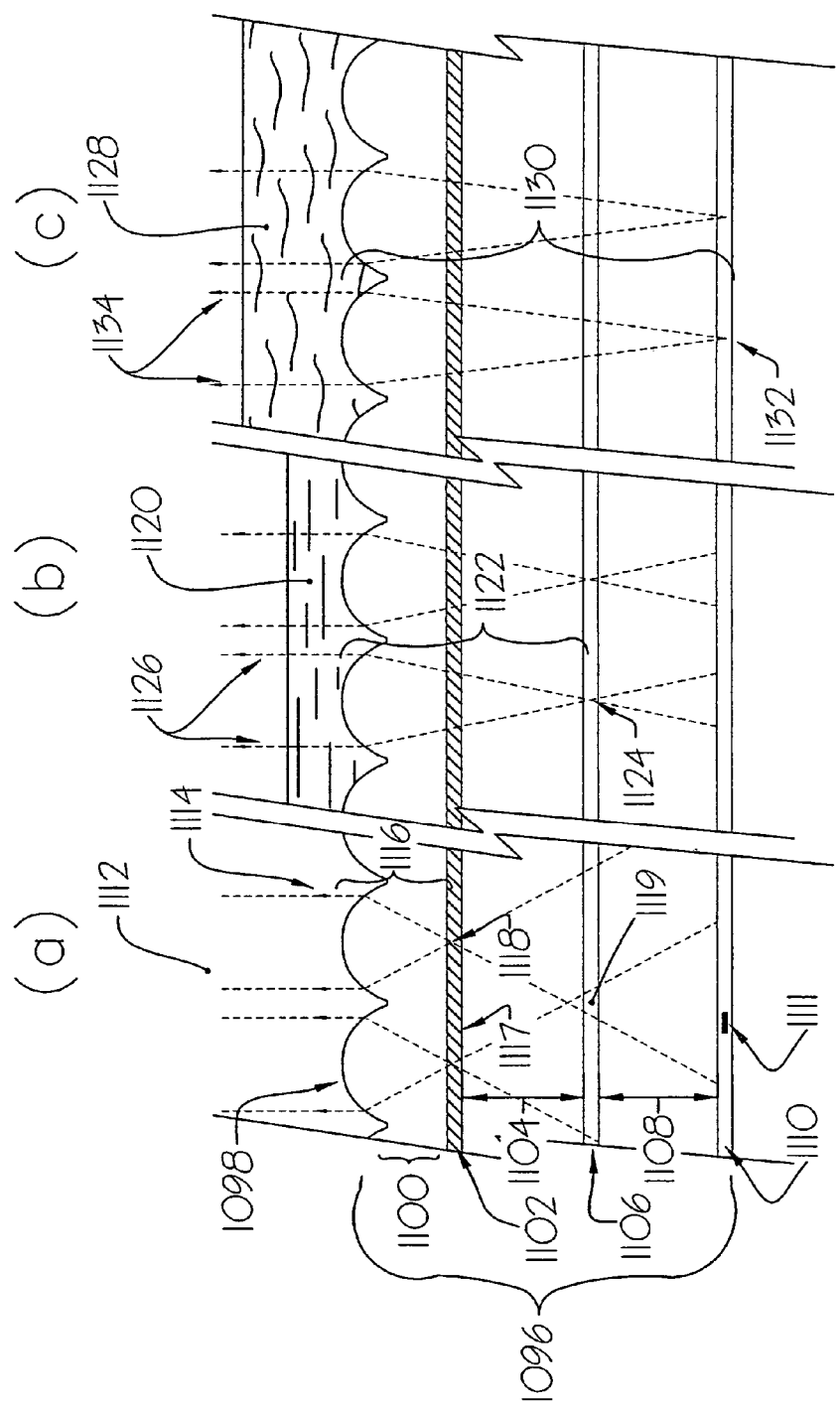
Fig. 45 (a,b,c)

IMAGE PRESENTATION AND MICRO-OPTIC SECURITY SYSTEM

CROSS-REFERENCE TO RELATED APPLICATIONS

This application is a continuation-in-part of U.S. patent application Ser. No. 10/995,859 filed Nov. 22, 2004 now U.S. Pat. No. 7,333,268, and claims benefit of and priority to U.S. Provisional Patent Application No. 60/682,231 filed on May 18, 2005 and U.S. Provisional Patent Application No. 60/683,037 filed May 20, 2005, each of which is incorporated by reference in their entirety.

FIELD OF THE INVENTION

The present invention relates to an image presentation system that in an exemplary embodiment is formed of microstructured icon elements in a polymer film. The present invention also relates to a synthetic magnification micro-optic system that in an exemplary embodiment is formed as a polymer film. The unusual effects provided by the various embodiments of the disclosure can be used as a security device for overt and covert authentication of currency, documents, and products as well as visual enhancement of products, packaging, printed material, and consumer goods.

BACKGROUND

Various image presentation systems have previously been attempted. Typical image presentation systems involve conventional printing techniques. Some image presentation systems involve holographic image displays and/or embossed image features. These systems all have drawbacks in relation to the nature or quality of the image displayed. More particularly they all have the disadvantage that they can be readily copied, and thus cannot serve as an authentication or security device.

Various optical materials have been employed to provide image systems for authentication of currency and documents, to identify and distinguish authentic products from counterfeit products, and to provide visual enhancement of manufactured articles and packaging. Examples include holographic displays, and other image systems involving lenticular structures and arrays of spherical micro-lenses. Holographic displays have become prevalent for use with credit cards, drivers' licenses, and clothing tags.

An example of a lenticular structure for document security is disclosed in U.S. Pat. No. 4,892,336 to Kaule, et al. directed to a security thread for embedding within a document to provide anti-falsification measures. The security thread is transparent having a printed pattern on one side, on the opposite side, a lenticular lens structure coordinated with the printed pattern. The lenticular lens structure is described as comprised of a plurality of parallel cylinder lenses, or alternatively spherical or honeycomb lenses.

U.S. Pat. No. 5,712,731 to Drinkwater, et al. discloses a security device that includes an array of micro-images coupled with an array of substantially spherical micro-lenses. The lenses may also be astigmatic lenses. The lenses are each typically 50-250 μm and with a focal length of typically 200 μm.

These approaches all suffer from similar drawbacks. They result in a relatively thick structure that is not particularly suitable for use with document authentication. Their use of cylindrical or spherical lenses provides a narrow field of view resulting in fuzzy images and requiring exact and difficult alignment of the focal point of the lenses with the associated images. Additionally, they have not proven particularly effective as security or anti-counterfeiting measures.

In view of these and other deficiencies, a need exists in the industry for secure and visually unique optical materials that can facilitate overt authentication of currency, documents, manufactured articles, and products and for optical materials that provide visual enhancement of manufactured articles, products, and packaging.

SUMMARY

The present disclosure relates to an image presentation system, such as a micro-image presentation system. For example, in one form a synthetic optical image system can be provided that includes an array of focusing elements, and an image system that includes or is formed from an array or pattern of microstructured icon elements, such as those described below, wherein the microstructured icon elements are designed to collectively form an image or certain desired information, and wherein the array of focusing elements and the image system cooperate, for example through optical coupling, to form a synthetic optical image which image may optionally be magnified. In another form an image presentation system is provided that includes or is formed from an array or pattern of microstructured icon elements, such as those described below, wherein the microstructured icon elements are designed to collectively form an image or certain selected information, and wherein the image system is designed to stand alone and be the image viewed or the information read by use of a magnifying device, such as a magnifying glass or microscope, that is provided separately from the image system.

The present disclosure also relates to a film material that utilizes a regular two-dimensional array of non-cylindrical lenses to enlarge micro-images, called icons herein, and to form a synthetically magnified image through the united performance of a multiplicity of individual lens/icon image systems. The synthetically magnified images and the background surrounding them can be either colorless or colored, and either or both the images and the background surrounding them can be transparent, translucent, pigmented, fluorescent, phosphorescent, display optically variable color, metallized, or substantially retroreflective. The material displaying colored images on a transparent or tinted background is particularly well suited for use in combination with underlying printed information. When a piece of such material is applied over printed information both the printed information and the images are seen at the same time in spatial or dynamic motion relationship to each other. Material of this kind can also be overprinted, i.e. have print applied to the uppermost (lens) surface of the material. Alternatively, the material displaying colored images (of any color, including white and black) on a translucent or substantially opaque background of different color is particularly well suited for stand-alone use or with overprinted information, not in combination with underlying printed information.

The magnitude of the synthetic magnification achieved can be controlled by the selection of a number of factors, including the degree of 'skew' between the axes of symmetry of the lens array and the axes of symmetry of the icon array. Regular periodic arrays possess axes of symmetry that define lines that the pattern could be reflected around without changing the basic geometry of the pattern, that in the ideal of arrays are infinite in extent. A square array, for example, can be reflected around any diagonal of any square without changing the relative orientation of the array: if the sides of the squares are aligned with the x and y axes of the plane, then the sides of the squares will still be aligned with those axes after reflection, with the assumption that all sides are identical and indistinguishable. We refer to such arrays as having rotational symmetry or being rotationally symmetric.

Instead of mirroring the square array the array can be rotated through an angle equal to the angle between the axes of symmetry of the same type. In the case of a square array the array can be rotated through an angle of 90 degrees, the angle between diagonals, to arrive at an array orientation which is indistinguishable from the original array. Similarly, an array of regular hexagons can be mirrored or rotated about a number of axes of symmetry, including the "diagonals" of the hexagon (the lines connecting opposite vertices) or "midpoint divisors" (lines that connect between the center points of faces on opposite sides of the hexagon). The angle between the axes of symmetry of either type is sixty degrees (60°) results in an array orientation that is indistinguishable from the original orientation.

If a lens array and an icon array are initially arranged with their planar dimensions defining their respective x-y plane, one of the axes of symmetry being chosen to represent the x axis of the first array, the corresponding type of axis of symmetry (for example, diagonal axis of symmetry) being chosen to represent the x axis of the second array, with the two arrays separated by a substantially uniform distance in the z axis direction, then the arrays are said to have zero skew if the x axes of the arrays appear to be parallel to each other when the arrays are viewed along the z axis direction. In the case of hexagonal arrays, rotation of one array through an angle of 60 degrees, or multiples thereof, puts the arrays in alignment again, so there is no skew, just as there is no skew for a rotation of 90 degrees, or multiples thereof, in the case of square arrays. Any angular misalignment between the x axes that is different from these "zero skew rotations" is called the skew. A small skew, such as 0.06 degree, can create a large magnification, in excess of 1,000×, and a large skew, such as 20 degrees produces a small magnification, potentially as small as 1×. Other factors, such as the relative scales of the two arrays and the F# of the lens, can affect both the magnification of the synthetic image as well as its rotation, orthoparallactic movement, and apparent visual depth.

There are a number of distinct visual effects that can be provided by the present material (subsequently referred to as "Unison" for the material in general, or by the names "Unison Motion", "Unison Deep", "Unison SuperDeep", "Unison Float", "Unison SuperFloat", "Unison Levitate", "Unison Morph", and "Unison 3-D" for Unison material presenting those respective effects), and their various embodiments producing each of these effects, generally described as follows:

Unison Motion presents images that show orthoparallactic movement (OPM)—when the material is tilted the images move in a direction of tilt that appears to be perpendicular to the direction anticipated by normal parallax. Unison Deep and SuperDeep present images that appear to rest on a spatial plane that is visually deeper than the thickness of the material. Unison Float and SuperFloat present images that appear to rest on a spatial plane that is a distance above the surface of the material; and Unison Levitate presents images that oscillate from Unison Deep (or SuperDeep) to Unison Float (or SuperFloat) as the material is rotated through a given angle (e.g. 90 degrees), then returning to Unison Deep (or SuperDeep) again as the material is further rotated by the same amount. Unison Morph presents synthetic images that change form, shape, or size as the material is rotated or viewed from different viewpoints. Unison 3-D presents images that show large scale three-dimensional structure, such as an image of a face.

Multiple Unison effects can be combined in one film, such as a film that incorporates multiple Unison Motion image planes that can be different in form, color, movement direction, and magnification. Another film can combine a Unison Deep image plane and a Unison Float image plane, while yet another film can be designed to combine Unison Deep, Unison Motion, and Unison Float layers, in the same color or in different colors, those images having the same or different graphical elements. The color, graphical design, optical effect, magnification, and other visual elements of multiple image planes are largely independent; with few exceptions, planes of these visual elements can be combined in arbitrary ways.

For many currency, document and product security applications it is desirable that the total thickness of the film be less than 50 microns, (also referred to herein as "μ", or "um"), for example less than about 45 microns, and as a further example in the range of about 10 microns to about 40 microns. This can be accomplished, for example, through the use of focusing elements having an effective base diameter of less than 50 microns, as a further example less than 30 microns, and as yet a further example, from about 10 microns to about 30 microns. As another example, a focusing element having a focal length of less than about 40 microns, and as a further example having a focal length of about 10 to less than about 30 microns, can be used. In a particular example focusing elements having a base diameter of 35 microns and a focal length of 30 microns can be used. An alternate, hybrid refractive/diffractive embodiment, can be made as thin as 8 microns.

The films herein are highly counterfeit resistant because of their complex multi-layer structure and their high aspect-ratio elements that are not amenable to reproduction by commonly available manufacturing systems.

Thus, the present system provides a micro-optic system preferably in the form of a polymer film having a thickness that when viewed by unaided eye(s) in reflective or transmitted light projects one or more images that:
  i. show orthoparallactic movement (Unison Motion);
  ii. appear to lie on a spatial plane deeper than the thickness of the polymer film (Unison Deep and Unison SuperDeep);
  iii. appear to lie on a spatial plane above a surface of the polymer film (Unison Float and Unison SuperFloat);
  iv. oscillate between a spatial plane deeper than the thickness of the polymer film and a spatial plane above a surface of the film as the film is azimuthally rotated (Unison Levitate);
  v. transform from one form, shape, size, color (or some combination of these properties) into a different form, shape, size, or color (or some combination of these properties) (Unison Morph); and/or
  vi. appear to have realistic three-dimensionality (Unison 3-D).

A synthetic magnification micro-optic system is disclosed that can for example service as a security or authentication device, comprising:
  (a) a micro image comprised of a periodic, rotationally symmetric planar array of a plurality of image icons having an axis of symmetry within its plane; and
  (b) a periodic planar array of a plurality of image icon focusing elements having a rotational symmetry and a periodicity substantially corresponding to the rotational symmetry and periodicity of the micro image array and having an axis of symmetry within its plane, the axis of symmetry of the array of image icon focusing elements having a selected angle with respect to the corresponding axis of symmetry of the micro image planar array, the image icon focusing elements including focusing elements either having an effective diameter of less than 50 microns or being polygonal base multizonal focusing elements, wherein the plane of the image icon focusing elements is disposed substantially parallel to the plane of the image icons at a distance sufficient for the image focusing elements to form a synthetic image of the image icons. The synthetic magnification micro-optic system of claim 1, wherein the focusing elements are selected from the group consisting of non-cylindrical lenses and non-cylindrical focusing reflectors and combinations thereof.

In another embodiment a method of producing a synthetic magnification micro-optic system and a method for producing a document security device, each comprising the steps of:

(a) providing a micro image comprised of a periodic, rotationally symmetric planar array of a plurality of image icons having an axis of symmetry within its plane; and (b) providing a periodic planar array of a plurality of image icon focusing elements having a rotational symmetry and a periodicity substantially corresponding to the rotational symmetry and periodicity of the micro image array and having an axis of symmetry within its plane, the axis of symmetry of the array of image icon focusing elements having a selected angle with respect to the corresponding axis of symmetry of the micro image planar array, the image icon focusing elements including focusing elements having an effective diameter of less than 50 microns; and (c) disposing the plane of the image icon focusing elements substantially parallel to the plane of the image icons at a distance sufficient for the image focusing elements to form a synthetic image of the image icons.

In yet another embodiment a method of controlling optical effects in a synthetic magnification micro-optic system or in a security or authentication device is disclosed, the optical effects including motion effects, magnification, visual depth effects or combinations of said effects, the method comprising the steps of:

(a) providing a micro image comprised of a rotationally symmetric planar array of a plurality of image icons having an axis of symmetry within its plane and having a selected repeat period for the image icons;

(b) providing a planar array of a plurality of image icon focusing elements having a rotational symmetry substantially corresponding to the rotational symmetry of the micro image array and having an axis of symmetry within its plane, the axis of symmetry of the array of image icon focusing elements having a selected angle with respect to the corresponding axis of symmetry of the micro image planar array, and having a selected repeat period for the focusing elements, the image icon focusing elements including focusing elements having an effective diameter of less than 50 microns or being polygonal base multi-zonal focusing elements; and (c) disposing the plane of the image icon focusing elements substantially parallel to the plane of the image icons at a distance sufficient for the image focusing elements to form a synthetic image of the image icons;

(d) wherein the ratio of the repeat period of the image icons to the repeat period of the focusing elements is selected from the group consisting of less than 1, substantially equal to 1, and greater than 1, and selecting whether the axis of symmetry of the periodic planar array of the micro image and the corresponding axis of symmetry of the periodic planar array of image icon focusing elements are aligned or misaligned.

In a further exemplary embodiment an image icon for use in a synthetic micro-optic system is disclosed, the synthetic magnification micro-optic system including:

(a) a micro image comprised of a substrate having a planar array of a plurality of image icons; and (b) a planar array of image icon focusing elements, wherein the planar array of image icon focusing elements is disposed in relation to the planar array of image icons at a distance and in a manner sufficient for the image focusing elements to form a synthetic image of the image icons;

the image icons including image icons formed as recesses in the substrate, the recesses forming voids that are optionally filled with a material providing a contrast with the substrate.

A synthetic magnification micro-optic system or document security device and methods of making same are also disclosed, comprising:

(a) a micro image comprised of a planar array of a plurality of image icons; and (b) a planar array of image icon focusing elements, the focusing elements including focusing elements that are polygonal base multi-zonal focusing elements.

Further, a security or authentication thread is disclosed, comprising:

(a) a material having a periodic array of micro-images or icons comprising filled recesses formed in the material;

(b) a periodic array of non-cylindrical, flat field, aspheric or polygonal base multi-zonal micro-focusing elements disposed at a distance sufficient for the focusing elements to form a synthetic image of the micro-images or icons, wherein the micro-focusing elements including focusing elements having a base diameter ranging from about 20 to about 30 microns; and (c) a pigmented or metallic sealing or obscuring layer covering the array of micro-images or icons.

A document security device or security thread, particularly for use in currency, are disclosed comprising:

(a) a micro image comprised of a periodic, rotationally symmetric planar array of a plurality of image icons having an axis of symmetry within its plane; and (b) a periodic planar array of a plurality of image icon focusing elements having a rotational symmetry and a periodicity substantially corresponding to the rotational symmetry and periodicity of the micro image array and having an axis of symmetry within its plane, the axis of symmetry of the array of image icon focusing elements having a selected angle with respect to the corresponding axis of symmetry of the micro image planar array, the image icon focusing elements including focusing elements either having an effective diameter of less than 50 microns or being polygonal base multi-zonal focusing elements, wherein the plane of the image icon focusing elements is disposed substantially parallel to the plane of the image icons at a distance sufficient for the image focusing elements to form a synthetic image of the image icons.

And a synthetic magnification optical and security system are disclosed comprising an image and a plurality of image focusing elements, the focusing elements and the image arranged in a plane in relation to each other wherein when the system is tilted about an axis substantially parallel to the plane of the system the synthetic image appears to move in a direction parallel to the tilt axis.

The present disclosure further provides a synthetic magnification micro-optic system and method of making the same comprising:

(a) one or more optical spacers;

(b) a micro image comprised of a periodic planar array of a plurality of image icons having an axis of symmetry about at least one of its planar axes, and positioned on or next to the optical spacer; and (c) a periodic planar array of image icon focusing elements having an axis of symmetry about at least one of its planar axes, the axis of symmetry being the same planar axis as that of the micro image planar array, each focusing element being either a polygonal base multi-zonal focusing element, a lens providing an enlarged field of view over the width of the associated image icon so that the peripheral edges of the associated image icon do not drop out of view, or an aspheric focusing element having an effective diameter of less than 50 microns.

The system can include one or more of the aforementioned effects. A method is provided by which said effects can be selectively included within the system.

The present disclosure further provides a security device suitable for at least partial incorporation in or on, and for use on or in association with, a security document, label, tear tape, tamper indicating device, sealing device, or other authentication or security device, which comprises at least one micro-optic system, as defined above. More particularly the present disclosure provides a document security device and method of making the same comprising:

(a) one or more optical spacers;

(b) a micro image comprised of a periodic planar array of a plurality of image icons having an axis of symmetry about at least one of its planar axes, and positioned on or next to the optical spacer; and (c) a periodic planar array of image icon focusing elements having an axis of symmetry about at least one of its planar axes, the axis of symmetry being the same planar axis as that of the micro image planar array, each focusing element being either a polygonal base multi-zonal focusing element, a lens providing an enlarged field of view over the width of the associated image icon so that the peripheral edges of the associated image icon do not drop out of view, or an aspheric focusing element having an effective diameter of less than 50 microns.

Additionally, the present disclosure provides a visual enhancement device which comprises at least one micro-optic system, as defined above and having the above described effects, for visual enhancement of clothing, skin products, documents, printed matter, manufactured goods, packaging, point of purchase displays, publications, advertising devices, sporting goods, financial documents and transaction cards, and all other goods.

Also provided is a security document or label having at least one security device, as defined above, at least partially embedded therein and/or mounted thereon.

Other features and advantages of the present disclosure will be apparent to one of ordinary skill from the following detailed description and accompanying drawings.

Other systems, devices, methods, features, and advantage will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE FIGURES

Many aspects of the disclosure can be better understood with reference to the drawings. The components in the drawings are not necessarily to scale, emphasis instead being placed upon clearly illustrating the principles of the present disclosure. Moreover, in the drawings, like reference numerals designate corresponding parts throughout the several views.

FIG. 1b is an isometric cutaway view of the embodiment of FIG. 1a.

FIGS. 2b-c illustrate the visual effects of the Deep and Float embodiments of the present system.

FIGS. 2d-f illustrate the visual effects obtained by rotation of a Levitate embodiment of the present system.

FIGS. 3a-i are plan views showing various embodiments and fill-factors of different patterns of symmetric two dimensional arrays of lenses of the present system.

FIG. 4 is a graph illustrating different combinations of Deep, Unison, Float, and Levitate embodiment effects produced by variation of the icon element period/lens period ratio.

FIGS. 5a-c are plan views illustrating how the synthetic magnification of the icon images can be controlled by the relative angle between the lens array and icon array axes of the present system.

FIGS. 6a-c are plan views illustrating an embodiment accomplishing a morphing effect of synthetically magnified images of the present system.

FIGS. 7a-c are cross-sections showing various embodiments of the icon layer of the present system.

FIGS. 8a-b are plan views illustrating both 'positive' and 'negative' icon element embodiments.

FIGS. 11a-b are cross-section views showing reflective optics and pinhole optics embodiments of the present system.

FIGS. 12a-b are cross-section views comparing the structures of an all-refractive material embodiment with a hybrid refractive/reflective material embodiment.

FIGS. 15a-d are cross-section views showing various embodiments of two-sided systems.

FIGS. 16a-f are cross-section views and corresponding plan views illustrating three different methods for creating grayscale or tonal icon element patterns and subsequent synthetically magnified images by the present system.

FIGS. 17a-d are cross-section views showing the use of the present system in conjunction with printed information.

FIGS. 18a-f are cross-section views illustrating the application of the present system to, or incorporation into, various substrates and in combination with printed information.

FIGS. 19a-b are cross-section views comparing the in-focus field of view of a spherical lens with that of a flat field aspheric lens when each are incorporated into the present system.

FIGS. 20a-c are cross-section views illustrating two benefits of utility which result from the use of a thick icon layer in the present system.

FIG. 21 is a plan view that shows the application of the present system to currency as a "windowed" security thread.

FIG. 27 illustrates the method for designing icon images for the three-dimensional embodiment of FIG. 26.

FIGS. 44a,b illustrate an immersible embodiment of the micro-optic system disclosed herein.

FIGS. 45a-c illustrate alternate embodiment of the immersible embodiment of FIGS. 44a,b.

DETAILED DESCRIPTION OF THE EMBODIMENTS

Figure 1A:
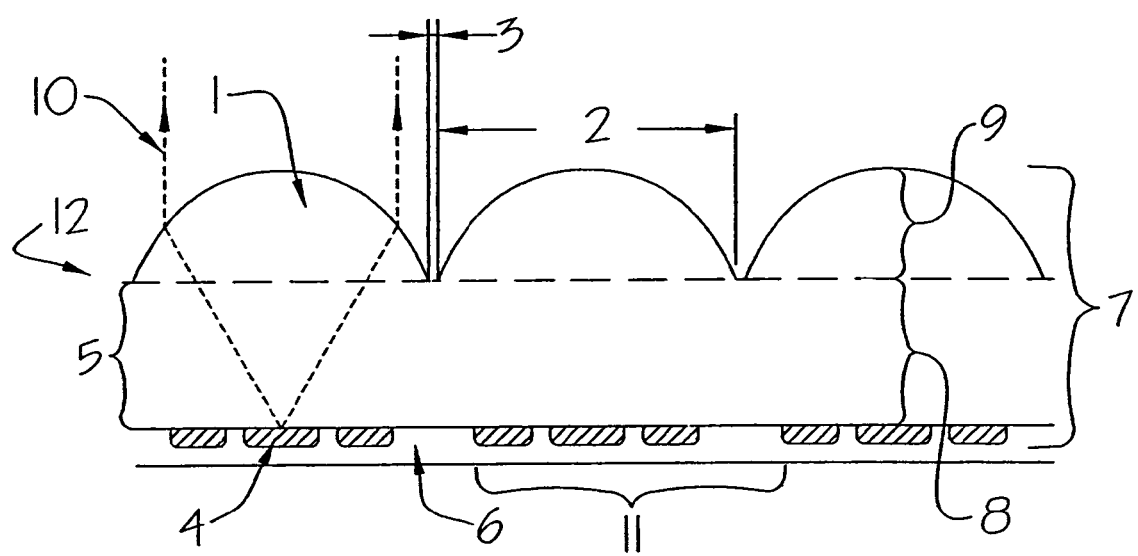
FIG. 1a is a cross-section of a micro-optic system exemplifying one embodiment of the present disclosure providing orthoparallactic movement of the images of the system.

Reference is now made in detail to the description of the embodiments as illustrated in the figures. While several embodiments are described in connection with these figures, there is no intent to limit the invention to the embodiment or embodiments disclosed herein. On the contrary, the intent is to cover all alternatives, modifications, and equivalents.

In the interest of brevity and to avoid repetitive explanations, all subsequent references to the following terms are to be understood as defined, explained, and detailed herein. For convenience, the defined terms are subsequently printed in bold upon their first instance of use within the description of a particular embodiment.

Icon fill material—any material used to fill micro-structured icon elements. Icon fill material may be a gas, liquid, gel, powder, solid, an emulsion, suspension, a composite material, and combinations thereof. Icon fill material typically provides some properties that are measurably or detectably different than the surrounding icon layer material. These different properties may provide optical effects or they may provide properties that enable non-contact detection or authentication of the material, or both. Combinations of materials can be used for icon fill materials to provide a multiplicity of desirable icon element properties.

Material properties of icon fill materials that may produce desirable optical effects include, but are not limited to: transparency, opacity, refractive index, chromatic dispersion, scattering properties, pearlescence, opalescence, iridescence, color reflection and color absorption, reflectivity, linear, circular, and elliptical polarizing properties, Raman or Rayleigh properties, optical rotation, fluorescence, luminescence, phosphorescence, two-photon effects, thermochromicity, piezochromicity, photochromicity, triboluminescence, electroluminescence, electrochromicity, and magnetochromicity. Icon fill materials may obtain these properties as pure materials or as mixtures, compounds, suspensions, or other combinations of a multiplicity of materials.

Material properties of icon fill materials that may produce desirable non-contact detection or authentication properties include, but are not limited to: magnetic reactivity, magnetization, electric charge separation, electrical reactivity, electrical conductivity, thermal conductivity, dielectric strength, fluorescence, luminescence, phosphorescence, two-photon effects, nuclear magnetic resonance, transparency, opacity, refractive index, chromatic dispersion, scattering properties, pearlescence, opalescence, iridescence, color reflection and color absorption, reflectivity, linear, circular, and elliptical polarizing properties, Raman or Rayleigh properties, radioactivity, radioactivation, optical rotation, fluorescence, luminescence, phosphorescence, two-photon effects, thermochromicity, piezochromicity, photochromicity, triboluminescence, electroluminescence, electrochromicity, and magnetochromicity.

Icon fill material can preferably include carrier material, such as monomer, oligimer, or polymer materials, and combinations thereof, that is solvent cured, thermally cured, oxidation cured, reaction cured, or radiation cured. An exemplary radiation cured photopolymer is Lord Industries U107 photopolymer.

The optical, non-contact detection, and non-contact authentication properties of the icon fill carrier material can be modified by mixing or combining it with any of the following (for example, but not limited to these materials): dyes, coloring agents, pigments, powdered materials, inks, powdered minerals, magnetic materials and particles, magnetized materials and particles, magnetically reactive materials and particles, phosphors, liquid crystals, liquid crystal polymers, carbon black or other light absorbing materials, titanium dioxide or other light scattering materials, photonic crystals, non-linear crystals, nanoparticles, nanotubes, buckeyballs, buckeytubes, organic materials, pearlescent materials, powdered pearls, multilayer interference materials, opalescent materials, iridescent materials, low refractive index materials or powders, high refractive index materials or powders, diamond powder, structural color materials, polarizing materials, polarization rotating materials, fluorescent materials, phosphorescent materials, thermochromic materials, piezochromic materials, photochromic materials, triboluminscent materials, electroluminescent materials, electrochromic materials, magnetochromic materials and particles, radioactive materials, radioactivatable materials, electret charge separation materials, combinations thereof. An exemplary icon fill material includes a photopolymer carrier, such as Lord Industries U107, that is ground with a submicron pigment powder to form a thick "ink".

Other properties, materials, methods, means, and combinations thereof not explicitly taught here are understood to be included in the scope of this invention as they would be obvious to a worker skilled in the art.

Coating material—any material used to coat an icon layer or icon fill material, or to coat any layer of a moiré magnification system, including but not limited to the lenses, the icon plane, the icon layer, microstructured icon elements, icon fill material, or to any layer(s) of materials deposited, laminated, or applied to the lenses, the icon layer, or any layer internal or external to the lenses, icon layer, substrate, or transparent substrate.

Coating materials typically provide some properties that are detectibly different from the properties of the other materials in the icon layer, icon fill material, substrate, transparent substrate, or lens layer. These different properties may provide optical effects or they may provide properties that enable non-contact detection or authentication of the material, or both. Combinations of materials can be used for coating materials to provide a multiplicity of desirable coating material properties.

Material properties of coating materials that may produce desirable optical effects include, but are not limited to: transparency, opacity, refractive index, chromatic dispersion, scattering properties, pearlescence, opalescence, iridescence, color reflection and color absorption, reflectivity, linear, circular, and elliptical polarizing properties, Raman or Rayleigh properties, optical rotation, fluorescence, luminescence, phosphorescence, two-photon effects, thermochromicity, piezochromicity, photochromicity, triboluminescence, electroluminescence, electrochromicity, and magnetochromicity. Coating materials may obtain these properties as pure materials or as mixtures, compounds, suspensions, or other combinations of a multiplicity of materials.

Suitable methods for applying coating materials depend on many factors, including the material properties and the desired function or effect of the material. Metals, metal oxides, semiconductor coatings, and combinations thereof may be applied by wet reduction reactions (as in wet silvering), electro-less plating, electroplating, vapor deposition, sputtering, plasma spraying, molecular beam epitaxy, hot stamping, foil transfer, laminating and other suitable and well known means and combinations thereof. Coating materials incorporating a liquid carrier material may be applied by wet coating, spraying, printing, laminating, chemical reaction at the icon surface, ink-jet, electro printing, dipping, meniscus coating, wave coating, reactive coating and other suitable and well known means and combinations thereof. Film or foil based coating materials can be applied by hot stamping, foil transfer, lamination and other suitable and well known means and combinations thereof.

Coating materials may preferably be an evaporated or sputtered metal, such as aluminum, gold, or silver, or metal oxides, such as indium-tin-oxide or iron oxide. Coating materials incorporating a fill material may preferably include carrier material, such as monomer, oligimer, or polymer materials, and combinations thereof, that is solvent cured, thermally cured, oxidation cured, reaction cured, or radiation cured. An exemplary radiation cured photopolymer is Lord Industries U107 photopolymer.

The optical, non-contact detection, and non-contact authentication properties of a coating carrier material can be modified by mixing or combining it with any of the following (for example, but not limited to these materials): dyes, coloring agents, pigments, powdered materials, inks, powdered minerals, magnetic materials and particles, magnetized materials and particles, magnetically reactive materials and particles, phosphors, liquid crystals, liquid crystal polymers, carbon black or other light absorbing materials, titanium dioxide or other light scattering materials, photonic crystals, non-linear crystals, nanoparticles, nanotubes, buckeyballs, buckeytubes, organic materials, pearlescent materials, powdered pearls, multilayer interference materials, opalescent materials, iridescent materials, low refractive index materials or powders, high refractive index materials or powders, diamond powder, structural color materials, polarizing materials, polarization rotating materials, fluorescent materials, phosphorescent materials, thermochromic materials, piezochromic materials, photochromic materials, triboluminscent materials, electroluminescent materials, electrochromic materials, magnetochromic materials and particles, radioactive materials, radioactivatable materials, electret charge separation materials, combinations thereof. An examplary coating material includes a photopolymer carrier, such as Lord Industries U107, that is ground with a submicron pigment powder to form a thick "ink".

Coating materials may also be selected to provide physical, chemical, mechanical, priming, or adhesion promoting properties.

Other properties, materials, methods, means, and combinations thereof not explicitly taught here are understood to be included in the scope of this invention as they would be obvious to a worker skilled in the art.

Positive icon element—A graphical element of an icon design or pattern wherein object patterns of the icon element, such as characters or logos, are pigmented, colored, metallized, or otherwise distinguished from the background of the icon element. In general, in the process of manufacturing, the object patterns of a positive icon element will obtain its distinguishing properties prior to any distinguishing properties obtained or applied to the background of a positive icon element.

Positive image—The image or synthetic image formed by positive icon elements.

Negative icon element—A graphical element of an icon design or pattern wherein the background of the icon element is pigmented, colored, metallized, or otherwise distinguished from the object patterns of the icon element, such as characters or logos. In general, in the process of manufacturing, the background of a negative icon element will obtain its distinguishing properties prior to any distinguishing properties obtained or applied to the object patterns of a negative icon element Negative image—The image or synthetic image formed by negative icon elements.

Object patterns of (the/an) icon element—The discrete and bounded graphical elements of an icon design or pattern, such as characters or logos. In general, object patterns of an icon element are preferably bounded within one, two, or three icon elements or patterns, but may be bounded with more.

Background of (the/an) icon element—The unbounded regions of an icon design or pattern that surround the object patterns. In general, the background of an icon element or patterns is continuous across multiple icon elements or patterns.

Icon layer—A substantially planar layer of micro-printing that may be applied to a face of a substrate or transparent substrate or may be a free-standing layer. A wide variety of materials can be used for the icon layer, including but not limited to thermoset polymers, thermoformable polymers, cast polymers, reactive cast polymers, radiation cured polymers, biopolymers, gelatines, starches, sugars, silicone polymers, multilayer dielectric polymer films, solvent cast polymers, compression molded polymers, injection molded polymers, embossed polymers, glasses, metal oxides, diamond, aluminum oxide, photopolymers, photoresists, printed ink or patterned coatings, ink-jet printed coatings, electro-printed coatings, and combinations thereof.

An exemplary icon layer material is a photopolymer, such as Lord Industries U107 photopolymer. An icon layer can be a single material or it can incorporate dyes, coloring agents, pigments, powdered materials, inks, powdered minerals, magnetic materials and particles, magnetized materials and particles, magnetically reactive materials and particles, phosphors, liquid crystals, liquid crystal polymers, carbon black or other light absorbing materials, titanium dioxide or other light scattering materials, photonic crystals, non-linear crystals, nanoparticles, nanotubes, buckeyballs, buckeytubes, organic materials, pearlescent materials, powdered pearls, multilayer interference materials, opalescent materials, iridescent materials, low refractive index materials or powders, high refractive index materials or powders, diamond powder, structural color materials, polarizing materials, polarization rotating materials, fluorescent materials, phosphorescent materials, thermochromic materials, piezochromic materials, photochromic materials, tribolumenscent materials, electroluminescent materials, electrochromic materials, magnetochromic materials and particles, radioactive materials, radioactivatable materials, electret charge separation materials, combinations thereof, and other suitable materials that can enhance or alter its optical, electrical, magnetic, nuclear magnetic resonance, or other physical properties.

An exemplary icon layer material is Lord Industries U107 photopolymer. Other properties, materials, methods, means, and combinations thereof not explicitly taught here are understood to be included in the scope of this invention as they would be obvious to a worker skilled in the art.

Microstructured icon image elements—Icon elements having a physical relief or microstructure that can be formed in an icon layer by many suitable means, including thermoforming, casting, compression molding, injection molding, embossing, patterned radiation exposure and development, laser exposure and development, ink-jet printing, electro printing, printing, engraving, electroforming, ruling, photographic, holographic, and laser exposure of a photosensitive emulsion combined with well-known hardening and etching or swelling processes, masking and deposition processes, masking and chemical etching, masking and reactive ion etching, masking and ion beam milling, micromachining, laser machining and laser ablation, photopolymer exposure and development, and other suitable means and combinations thereof.

Microstructured image elements are preferably formed by casting a liquid photopolymer between a polymer substrate (usually PET) and a nickel microstructured icon image elements tool, radiation curing said photopolymer, and peeling said polymer substrate with the attached cured photopolymer from said nickel microstructured icon image elements tool.

Other properties, materials, methods, means, and combinations thereof not explicitly taught here are understood to be included in the scope of this invention as they would be obvious to a worker skilled in the art.

Microstructured icon image elements tooling and methods—Tooling and methods used to form microstructured icon image elements into an icon layer by thermoforming, casting, compression molding, injection molding, embossing, patterned radiation exposure and development, electroforming, and photopolymer exposure and development. Said tooling can be created by many similar and suitable means, including thermoforming, casting, compression molding, injection molding, embossing, patterned radiation exposure and development, laser exposure and development, ink-jet printing, electro printing, printing, engraving, electroforming, ruling, photographic, holographic, and laser exposure of a photosensitive emulsion combined with well-known hardening and etching or swelling processes, masking and deposition processes, masking and chemical etching, masking and reactive ion etching, masking and ion beam milling, micromachining, laser machining and laser ablation, photopolymer exposure and development, and other suitable means and combinations thereof.

Microstructured icon image elements tooling is preferably produced by the well known methods of generation of an original microstructure by optical exposure and development of a photoresist material on a rigid substrate or a rigid transparent substrate, conductive metallization of the microstructured photoresist surface, and nickel electroforming onto the conductive surface.

Other properties, materials, methods, means, and combinations thereof not explicitly taught here are understood to be included in the scope of this invention as they would be obvious to a worker skilled in the art.

Transparent substrate—Any substantially planar and substantially optically transparent material, including, but not limited to glass, metal oxides, polymers, composite material, biopolymers, sugars, celluloses, starches, gelatines and combinations thereof that is used to support the optical elements of a Unison moiré magnification system, said optical elements optionally including a microlens array and one or more icon image arrays. PET polymer film is an exemplary substrate for the icon layers and moiré magnification systems of this invention.

Other properties, materials, methods, means, and combinations thereof not explicitly taught here are understood to be included in the scope of this invention as they would be obvious to a worker skilled in the art.

Substrate—Any substantially planar material, including, but not limited to glass, metals, composite materials, metal oxides, polymers, biopolymers, sugars, cellulose, starches, gelatins, paper, fibrous materials, non-fibrous materials, foils, non-woven paper substitutes and combinations thereof PET polymer film is an exemplary substrate for this invention.

Other properties, materials, methods, means, and combinations thereof not explicitly taught here are understood to be included in the scope of this invention as they would be obvious to a worker skilled in the art.

Conformal coating material—A coating material that conforms to the shape of the surface it is applied to. A sputtered metal coating is typically conformal—it coats vertical surfaces, micro-structure sidewalls, and undercut areas as well as horizontal surfaces.

Non-conformal coating material—A coating material that does not conform to the shape of the surface it is applied to. An evaporated metal coating is typically non-conformal—it preferentially coats horizontal surfaces but poorly coats vertical surfaces and micro-structure sidewalls and does not coat undercut areas.

Directional coating material—A coating material that preferentially coats horizontal surfaces and surfaces with a surface normal that points in the general direction of the coating source but does not coat surfaces with a surface normal that points in a general direction away from the coating source. An offset or baffled evaporated metal coating is one example of a directional coating material: the stream of metal vapor is directed at the surface at an angle substantially off-normal, causing the "near" surfaces of microstructures to be coated, but the "far" surfaces of microstructures to be shadowed and uncoated.

Referring now to the drawings, FIG. 1a illustrates one embodiment of the present micro-optic system 12 providing orthoparallactic movement of the images of the system.

The system 12 micro-lenses 1 that have at least two substantially equal axes of symmetry and that are arranged in a two-dimensional periodic array. Lens diameter 2 is preferably less than 50 μ and the interstitial space between lenses 3 is preferably 5 μ or less. (We use the terms "μ" and "μm" interchangeably to mean the same measurement). Micro-lens 1 focuses an image of icon element 4 and projects this image 10 toward a viewer. The system is commonly used in situations having normal levels of ambient lighting, so the illumination of the icon images arises from reflected or transmitted ambient light. Icon element 4 is one element of a periodic array of icon elements having periods and dimensions substantially similar to those of the lens array including lens 1. Between the lens 1 and the icon element 4 is an optical spacer 5, which may be contiguous with the lens 1 material or may optionally be a separate substrate 8—in this embodiment the lenses 9 are separate from the substrate. The icon elements 4 may be optionally protected by a sealing layer 6, preferably of a polymer material. Sealing layer 6 may be transparent, translucent, tinted, pigmented, opaque, metallic, magnetic, optically variable, or any combination of these that provide desirable optical effects and/or additional functionality for security and authentication purposes, including support of automated currency authentication, verification, tracking, counting and detection systems, that rely on optical effects, electrical conductivity or electrical capacitance, magnetic field detection.

The total thickness 7 of the system is typically less than 50 μ; the actual thickness depends on the F# of the lenses 1 and the diameter of the lenses 2, and the thickness of additional security feature or visual effect layers. The repeat period 11 of the icon elements 4 is substantially identical to the repeat period of the lenses 1; the "scale ratio", the ratio of the repeat period of the icons to the repeat period of the lenses, is used to create many different visual effects. Axially symmetric values of the scale ratio substantially equal to 1.0000 result in Unison Motion orthoparallactic effects when the symmetry axes of the lenses and the icons are misaligned, axially symmetric values of the scale ratio less than 1.0000 result in Unison Deep and Unison SuperDeep effects when the symmetry axes of the lenses and the icons are substantially aligned, and axially symmetric values of the scale ratio greater than 1.0000 result in Unison Float and Unison SuperFloat effects when the symmetry axes of the lenses and the icons are substantially aligned. Axially asymmetric values of the scale ratio, such as 0.995 in the X direction and 1.005 in the Y direction, result in Unison Levitate effects.

Unison Morph effects can be obtained by scale distortions of either or both the lens repeat period and the icon repeat period, or by incorporating spatially varying information into the icon pattern. Unison 3-D effects are also created by incorporating spatially varying information into the icon pattern, but in this embodiment the information represents different viewpoints of a three dimensional object as seen from specific locations substantially corresponding to the locations of the icons.

Figure 1B:
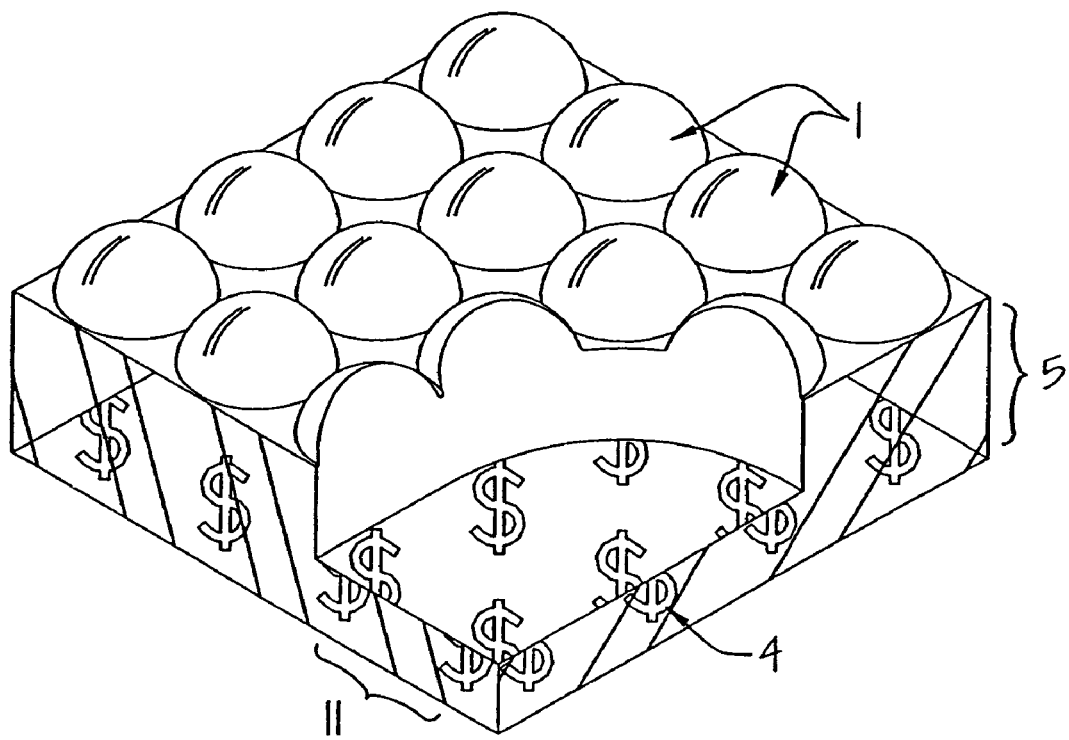

FIG. 1b presents an isometric view of the present system, as depicted in cross-section in FIG. 1a, having square array patterns of lenses 1 and icons 4 of repeat period 11 and optical spacer thickness 5 (FIG. 1a is not specific to a square array pattern, but is a representative cross-section of all regular periodic array patterns). The icon elements 4 are shown as "$" images, clearly seen in the cut-away section at the front. While there is substantially a one-to-one correspondence between lenses 1 and icon elements 4, the axes of symmetry of the lens array will not, in general, be exactly aligned with the axes of symmetry of the icon array.

In the case of the Unison (orthoparallactic motion) material embodiment of FIGS. 1a-b with a scale ratio of 1.0000, when the lens 1 axes and icon elements 4 axes are substantially aligned, the resulting synthetic images of the icon elements (in this example, a giant "$") "blow-up" and are magnified by a factor that theoretically approaches infinity. Slight angular misalignment of the lens 1 axes and icon elements 4 axes reduces the magnification factor of the synthetic images of the icon elements and causes the magnified synthetic images to rotate.

The Motion synthetic images produced by a particular combination of lenses, optical spacer(s), and icons move a consistent amount for a given change in viewing angle, and this consistent amount is a percentage of the synthetic image repeat distance. For example, if a Unison Motion material is produced that presents synthetic images having a 0.25 inch repeat distance and these synthetic images appear to have 0.1 inch of orthoparallactic movement when the angle of view changes by 10 degrees, then the same lenses, icons, and spacer(s) used to create Unison that has a synthetic image repeat distance of 1.0 inch will exhibit a proportionally larger orthoparallactic movement—0.4 inch—when the angle of view changes by 10 degrees. The amount of orthoparallactic image movement is scaled to match the repeat distance of the synthetic image produced. The relationship between the change in the angle of view and the scaled orthoparallactic movement depends on the F# of the lenses used. Low F# lenses produce a smaller amount of orthoparallactic movement for a selected change in viewing angle than larger F# lenses.

An exemplary lens used for a Unison Motion material may have an F# of 0.8. One reason that this is a desirable F# is that it minimizes vertical disparity between the images seen with by left eye and those seen by the right eye of the observer. Vertical disparity is a vertical misalignment between the left eye and right eye images—one image appears to be vertically displaced with respect to the other image. Horizontal image disparity is a familiar and natural phenomenon: it is one of the factors used by the eye-brain system to perceive three dimensional depth. Vertical image disparity is not normally encountered by people—it may sometimes be seen in binoculars or binocular microscopes if their optics are out of alignment. While horizontal image disparity is a continuous occurance for people with sight in both eyes, vertical image disparity is never encountered in the natural world, so humans have very limited capacity to adapt to vertical image disparity. Such adaptation requires that one eye point slightly upward or downward with respect to the other eye. This is an unnatural experience and, while it will not harm a person, it causes an immediate physical sensation in the viewer's eyes as a result of the unaccustomed eye muscle action. This physical sensation has been described in various ways, from "it makes my eyes feel weird" to "it's hard for me to look at". The effect is present regardless of the azimuthal direction of view (ie: the Unison Motion material can be rotated to any angle within its plane without any loss of the effect). No conventional printing of any kind causes this physical sensation in the viewer's eyes.

Unison Motion materials can be designed to elicit this sensation in the viewer by enhancing the vertical disparity of the images. Vertical image disparity is present in Unison Motion materials because the viewer's eyes are disposed in a horizontal plane. The view from the left eye is from a different horizontal angle than the view from the right eye, so the synthetic image seen by the left eye is orthoparallactically displaced in a vertical direction with respect to the synthetic image seen by the right eye, thus creating vertical image disparity. The amount of vertical image disparity is small for low F# lenses and is usually unnoticed by viewers. The vertical image disparity can be enhanced, however, by using larger F# lenses, such as F#2.0 or larger, so as to purposefully create the vertical disparity sensation in the viewer's eyes.

One benefit that can be obtained by creating enhanced vertical image disparity in Unison Motion materials is that the physical sensation thus elicited in the viewer is unique, immediate, and automatic, and can therefore function as a novel authentication method. No other known material can provide a similar sensation from all azimuthal directions of view.

The synthetic magnification factor of Unison Deep, Unison Float, and Unison Levitate embodiments depends on the angular alignment of the lens 1 axes and the icon elements 4 axes as well as the scale ratio of the system. When the scale ratio is not equal to 1.0000 the maximum magnification obtained from substantial alignment of these axes is equal to the absolute value of 1/(1.0000−(scale ratio)). Thus a Unison Deep material having a scale ratio of 0.995 would exhibit a maximum magnification of |1/(1.000−0.995)|=200×. Similarly, a Unison Float material having a scale ratio of 1.005 would also exhibit a maximum magnification of |1/(1.000−1.005)|=200×. In a manner similar to the Unison Motion material embodiment, slight angular misalignment of the lens 1 axes and icon elements 4 axes of the Unison Deep, Unison Float, and Unison Levitate embodiments reduces the magnification factor of the synthetic images of the icon elements and causes the magnified synthetic images to rotate.

The synthetic image produced by a Unison Deep or SuperDeep icon pattern is upright with respect to the orientation of the Unison Deep or SuperDeep icon pattern, while the synthetic image produced by a Unison Float or SuperFloat icon pattern is upside down, rotated one hundred and eighty degrees (180°) with respect to the orientation of the Unison Float or Super Float icon pattern.

Figure 2A:
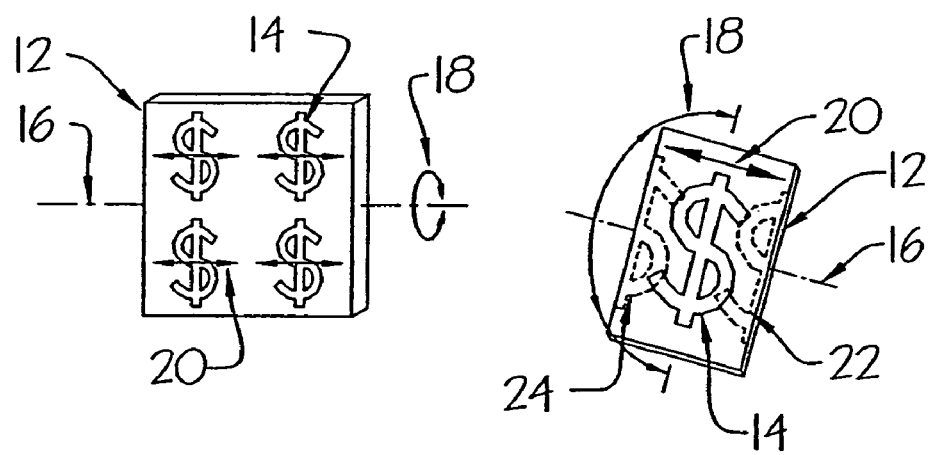
FIG. 2a illustrates an orthoparallactic synthetic image motion effect of the embodiment of FIGS. 1a-b.

FIG. 2a schematically depicts the counter-intuitive orthoparallactic image motion effects seen in the Unison Motion embodiment. The left side of FIG. 2a depicts a piece of Unison Motion material 12 in plan view being oscillated 18 about horizontal axis 16. If the synthetically magnified image 14 moved according to parallax, it would appear to be displaced up and down (as shown in FIG. 2a) as the material 12 was oscillated around the horizontal axis 16. Such apparent parallactic motion would be typical of real objects, conventional print, and holographic images. Instead of exhibiting parallactic motion, synthetically magnified image 14 shows orthoparallactic motion 20—motion which is perpendicular to the normally expected parallactic motion direction. The right side of FIG. 2a depicts a perspective view of a piece of material 12 exhibiting the orthoparallactic motion of a single synthetically magnified image 14 as it is oscillated 18 about horizontal rotational axis 16. The dotted outline 22 shows the position of the synthetically magnified image 14 after it has moved to the right by orthoparallaxis and the dotted outline 24 shows the position of the synthetically magnified image 14 after it has moved to the left by orthoparallaxis.

The visual effects of the Unison Deep and Unison Float embodiments are isometrically depicted in FIGS. 2b,c. In FIG. 2b, a piece of Unison Deep material 26 presents synthetically magnified images 28 that stereoscopically appear to lie beneath the plane of the Unison Deep material 26 when viewed by the eyes of the observer 30. In FIG. 2c, a piece of Unison Float material 32 presents synthetically magnified images 34 that stereoscopically appear to lie above the plane of the Unison Float material 34 when viewed by the eyes of the observer 30. The Unison Deep and Unison Float effects are visible from all azimuthal viewing positions and over a wide range of elevation positions, from vertical elevation (such that the line of sight from the eyes of the observer 30 to the Unison Deep material 26 or Unison Float material 32 is perpendicular to the surface of the materials) down to a shallow elevation angle which is typically less than 45 degrees. The visibility of the Unison Deep and Unison Float effects over a wide range of viewing angles and orientations provides a simple and convenient method of differentiating Unison Deep and Unison Float materials from simulations utilizing cylindrical lenticular optics or holography.

The Unison Levitate embodiment effect is illustrated in FIGS. 2d-f by isometric views showing the stereoscopically perceived depth position of a synthetically magnified image 38 in three different azimuthal rotations of the Unison Levitate material 36 and the corresponding plan view of the Unison Levitate material 36 and synthetically magnified image 38 as seen by the eyes of the observer 30. FIG. 2d depicts the synthetically magnified image 38 (hereafter referred to as 'the image') as stereoscopically appearing to lie in a plane beneath the Unison Levitate material 36 when said material is oriented as shown in the plan view. The heavy dark line in the plan view serves as an azimuthal orientation reference 37 for the sake of explanation. Note that in FIG. 2d the orientation reference 37 is aligned in a vertical direction and the image 38 is aligned in a horizontal direction. The image 38 appears in the Unison Deep position because the scale ratio is less than 1.000 along a first axis of the Unison Levitate material 36 that is aligned substantially parallel to a line connecting the pupils of the observer's two eyes (this will be hereafter called the 'stereoscopic scale ratio'). The stereoscopic scale ratio of the Unison Levitate material 36 is greater than 1.000 along a second axis perpendicular to this first axis, thereby producing a Unison Float effect of the image 38 when the second axis is aligned substantially parallel to a line connecting the pupils of the observer's eyes, as shown in FIG. 2f. Note that the orientation reference 37 is in a horizontal position in this figure. FIG. 2e depicts an intermediate azimuthal orientation of the Unison Levitate material 36 that produces a Unison Motion orthoparallactic image effect because the stereoscopic scale ratio in this azimuthal orientation is substantially 1.000.

The visual effect of a Unison Levitate image 38 moving from beneath the Unison Levitate material 36 (FIG. 2*d*) up to the level of the Unison Levitate material 36 (FIG. 2*e*) and further up above the level of the Unison Levitate material 36 (FIG. 2*f*) as the material is azimuthally rotated can be enhanced by combining the Unison Levitate material 36 with conventionally printed information. The unchanging stereoscopic depth of the conventional print serves as a reference plane to better perceive the stereoscopic depth movement of the images 38.

When a Unison material is illuminated by a strongly directional light source such as a 'point' light source (ex: a spotlight or an LED flashlight) or a collimated source (ex: sunlight), "shadow images" of the icons may be seen. These shadow images are unusual in many ways. While the synthetic image presented by Unison does not move as the direction of illumination is moved, the shadow images produced do move. Furthermore, while the Unison synthetic images may lie in different visual planes than the plane of the material, the shadow images always lie in the plane of the material. The color of the shadow image is the color of the icon. So black icons create black shadow images, green icons create green shadow images, and white icons create white shadow images.

The movement of the shadow image as the angle of illumination moves is tied to the specific depth or motion Unison effect in a way that parallels the visual effect present in the synthetic image. Thus the movement of a shadow image as the angle of the light is altered parallels the movement that the synthetic image shows when the angle of view is altered. In particular:

Motion shadow images move orthoparallactically as the light source is moved.

Deep shadow images move in the same direction as the light source.

Float shadow images move opposite to the direction of the light source.

Levitate shadow images move in directions that are a combination of the above:

Levitate Deep shadow images move in the same direction as the light in the left-right direction, but opposite from the direction of the light in the up-down direction; Levitate Float shadow images move opposite to the light in the left right direction but in the same direction as the light in the up-down direction; Levitate Motion shadow images show orthoparallactic motion with respect to the light movement.

Unison Morph shadow images show morphing effects as the light source is moved.

Additional unusual shadow image effects are seen when a diverging point light source, such as an LED light, is moved toward and away from a Unison film. When the light source is further away its diverging rays more closely approximate collimated light, and the shadow images produced by Deep, SuperDeep, Float, or SuperFloat Unison synthetic images appear approximately the same size as the synthetic images. When the light is brought closer to the surface the shadow images of Deep and SuperDeep materials shrink because the illumination is strongly divergent, while the shadow images of Float and SuperFloat materials expand. Illuminating these materials with converging illumination causes Deep and SuperDeep shadow images to enlarge to a size greater than the synthetic images, while Float and SuperFloat shadow images shrink.

The shadow images of Unison motion material do not change scale significantly as the convergence or divergence of illumination is changed, rather, the shadow images rotate about the center of illumination. Unison Levitate shadow images shrink in one direction and enlarge in the perpendicular direction when the convergence or divergence of the illumination is changed. Unison Morph shadow images change in ways specific to the particular Morph pattern as the convergence or divergence of the illumination is changed.

All of these shadow image effects can be used as additional authentication methods for Unison materials utilized for security, anti-counterfeiting, brand protection applications, and other similar applications.

FIGS. 3*a-i* are plan views showing various embodiments and fill-factors of different patterns of symmetric two-dimensional arrays of micro-lenses. FIGS. 3*a*, *d* and *g* depict micro-lenses 46, 52, and 60, respectively, that are arranged in regular hexagonal array pattern 40. (The dashed array pattern lines 40, 42, and 44 indicate the symmetry of the pattern of lenses but do not necessarily represent any physical element of the lens array.) The lenses of FIG. 3*a* have substantially circular base geometry 46, the lenses of FIG. 3*g* have substantially hexagonal base geometries 60, and the lenses of FIG. 3*d* have intermediate base geometries which are rounded-off hexagons 52. A similar progression of lens geometries applies to the square array 42 of lenses 48, 54, and 62, wherein these lenses have base geometries which range from substantially circular 48, to rounded-off square 54, to substantially square 62, as seen in FIGS. 3*b*, *e*, and *h*. Correspondingly, the equilateral triangular array 44 holds lenses having base geometries that range from substantially circular 50, to rounded-off triangle 58, to substantially triangular 64, as seen in FIGS. 3*c*, *f* and *i*.

The lens patterns of FIGS. 3*a-i* are representative of lenses that can be used for the present system. The intersititial space between the lenses does not directly contribute to the synthetic magnification of the images. A material created using one of these lens patterns will also include an array of icon elements that is arranged in the same geometry and at approximately the same scale, allowing for differences in scale utilized to produce Unison Motion, Unison Deep, Unison Float, and Unison Levitate effects. If the interstitial space is large, such as is shown in FIG. 3*c*, the lenses are said to have a low fill-factor and the contrast between the image and the background will be reduced by light scattered from icon elements. If the interstitial spaces are small the lenses are said to have a high fill-factor and the contrast between the image and the background will be high, providing the lenses themselves have good focal properties and icon elements are in the lenses' focal planes. It is generally easier to form high optical quality micro-lenses with a circular or nearly circular base than with a square or triangular base. A good balance of lens performance and minimizing of interstitial space is shown in FIG. 3*d*; a hexagonal array of lenses having base geometries that are rounded hexagons.

Lenses having a low F# are particularly suitable for use in the present system. By low F# we mean less than 4, and in particular for Unison Motion approximately 2 or lower. Low F# lenses have high curvature and a correspondingly large sag, or center thickness, as a proportion of their diameter. A typical Unison lens, with an F# of 0.8, has a hexagonal base 28 microns wide and a center thickness of 10.9 microns. A typical Drinkwater lens, with a diameter of 50 microns and a focal length of 200 microns, has an F# of 4 and a center thickness of 3.1 microns. If scaled to the same base size, the Unison lens has a sag almost six times larger than the Drinkwater lens.

We have discovered that polygonal base multi-zonal lenses, for example hexagonal base multi-zonal lenses, have important and unexpected advantages over circular base spherical lenses. As explained above, hexagonal base multi-zonal lenses significantly improve manufacturability by virtue of their stress-relieving geometry, but there are additional unexpected optical benefits obtained through the use of hexagonal base multi-zonal lenses.

We refer to these lenses as multi-zonal because they possess three optical zones that each provide a different and unique benefit to the subject invention. The three zones are the central zone (constituting approximately half of the area of the lens), the side zones, and the corner zones. These polygonal lenses have an effective diameter that is the diameter of a circle drawn inside the corner zones around the central zone and including the side zones.

Figure 30:
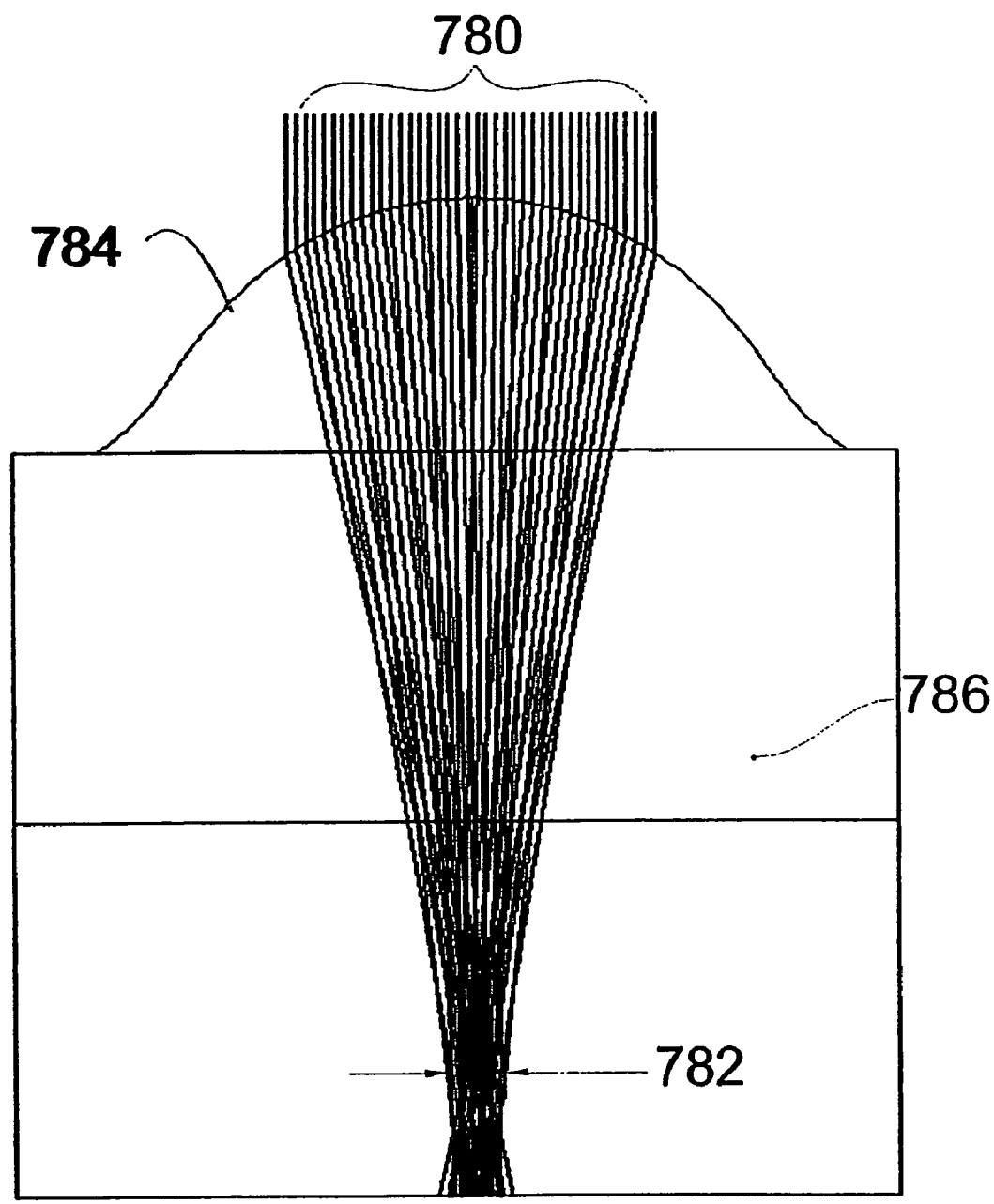
FIG. 30 illustrates the central zone focal properties of an exemplary hexagonal base multi-zonal lens having an effective diameter of 28 microns.
Figure 31:
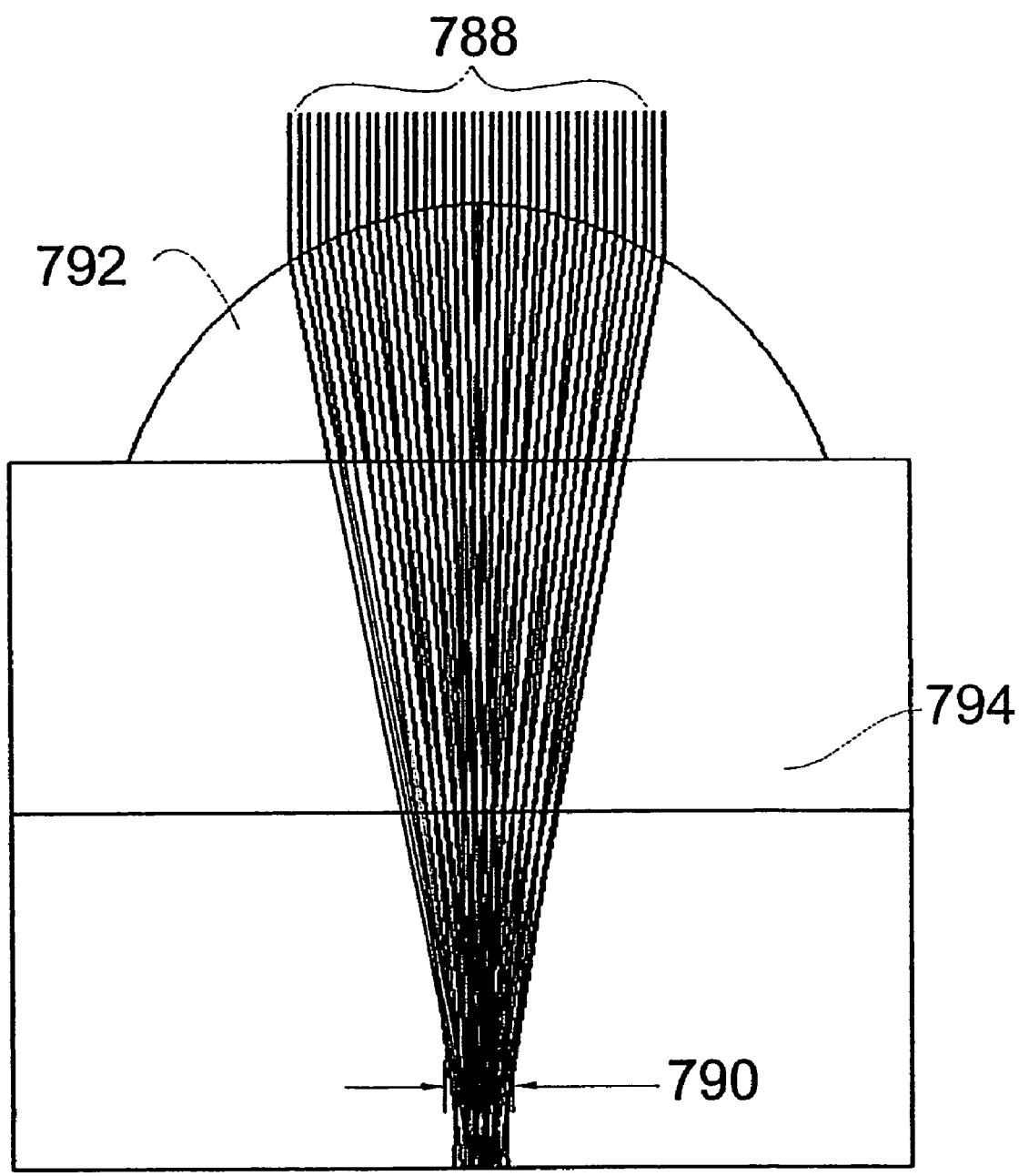
FIG. 31 illustrates the central zone focal properties of a spherical lens having a diameter of 28 microns.

The central zone of the hexagonal base multi-zonal lens of the subject invention has an aspheric form (for example, having the form defined by $[y=(5.1316E)X4-(0.01679)X3+(0.124931)X+11.24824]$ for a 28 micron diameter lens with a nominal 28 micron focal length) that brings light to a focus at least as well as a spherical surface having the same diameter and focal length. FIG. 30 illustrates the central zone 780 focal properties 782 of a nominal 28 micron diameter hexagonal base multi-zonal lens 784 with a nominal 28 micron focal length in a polymer substrate 786 (lens and substrate n=1.51) and FIG. 31 illustrates the central zone 788 focal properties 790 of a 28 micron diameter spherical lens 792 with a nominal 30 micron focal length in a polymer substrate 794 (lens and substrate n=1.51). Comparison of these two figures clearly demonstrates that the hexagonal base multi-zonal lens 784 of the subject disclosure performs at least as well as the spherical lens 792. The central zone 780 of the hexagonal base multi-zonal lens 784 provides high image resolution and shallow depth of field from a wide variety of viewing angles.

Figure 32:
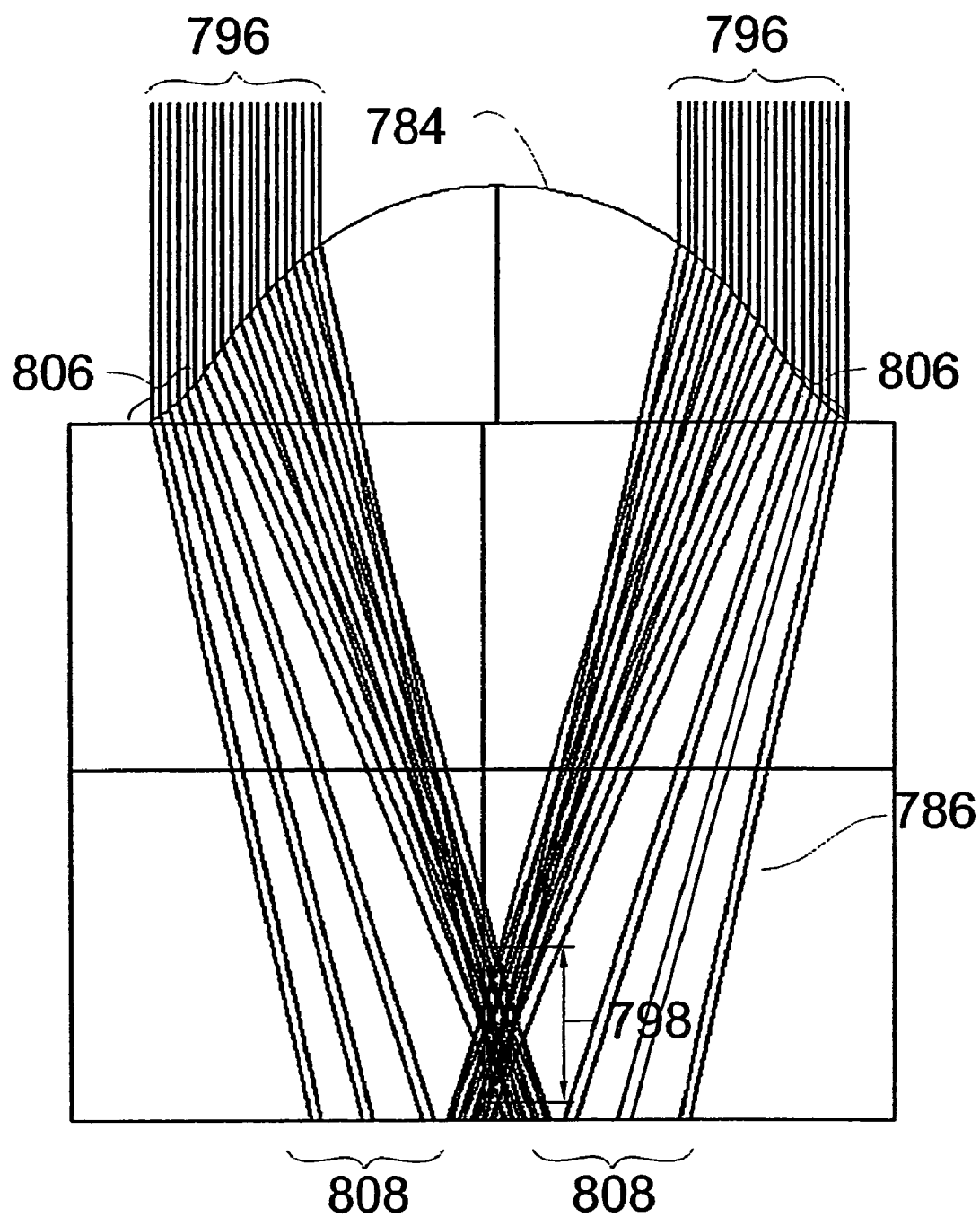
FIG. 32 illustrates the performance of the side zones of the hexagonal lens of FIG. 30.
Figure 33:
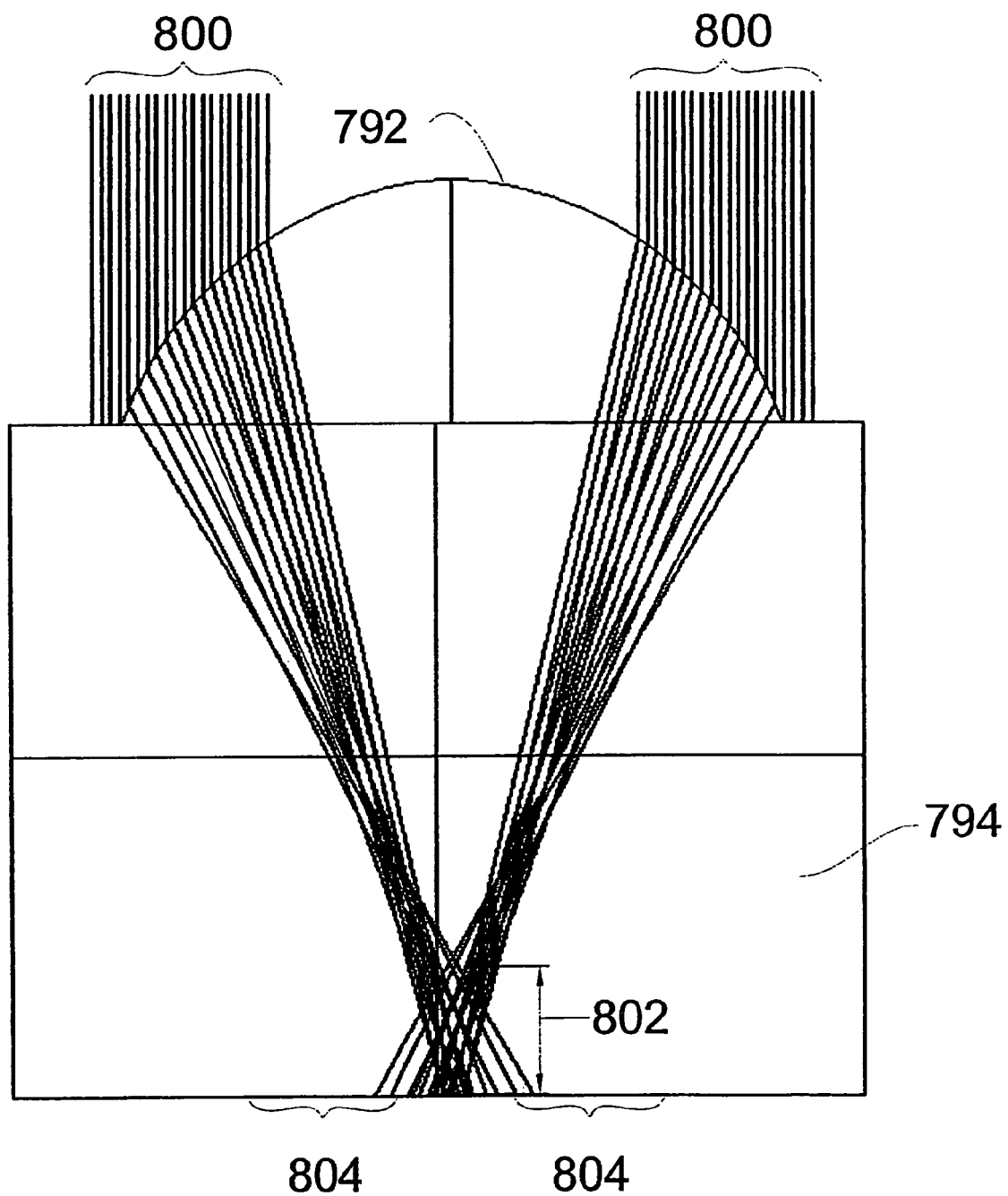
FIG. 33 illustrates the performance of the outer zones of the spherical lens of FIG. 31.

Each of the six side zones 796 of the hexagonal base multi-zonal lens 784 of the subject invention have focal lengths that depend on the location with the zone in a complex way, but the effect is to cause the focus of the side zones 796 to be spread over a range of values 798 spanning approximately ±10 percent of the central zone focus, as illustrated in FIG. 32. This vertical blurring 798 of the focal point effectively increases the depth of field of the lens in these zones 796, and provides a benefit that is equivalent to having a flat-field lens. The performance of the outer zones 800 of spherical lens 792 can be seen in FIG. 33. The vertical blurring of the focal point 802 is significantly less for the spherical lens 792 than it is for the hexagonal base multi-zonal lens 784.

This is particularly important for off-normal viewing: the increased depth of field, and effectively flatter field, mitigates the abrupt image defocus that can occur with a spherical lens when its curved focal surface separates from the icon plane. Consequently, a Unison material using hexagonal base multi-zonal lenses displays synthetic images that fade from focus more softly at higher viewing angles than the equivalent Unison material using spherical lenses. This is desirable because it increases the effective viewing angle of the material and therefore increases its usefulness as a security device or an image presentation device.

The corner zones 806 of the hexagonal base multi-zonal lens 784 of FIG. 32 possess diverging focal properties that provide the unexpected benefit of scattering 808 ambient illumination onto the icon plane and thereby reducing the sensitivity of the Unison material to illumination conditions. The spherical lens 792 of FIG. 33 does not scatter the ambient illumination over as wide an area (as seen by the absence of rays scattered into the icon plane regions 804), so Unison materials made using spherical lenses have greater synthetic image brightness variations when viewed from a variety of angles than Unison materials made using hexagonal base multi-zonal lenses.

The benefit obtained from the exemplary hexagonal base multi-zonal lenses is further magnified because hexagonal base multi-zonal lenses have a higher fill factor (ability to cover the plane) than spherical lenses. The interstitial space between spherical lenses provides virtually no scattering of ambient light, while this non-scattering area is much smaller in the case of hexagonal base multi-zonal lenses.

Thus it is seen that even though the focal properties of a hexagonal base multi-zonal lens are inferior to those of a spherical lens as evaluated by conventional optical standards, in the context of the subject invention hexagonal base multi-zonal lenses provide unexpected benefits and advantages over spherical lenses.

Either type of lens can benefit from the addition of scattering microstructures or scattering materials introduced into, or incorporated into, the lens interstitial spaces to enhance the scattering of ambient illumination onto the icon plane. Furthermore, the lens interstitial spaces can be filled with a material that will form a small radius meniscus, with either converging or diverging focal properties, to direct ambient illumination onto the icon plane. These methods may be combined, for example, by incorporating light scattering particles into a lens interstitial meniscus fill material. Alternatively, the lens interstitial zones can be originally manufactured with suitably scattering lens interstitial zones.

A spherical lens having these proportions is very difficult to manufacture because the high contact angle between the surface of the film and the edge of the lens acts as a stress concentrator for the forces applied to separate the lens from the tool during manufacture. These high stresses tend to cause the adhesion of the lens to the film to fail and to failure of removal of the lens from the tool. Furthermore, the optical performance of a low F# spherical lens is progressively compromised for radial zones away from the center of the lens: low F# spherical lenses do not focus well except near their central zone.

Hexagonal base lenses have an unexpected and significant benefit over lenses that have a more substantially circular base: hexagonal lenses release from their tools with lower peeling force than the optically equivalent lenses with substantially circular bases. Hexagonal lenses have a shape that blends from substantially axially symmetric near their center to hexagonally symmetric, with corners that act as stress concentrators, at their bases. The stress concentrations caused by the sharp base corners reduce the overall peeling force required to separate the lenses from their molds during manufacturing. The magnitude of this effect is substantial—the peeling forces can be reduced during manufacturing by a factor of two or more for hexagonal base lenses as compared to substantially circular base lenses.

The image contrast of the material can be enhanced by filling the lens interstitial spaces with a light absorbing (dark colored) opaque pigmented material, effectively forming a mask for the lenses. This eliminates the contrast reduction that arises from light scattered from the icon layer through the lens interstitial spaces. An additional effect of this interstitial fill is that the overall image becomes darker because incoming ambient illumination is blocked from passing through the interstitial spaces to the icon plane. The image clarity produced by lenses having aberrant focusing at their periphery can also be improved by an opaque pigmented interstitial fill, providing that this fill occludes the aberrant peripheral lens zone.

A different effect can be obtained by filling the lens interstitial spaces with a white or light colored material, or a material color matched to a substrate to be used with the Unison material. If the light colored lens interstitial fill is dense enough and the icon plane incorporates a strong contrast between the icon elements and the background, the Unison synthetic image will be substantially invisible when viewed with reflected light, yet will be distinctly visible when viewed in transmitted light from the lens side, but not visible when viewed from the icon side. This provides the novel security effect of having a one-way transmission image that is visible only in transmitted light and visible only from one side.

Fluorescing materials can be utilized in a lens interstitial coating instead of, or in addition to, visible light pigments to provide additional means of authentication.

FIG. 4 graphs the effects of changing the stereoscopic scale ratio, SSR (the icon element repeat period/the lens array repeat period), along an axis of the present material. Zones of the system having an SSR greater than 1.0000 will produce Unison Float and SuperFloat effects, zones having an SSR of substantially 1.0000 will produce Unison Motion orthoparallactic motion (OPM) effects, and zones having an SSR less than 1.0000 will produce Unison Deep and Unison Super-Deep effects. All of these effects can be produced and transitioned from one to another in a variety of ways along an axis of system film. This figure illustrates one of an infinite variety of such combinations. The dashed line 66 indicates the SSR value corresponding substantially to 1.0000, the dividing line between Unison Deep and Unison SuperDeep and Unison Float and Unison SuperFloat, and the SSR value which demonstrates OPM. In zone 68 the SSR of the Unison material is 0.995, creating a Unison Deep effect.

Adjacent to this is zone 70 in which the SSR is ramped from 0.995 up to 1.005, producing a spatial transition from a Unison Deep to a Unison Float effect. The SSR in the next zone 72 is 1.005 creating a Unison Float effect. The next zone 74 creates a smooth transition down from a Unison Float effect to a Unison Deep effect. Zone 76 proceeds stepwise up from a Unison Deep effect, to OPM, to a Unison Float effect, and zone 78 steps it back down to OPM. The variations in repeat period needed to accomplish these effects are generally most easily implemented in the icon element layer. In addition to varying the SSR in each zone, it may be desirable to vary the rotational angle of each zone of the arrays, preferably within the icon element array, to keep the synthetically magnified images substantially similar in size.

The easiest way to interpret this graph is to see it as a cross-section of the stereoscopic depth that will be perceived across this axis of a piece of system material. It is therefore possible to create a stereoscopically sculpted field of images, a contoured visual surface, by local control of the SSR and optionally by corresponding local control of the array rotational angle. This stereoscopically sculpted surface can be used to represent an unlimited range of shapes, including human faces. A pattern of icon elements that create the effect of a stereoscopically sculpted grid, or periodic dots, can be a particularly effective way to visually display a complex surface.

FIGS. 5a-c are plan views depicting the effect of rotating one array pattern with respect to the other in the production of material of the present system. FIG. 5a shows a lens array 80 having a regular periodic array spacing 82, without substantial change in the angle of the array axes. FIG. 5b shows an icon element array 84 with a progressively changing array axis orientation angle 86. If the lens array 80 is combined with the icon element array 84 by translating the lens array over the icon array, as drawn, then the approximate visual effect that results is shown in FIG. 5c. In FIG. 5c the material 88 created by combining lens array 80 and icon array 84 creates a pattern of synthetically magnified images 89, 90, 91 that vary in scale and rotation across the material. Towards the upper edge of the material 88 image 89 is large and shows a small rotation. Image 90, toward the upper middle section of material 88 is smaller and is rotated through a significant angle with respect to image 89. The different scales and rotations between images 89 and 91 are the result of the differences in the angular misalignment of the lens pattern 82 and the icon element pattern 86.

FIGS. 6a-c illustrate a method for causing one synthetically magnified OPM image 98 to morph into another synthetically magnified image 102 as the first image moves across a boundary 104 in the icon element patterns 92 and 94. Icon element pattern 92 bears circle-shaped icon elements 98, shown in the magnified inset 96. Icon element pattern 94 bears star-shaped icon elements 102, shown in the magnified inset 100. Icon element patterns 92 and 94 are not separate objects, but are joined at their boundary 104. When the material is assembled using this combined pattern of icon elements the resulting OPM images will show the morphing effects depicted in FIGS. 6b and c. FIG. 6b shows OPM circle images 98 moving to the right 107 across the boundary 104 and emerging from the boundary as star images 102 also moving to the right. Image 106 is in transition, part circle and part star, as it crosses the boundary. FIG. 6c of the figure shows the images after they have moved further to the right: image 98 is now closer to the boundary 104 and image 106 has almost completely crossed the boundary to complete its morphing from circle to star. The morphing effect can be accomplished in a less abrupt manner by creating a transition zone from one icon element pattern to the other, instead of having a hard boundary 104. In the transition zone the icons would gradually change from circle to star through a series of stages. The smoothness of the visual morphing of the resulting OPM images will depend on the number of stages used for the transition. The range of graphical possibilities is endless. For example: the transition zone could be designed to make the circle appear to shrink while sharp star points protruded up through it, or alternatively the sides of the circle could appear to dent inward to create a stubby star that progressively became sharper until it reached its final design.

FIGS. 7a-c are cross-sections of materials of the present system that illustrate alternative embodiments of the icon elements. FIG. 7a depicts a material having lenses 1 separated from icon elements 108 by optical spacer 5. Icon elements 108 are formed by patterns of colorless, colored, tinted, or dyed material applied to the lower surface of optical spacer 5. Any of the multitude of common printing methods, such as ink jet, laserjet, letterpress, flexo, gravure, and intaglio, can be used to deposit icon elements 108 of this kind so long as the print resolution is fine enough.

FIG. 7b depicts a similar material system with a different embodiment of icon elements 112. In this embodiment the icon elements are formed from pigments, dyes, or particles embedded in a supporting material 110. Examples of this embodiment of icon elements 112 in supporting material 110 include: silver particles in gelatin, as a photographic emulsion, pigmented or dyed ink absorbed into an ink receptor coating, dye sublimation transfer into a dye receptor coating, and photochromic or thermochromic images in an imaging film.

FIG. 7c depicts a microstructure approach to forming icon elements 114. This method has the benefit of almost unlimited spatial resolution. The icon elements 114 can be formed from the voids in the microstructure 113 or the solid regions 115, singly or in combination. The voids 113 can optionally be filled or coated with another material such as evaporated metal, material having a different refractive index, or dyed or pigmented material.

FIGS. 8a,b depict positive and negative embodiments of icon elements. FIG. 8a shows positive icon elements 116 that are colored, dyed, or pigmented 120 against a transparent background 118. FIG. 8b shows negative icon elements 122 that are transparent 118 against a colored, dyed, or pigmented background 120. A material of the present system may optionally incorporate both positive and negative icon elements. This method of creating positive and negative icon elements is particularly well adapted to the microstructure icon elements 114 of FIG. 7c.

Figure 9:
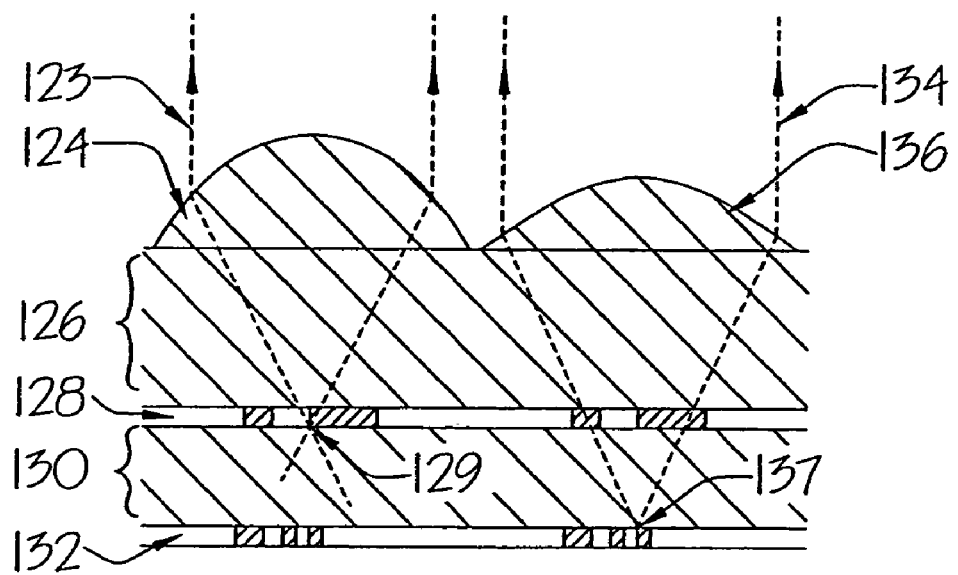
FIG. 9 is a cross-section view illustrating an embodiment of a multi-level material for creating regions of a synthetically magnified image having different properties.

FIG. 9 shows a cross-section of one embodiment of a pixel-zone material of the present system. This embodiment includes zones with lenses 124 having a short focus and other zones with lenses having a long focus 136. The short focus lenses 124 project images 123 of icon elements 129 in icon plane 128 disposed at the focal plane of lenses 124. The long focus lenses 136 project images 134 of icon elements 137 in icon plane 132 disposed at the focal plane of lenses 136. Optical separator 126 separates short focus lenses 124 from their associated icon plane 128. Long focus lenses 136 are separated from their associated icon plane 132 by the sum of the thicknesses of optical separator 126, icon plane 128, and second optical separator 130. Icon elements 137 in the second icon plane 132 are outside the depth of focus of short focus lenses 124 and therefore do not form distinct synthetically magnified images in the short focus lens zones. In a similar manner, icon elements 129 are too close to long focus lenses 136 to form distinct synthetically magnified images. Accordingly, zones of material bearing short focus lenses 124 will display images 123 of the icon elements 129, while zones of material bearing long focus lenses 136 will display images 134 of icon elements 137. The images 123 and 134 that are projected can differ in design, color, OPM direction, synthetic magnification factor, and effect, including the Deep, Unison, Float, and Levitate effects described above.

Figure 10:
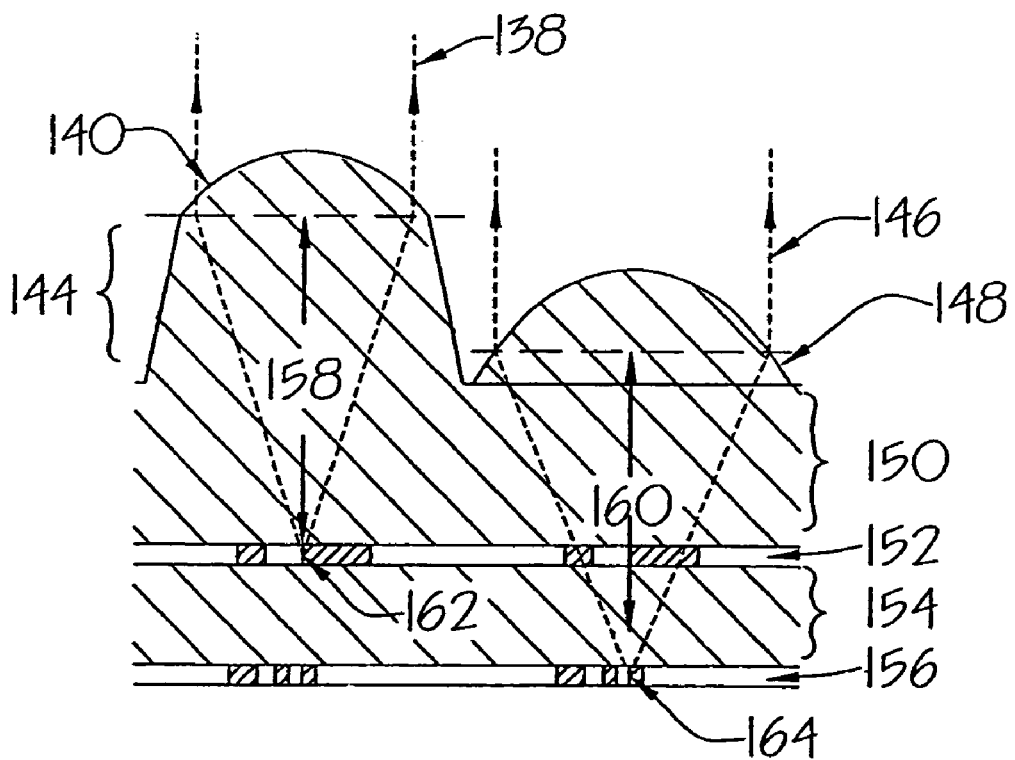
FIG. 10 is a cross-section view illustrating another embodiment of a multi-level material for creating regions of a synthetically magnified image having different properties.

FIG. 10 is a cross-section of an alternate embodiment of a pixel-zone material of the present system. This embodiment includes zones with lenses 140 elevated by a lens support mesa 144 above the bases of the non-elevated lenses 148. The focal length of the elevated lenses 140 is the distance 158, placing the focus of these lenses in the first icon plane 152. The focal length of the non-elevated lenses 148 is the distance 160, placing the focus of these lenses in the second icon plane 156. These two focal lengths, 158 and 160, may be chosen to be similar or dissimilar. The elevated lenses 140 project images 138 of icon elements 162 in icon plane 152 disposed at the focal plane of lenses 140. The non-elevated lenses 148 project images 146 of icon elements 164 in icon plane 156 disposed at the focal plane of lenses 148. The elevated lenses 140 are separated from their associated icon elements 162 by the sum of the thickness of the lens support mesa 144 and the optical separation 150. The non-elevated lenses 148 are separated from their associated icon elements 164 by the sum of the thickness of the optical separation 150, the icon layer 152, and the icon separator 154. Icon elements 164 in the second icon plane 156 are outside the depth of focus of the elevated lenses 140 and therefore do not form distinct synthetically magnified images in the elevated lens zones. In a similar manner, icon elements 152 are too close to non-elevated lenses 148 to form distinct synthetically magnified images. Accordingly, zones of material bearing elevated lenses 140 will display images 138 of the icon elements 162, while zones of material bearing non-elevated lenses 136 will display images 146 of icon elements 156. The images 138 and 146 that are projected can differ in design, color, OPM direction, synthetic magnification factor, and effect, including Deep, Unison, Float, and Levitate effects.

FIGS. 11a,b are cross-sections illustrating non-refractive embodiments of the present system. FIG. 11a illustrates an embodiment that utilizes a focusing reflector 166 instead of a refractive lens to project images 174 of icon elements 172. The icon layer 170 lies between the viewer's eyes and the focusing optics. Focusing reflectors 166 can be metallized 167 to obtain high focusing efficiency. The icon layer 170 is maintained at a distance equal to the focal length of the reflectors by optical separator 168. FIG. 11b discloses a pinhole optics embodiment of this material. Opaque upper layer 176, preferably black in color for contrast enhancement, is pierced by apertures 178. Optical separator element 180 controls the field of view of the system. Icon elements 184 in icon layer 182 are imaged through apertures 178 in a manner similar to the pinhole optics of a pinhole camera. Because of the small amount of light passed through the apertures, this embodiment is most effective when it is back-illuminated, with light passing through the icon plane 182 first, then through the apertures 178. Effects of each of the above-described embodiments, OPM, Deep, Float, and Levitate, can be created using either the reflective system design or the pinhole optics system design.

FIGS. 12a,b are cross-sections comparing the structures of an all-refractive material 188 with a hybrid refractive/reflective material 199. FIG. 12a depicts an exemplary structure, with micro-lenses 192 separated from the icon plane 194 by optical separator 198. Optional sealing layer 195 contributes to the total refractive system thickness 196. Lenses 192 project icon images 190 toward the viewer (not shown). Hybrid refractive/reflective material 199 includes micro-lenses 210 with icon plane 208 directly beneath them. Optical spacer 200 separates the lenses 210 and the icon plane 208 from reflective layer 202. Reflective layer 202 can be metallized, such as by evaporated or sputtered aluminum, gold, rhodium, chromium, osmium, depleted uranium or silver, by chemically deposited silver, or by multi-layer interference films. Light scattered from icon layer 208 reflects from reflective layer 202, passes through icon layer 208 and into lenses 210 which project images 206 toward the viewer (not shown). Both of these figures are drawn to approximately the same scale: by visual comparison it can be seen that the total system thickness 212 of the hybrid refractive/reflective system 199 is about half the total system thickness 196 of the all-refractive system 188. Exemplary dimensions for equivalent systems are 29 μ total refractive system 188 thickness 196 and 17 μ for total hybrid refractive/reflective system 199 thickness 212. The thickness of a refractive/reflective system can be further reduced by scaling. Thus, a hybrid system having lenses 15 μ in diameter can be made with a total thickness of about 8 μ. Effects of each of the above described embodiments, OPM, Deep, Float, Levitate, Morph, and 3-D can be created using the hybrid refractive/diffractive design.

Figure 13:
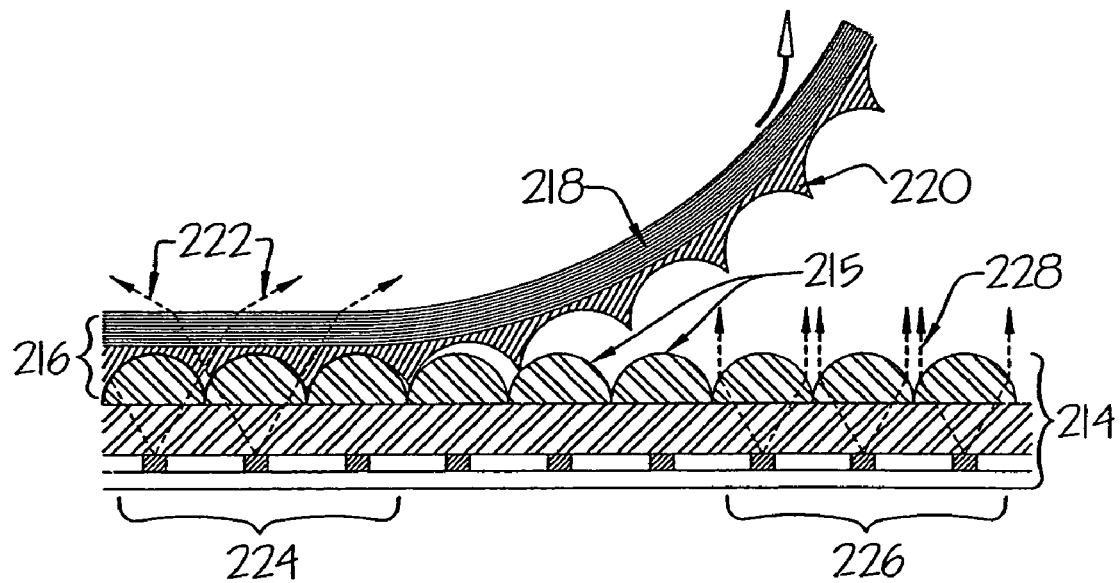
FIG. 13 is a cross-section view showing a 'peel-to-reveal' tamper-indicating material embodiment.

FIG. 13 is a cross-section showing a 'peel-to-reveal' tamper-indicating material embodiment of the present system. This embodiment does not display an image until it is tampered with. The untampered structure is shown in region 224, where a refractive system 214 is optically buried under a top layer 216 consisting of an optional substrate 218 and a peelable layer 220 which is conformal to the lenses 215. Peelable layer 220 effectively forms negative lens structures 220 that fit over positive lenses 215 and negate their optical power. Lenses 215 cannot form images of the icon layer in the untampered region, and the light scattered 222 from the icon plane is unfocused. Top layer 216 may include an optional film substrate 218. Tampering, shown in region 226, causes the release of top layer 216 from the refractive system 214, exposing the lenses 215 so that they can form images 228. Effects of each of the above described embodiments, OPM, Deep, Float, and Levitate, can be included in a tamper indicating 'peel-to-reveal' system of the type of FIG. 13.

Figure 14:
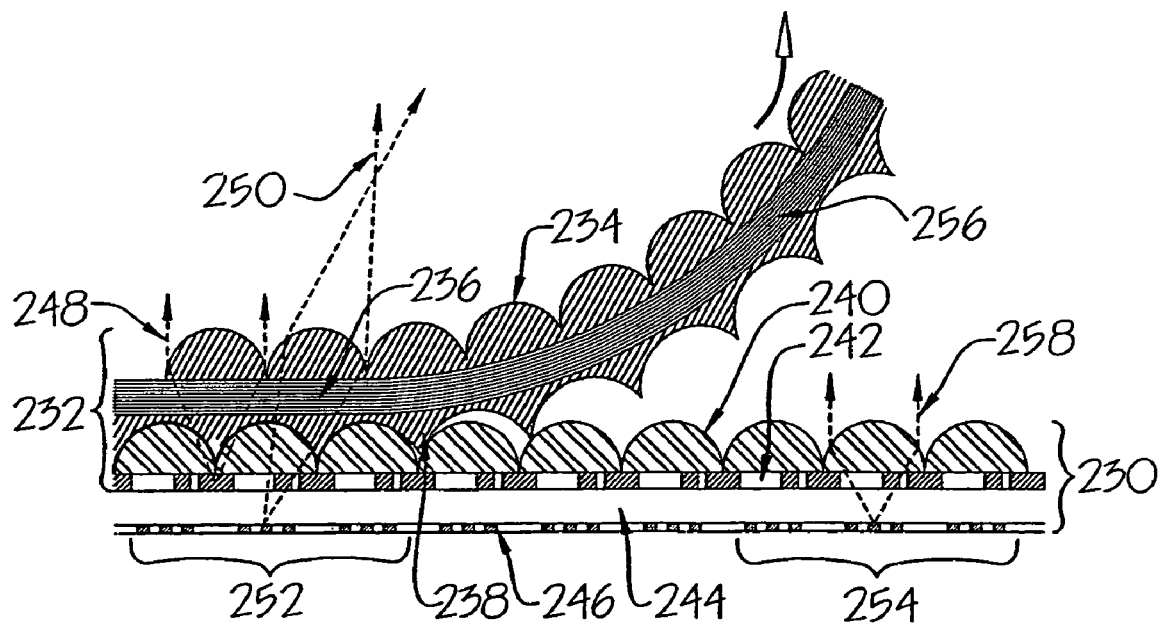
FIG. 14 is a cross-section view illustrating a 'peel-to-change' tamper-indicating material embodiment.

FIG. 14 is a cross-section illustrating a 'peel-to-change' tamper-indicating material embodiment of the present system. This embodiment displays a first image 248 of a first icon plane 242 prior to tampering 252, then displays a second image 258 at region 254 after it has been tampered with. The untampered structure is shown in region 252, where two refractive systems, 232 and 230, are stacked. The first icon plane 242 is located beneath the lenses 240 of the second system. Prior to tampering in region 252 the first, or upper, system 232 presents images of the first icon plane 242. The second icon plane 246 is too far outside the depth of focus of lenses 234 to form distinct images. The first lenses 234 are separated from the second lenses 240 by an optional substrate 236 and a peelable layer 238 which is conformal to the second lenses 240. Peelable layer 232 effectively forms negative lens structures 238 that fit over positive lenses 240 and negate their optical power. Top layer 232 may include optional film substrate 236. Tampering results in the peeling 256 of the top layer 232, shown in region 254, from the second refractive system 230, exposing the 20 second lenses 240 so that they can form images 258 of the second icon layer 246. Second lenses 240 do not form images of the first icon layer 242 because the icon layer is too close to the lenses 240.

This embodiment of a tamper indicating material is well suited to application as a tape or label applied to an article. Tampering releases the top layer 232, leaving the second system 230 attached to the article. Prior to tampering, this embodiment presents a first image 248. After tampering 254 the second system 230, still attached to the article, presents a second image 258 while the peeled layer 256 presents no image at all. Effects of each of the above described embodiments, OPM, Deep, Float, and Levitate, can be included in either the first system 232 or the second system 230.

Note that an alternative embodiment accomplishing a similar effect to that of FIG. 14 is to have two separate systems laminated to each other. In this embodiment when the upper layer is peeled it takes the first icon plane and its image(s) with it, revealing the second system and its image(s).

FIGS. 15a-d are cross-sections showing various two-sided embodiments of the present system. FIG. 15a depicts a two-sided material 260 that includes a single icon plane 264 that is imaged 268 by lenses 262 on one side and imaged 270 by a second set of lenses 266 on the opposite side. The image 268 seen from the left side (as drawn) is the mirror image of the image 270 seen from the right side. Icon plane 264 may contain icon elements that are symbols or images which appear similar in mirror image, or icon elements which appear different in mirror image, or combinations of icon elements wherein a portion of the icon elements are correct-reading when viewed from one side and the other icon elements are correct-reading when viewed from the other side. Effects of each of the above described embodiments, OPM, Deep, Float, and Levitate, can be displayed from either side of a two-sided material according to this embodiment.

FIG. 15b illustrates another two-sided embodiment 272 having two icon planes 276 and 278 that are imaged, 282 and 286 respectively, by two sets of lenses, 274 and 280 respectively. This embodiment is essentially two separate systems, 287 and 289, such as illustrated in FIG. 1a, that have been joined together with an icon layer spacer 277 in between them. The thickness of this icon layer spacer 277 will determine the degree that the 'wrong' icon layer is imaged 284 and 288 by a set of lenses. For example, if the thickness of icon layer spacer 277 is zero, such that icon layers 276 and 278 are in contact, then both icon layers will be imaged by both sets of lenses 274 and 280. In another example, if the thickness of icon layer spacer 277 is substantially larger than the depth of focus of lenses 274 and 280, then the 'wrong' icon layers will not be imaged by the lenses 274 and 280. In yet another example, if the depth of focus of one set of lenses 274 is large, but the depth of focus of the other set of lenses is small (because the lenses 274 and 280 have different F#'s), then both icon planes 276 and 278 will be imaged 282 through lenses 274 but only one icon plane 278 will be imaged through lenses 280, so a material of this type would show two images from one side but only one of those images, mirrored, from the opposite side. Effects of each of the above described embodiments, OPM, Deep, Float, and Levitate, can be displayed from either side of a two-sided material according to this embodiment, and the projected images 282 and 286 can be of the same or different colors.

FIG. 15c shows yet another two-sided material 290 having a pigmented icon layer spacer 298 that blocks the lenses on one side of the material from seeing the 'wrong' set of icons. Lenses 292 image 294 icon layer 296 but cannot image icon layer 300 because of the presence of pigmented icon layer 298. Similarly, lenses 302 image 304 icon layer 300, but cannot image icon layer 296 because of the presence of pigmented icon layer 298. Effects of each of the above described embodiments, OPM, Deep, Float, and Levitate, can be displayed from either side of a two-sided material according to this embodiment, and the projected images 294 and 304 can be of the same or different colors.

FIG. 15d discloses a further two-sided material 306 embodiment having lenses 308 that image 318 icon layer 314 and lenses 316 on the opposite side that image 322 icon layer 310. Icon layer 310 is close to, or substantially in contact with, the bases of lenses 308 and icon layer 314 is close to, or substantially in contact with, the bases of lenses 316. Icons 310 are too close to lenses 308 to form an image, so their light scatters 320 instead of focusing. Icons 314 are too close to lenses 316 to form an image, so their light scatters 324 instead of focusing. Effects of each of the above described embodiments, OPM, Deep, Float, and Levitate, can be displayed from either side of a two-sided material according to this embodiment, and the projected images 318 and 322 can be of the same or different colors.

FIGS. 16a-f are cross-sections and corresponding plan views illustrating three different methods for creating grayscale or tonal icon element patterns and subsequent synthetically magnified images with the present system. FIGS. 16a-c are cross-section details of the icon side of a material 307, including part of optical separator 309 and a transparent micro structured icon layer 311. The icon elements are formed as bas-relief surfaces 313, 315, 317 that are then filled with a pigmented or dyed material 323, 325, 327 respectively. The underside of the icon layer may be optionally sealed by a sealing layer 321 that can be transparent, tinted, colored, dyed, or pigmented, or opaque. The bas-relief micro structures of icon elements 313, 315, and 317 provide thickness variations in the dyed or pigmented fill material, 323, 325, and 327 respectively, that create variations in the optical density of the icon element as seen in plan view. The plan views corresponding to icon elements 323, 325, and 327 are plan views 337, 339, and 341. The use of this method to create grayscale or tonal synthetically magnified images is not limited to the specifics of the examples disclosed here, but may be generally applied to create an unlimited variety of grayscale images.

FIG. 16 a includes icon element 313, dyed or pigmented icon element fill 323, and corresponding plan view 337. The cross section view of the icon plane at the top of this figure can only show one cutting plane through the icon elements. The location of the cutting plane is indicated by the dashed line 319 through the plane views 337, 339, and 341. Accordingly, the cross-section of icon element 313 is one plane through a substantially hemispherical-shaped icon element. By suitably limiting the overall dye or pigment density of the fill 323, thickness variations of the dyed or pigmented fill 323 create a tonal, or grayscale, optical density variations represented in the plan view 337. An array of icon elements of this type can be synthetically magnified within the present material system to produce images that show equivalent grayscale variations.

FIG. 16b includes icon element 315, dyed or pigmented icon element fill 325, and corresponding plan view 339. Plan view 339 shows that the icon element 315 is a bas-relief representation of a face. The tonal variations in an image of a face are complex, as shown by the complex thickness variations 325 in the cross-section view. As disclosed with regard to icon element 313, an array of icon elements of this type, as shown by 315, 325, and 339, can be synthetically magnified within the present material system to produce images that show equivalent grayscale variations representing, in this example, the image of a face.

FIG. 16c includes icon element 317, dyed or pigmented fill 327, and corresponding plan view 341. In a manner similar to the discussion of FIGS. 16a,b, above, the bas-relief shape of this icon element structure produces a tonal variation in the appearance of the dyed and pigmented fill 327 and in the synthetically magnified image produced by the present material system. Icon element 317 illustrates a method for creating a bright center in a rounded surface, as compared to the effect of icon element 313 which creates a dark center in a rounded surface.

FIGS. 16d,e disclose another embodiment 326 of transparent bas-relief micro structured icon layer 311 including icon elements 329 and 331 that are coated with a high refractive index material 328. The icon layer 311 can be sealed with an optional sealing layer 321 that fills the icon elements 329 and 331, 330 and 332, respectively. The high refractive index layer 328 enhances the visibility of sloping surfaces by creating reflections from them by total internal reflection. Plan views 342 and 344 present representative images of the appearance of icon elements 329 and 331 and their synthetically magnified images. This high refractive index coating embodiment provides a kind of edge-enhancement effect without adding pigment or dye to make the icons and their images visible.

FIG. 16f discloses yet another embodiment 333 of transparent bas-relief micro structured icon 335 utilizing an air, gas, or liquid volume 336 to provide visual definition for this phase interface 334 microstructure. Optional sealing layer 340 may be added with or without optional adhesive 338 to entrap the air, gas, or liquid volume 336. The visual effect of a phase interface icon element is similar to that of a high refractive index coated icon element 329 and 331.

FIGS. 17a-d are cross-sections showing the use of the present system as a laminating film in conjunction with printed information, such as may be utilized in the manufacture of I.D. cards and driver's licenses, wherein the material 348 (consisting of the coordinated micro-array of lenses and images described above) covers a substantial proportion of the surface. FIG. 17a depicts an embodiment of Unison used as a laminate over print 347. Material 348 having at least some optical transparency in the icon layer is laminated to fibrous substrate 354, such as paper or paper substitute, with lamination adhesive 350, covering or partly covering print element 352 that had previously been applied to the fibrous substrate 354. Because the material 348 is at least partially transparent, the print element 352 can be seen through it and the effect of this combination is to provide the dynamic image effect of the present system in combination with the static print.

FIG. 17b shows an embodiment of the system material used as a laminate over a print element 352 applied to a nonfibrous substrate 358, such as a polymer film. As in FIG. 17a, material 348 having at least some optical transparency in the icon layer is laminated to nonfibrous substrate 358, such as polymer, metal, glass, or ceramic substitute, with lamination adhesive 350, covering or partly covering print element 352 that had previously been applied to the nonfibrous substrate 354. Because the material 348 is at least partially transparent, the print element 352 can be seen through it and the effect of this combination is to provide the dynamic image effect in combination with the static print.

FIG. 17c depicts the use of a print element directly on the lens side of material 360. In this embodiment material 348 has print element 352 directly applied to the upper lens surface. This embodiment does not require that the material be at least partly transparent: the print element 352 lies on top of the material and the dynamic image effects can be seen around the print element. In this embodiment the material 348 is used as the substrate for the final product, such as currency, ID cards, and other articles requiring authentication or providing authentication to another article.

FIG. 17d depicts the use of a print element directly on the icon side of an at-least partially transparent material 362. Print element 352 is applied directly to the icon layer or sealing layer of an at-least partially transparent system material 348. Because the system material 348 is at least partially transparent, the print element 352 can be seen through it and the effect of this combination is to provide the dynamic image effect in combination with the static print. In this embodiment the system material 348 is used as the substrate for the final product, such as currency, ID cards, and other articles requiring authentication or providing authentication to another article.

Each of the embodiments of FIGS. 17a-d can be used singly or in combination. Thus, for example, a system material 348 can be both overprinted (FIG. 17c) and backside printed (FIG. 17d), then optionally laminated over print on a substrate (FIGS. 17a,b). Combinations such as these can further increase the counterfeiting, simulation, and tampering resistance of the material of the present system.

FIGS. 18a-f are cross-sections illustrating the application of the present system to, or incorporation into, various substrates and in combination with printed information. The embodiments of FIGS. 18a-f differ from those of FIGS. 17a-d in that the former figures disclose system material 348 that covers most or all of an article, whereas the present figures disclose embodiments wherein the system material or its optical effect do not substantially cover a whole surface, but rather cover only a portion of a surface. FIG. 18a depicts a piece of at-least partially transparent system material 364 adhered to a fibrous or non-fibrous substrate 368 with adhesive element 366. Optional print element 370 has been directly applied to the upper, lens, surface of material 364. Print element 370 may be part of a larger pattern that extends beyond the piece of material 364. The piece of material 364 is optionally laminated over print element 372 that was applied to the fibrous or non-fibrous substrate prior to the application of the material 364.

FIG. 18b illustrates an embodiment of single-sided system material 364 incorporated into an non-optical substrate 378 as a window, wherein at least some of the edges of the system material 364 are captured, covered, or enclosed by the non-optical substrate 378. Print elements 380 may be optionally applied on top of the system material lens surface and these print elements may be aligned with, or correspond to, print elements 382 applied to the non-optical substrate 378 in the area adjacent to print element 380. Similarly, print elements 384 can applied to the opposite side of the non-optical substrate aligned with, or corresponding to, print elements 386 applied to the icon or sealing layer 388 of the system material 364. The effect of a window of this kind will be to present distinct images when the material is viewed from the lens side and no images when viewed from the icon side, providing a one-way image effect.

FIG. 18c shows a similar embodiment to that of FIG. 18b, except that the system material 306 is double-sided material 306 (or other double-sided embodiment described above). Print elements 390, 392, 394, and 396 substantially correspond in function to print elements 380, 382, 384, 386, previously described. The effect of a material window of this kind will be to present different distinct images when the material is viewed from opposite sides. For example, a window incorporated into a currency paper could display the numerical denomination of the bill, such as "10" when viewed from the face side of the bill, but when viewed from the back side of the bill the Unison window could display different information, such as "USA", that may be in the same color as the first image or a different color.

FIG. 18d illustrates a transparent substrate 373 acting as the optical spacer for a material formed by a zone of lenses 374 of limited extent and an icon layer 376 extending substantially beyond the periphery of the zone of lenses 374. In this embodiment the present effects will only be visible in that zone that includes both lenses and icons (corresponding to lens zone 374 in this figure). Both the lenses 374 and the adjacent substrate may optionally be printed 375, and print elements may also be applied to the icon layer 376 or to an optional sealing layer covering the icons (not indicated in this figure—see FIG. 1). Multiple lens zones can be used on an article after the manner of this embodiment; wherever a lens zone is placed the Unison effects will be seen; the size, rotation, stereoscopic depth position, and OPM properties of the images can be different for each lens zone. This embodiment is well suited for application to ID cards, credit cards, drivers' licenses, and similar applications.

FIG. 18e shows an embodiment that is similar to that of FIG. 18d, except that the icon plane 402 does not extend substantially beyond the extent of the lens zone 400. Optical spacer 398 separates the lenses 400 from the icons 402. Print elements 404 and 406 correspond to print elements 375 and 377 in FIG. 18d. Multiple zones 400 can be used on an article after the manner of this embodiment; each zone can have separate effects. This embodiment is well suited for application to ID cards, credit cards, drivers' licenses, and similar applications.

FIG. 18f depicts an embodiment that is similar to FIG. 18d except that the present embodiment incorporates optical spacer 408 that separates lenses 413 from icon plane 410. Lenses 413 extend substantially beyond the periphery of the icon zone 412. Print elements 414 and 416 correspond to print elements 375 and 377 in FIG. 18d. Multiple lens zones can be used on an article after the manner of this embodiment; wherever a lens zone is placed the present effects will be seen; the size, rotation, stereoscopic depth position, and OPM properties of the images can be different for each lens zone. This embodiment is well suited for application to ID cards, credit cards, drivers' licenses, and similar applications.

FIGS. 19a,b illustrate cross-sectional views comparing the in-focus field of view of a spherical lens with that of a flat field aspheric lens when each are incorporated into a structure of the type described above. FIG. 19a illustrates a substantially spherical lens as applied in a system as described above. Substantially spherical lens 418 is separated from icon plane 422 by optical spacer 420. Image 424 projected out perpendicular to the surface of the material originates at focal point 426 within the icon layer 422. The image 424 is in sharp focus because the focal point 426 is within the icon layer 422. When the lens is viewed from an oblique angle, then image 428 is blurry and out of focus because the corresponding focal point 430 is no longer in the icon plane, but is above it a substantial distance. Arrow 432 shows the field curvature of this lens, equivalent to the sweep of the focal point from 426 to 430. The focal point is within the icon plane throughout the zone 434, then moves outside of the icon plane in zone 436. Lenses which are well suited to application in coordination with a plane of printed images or icons typically have a low F#, typically less than 1, resulting in a very shallow depth of focus—higher F# lenses can be used effectively with Deep and Float effects, but cause proportionate vertical binocular disparity with effects described herein when used with Unison Motion effects. As soon as the lower limit of the depth of focus moves outside of the icon plane the image clarity degrades rapidly. From this figure it can be seen that the field curvature of a substantially spherical lens limits the field of view of the image: the image is distinct only within the in-focus zone 434, rapidly going out of focus for more oblique viewing angles. Substantially spherical lenses are not flat-field lenses, and the field curvature of these lenses is amplified for low F# lenses.

FIG. 19b illustrates an aspheric lens as applied to the present system. As an aspheric lens, its curvature is not approximated by a sphere. Aspheric lens 438 is separated from icon layer 442 by optical spacer 440. Aspheric lens 438 projects image 444 of icon plane 442 normal to the plane of the material. The image originates at focal point 446. The focal length of aspheric lens 438 lies within the icon plane 442 for a wide range of viewing angles, from normal 444 to oblique 448, because it has a flat-field 452. The focal length of the lens varies according to the angle of view through it. The focal length is shortest for normal viewing 444 and increases as the viewing angle becomes more oblique. At the oblique viewing angle 448 the focal point 450 is still within the thickness of the icon plane, and the oblique image is therefore still in focus for this oblique viewing angle 448. The in-focus zone 454 is much larger for the aspheric lens 438 than the in-focus zone 434 of the substantially spherical lens 418. The aspheric lens 438 thus provides an enlarged field of view over the width of the associated image icon so that the peripheral edges of the associated image icon do not drop out of view compared to that of the spherical lens 418. Aspheric lenses are preferred for the present system because of the larger field of view they provide and the resulting increase in visibility of the associated images.

FIGS. 20a-c are cross-sections illustrating two benefits of utility which result from the use of a thick icon layer. These benefits apply whether the lens 456 used to view them is substantially spherical 418 or aspheric 438, but the benefits are greatest in combination with aspheric lenses 438. FIG. 20a illustrates a thin icon layer 460 system material including lenses 456 separated from icon layer 460 by optical spacer 458. Icon elements 462 are thin 461 in comparison to the field curvature of the lens 463, limiting the in-focus zone to a small angle, the angle between the image projected in the normal direction 464 and the highest oblique angle image 468 that has a focal point 470 within the icon layer 460. The greatest field of view is obtained by designing the normal image focus 466 to lie at the bottom of the icon plane, thereby maximizing the oblique field of view angle, limited by the point at which the focal point 470 lies at the top of the icon plane. The field of view of the system in FIG. 20a is limited to 30 degrees.

FIG. 20b illustrates the benefits obtained from the incorporation of an icon plane 471 that is thick 472 in comparison to the field curvature of lens 456. Lenses 456 are separated from thick icon elements 474 by optical spacer 458. Thick icon elements 474 remain in focus 475 over a larger field of view, 55 degrees, than the thin icon elements 462 of FIG. 20a. The normal image 476 projected through lenses 456 from focal point 478 is in clear focus, and the focus remains clear while the angle of view increases all the way up to 55 degrees, where oblique image 480 focal point 482 lies at the top of the thick icon plane 471. The increased field if view is greatest for a flat-field lens, such as the aspheric lens 438 of FIG. 19b.

FIG. 20c illustrates yet another advantage of a thick icon plane 492; reducing the sensitivity of the present system material to variations in thickness S that may result from manufacturing variations. Lens 484 is spaced a distance S from the bottom surface of icon layer of thickness i. Lens 484 projects image 496 from focal point 498 disposed at the bottom of icon layer 492. This figure is drawn to demonstrate that variations in the optical space S between the lenses and the icon layer can vary over a range equal to the thickness of the icon layer i without loss of image 496, 500, 504 focus. At lens 486 the optical spacer thickness is about (S+i/2) and the focal point 502 of image 500 is still within the thickness i of icon layer 492. At lens 488 the thickness of the optical spacer has increased to (S+i) 490 and the focal point 506 of image 504 lies at the top of thick icon element 494. The optical spacer thickness can therefore vary over a range corresponding to the thickness of the icon layer i: a thin icon layer therefore provides a small tolerance for optical spacer thickness variations and a thick icon layer provides a larger tolerance for optical spacer thickness variations.

An additional benefit is provided by a thick icon layer 492. Imperfect lenses, such as substantially spherical lenses, may have a shorter focal length 493 towards their edges than at their center 496. This is one aspect of the common spherical aberration defect of substantially spherical lenses. A thick icon layer provides an icon element that can be clearly focused over a range of focal lengths, 498 to 495, thereby improving the overall clarity and contrast of an image produced by a lens 484 having focal length variations.

FIG. 21 is a plan view that shows the application of the present system to currency and other security documents as a 'windowed' security thread. FIG. 21 shows a windowed thread structure including system material 508 that has been slit into a ribbon, referred to as a "thread", that is typically in the range of 0.5 mm to 10 mm in width. Thread 508 is incorporated into the fibrous document substrate 510 and provides windowed zones 514. The thread 508 may optionally incorporate a pigmented, dyed, filled, or coated sealing layer 516 to increase image contrast and/or to provide additional security and authentication features, such as electrical conductivity, magnetic properties, nuclear magnetic resonance detection and authentication, or to hide the material from view in reflected illumination when viewed from the back side of the substrate (the side opposite the side presenting the Unison synthetic images and an adhesive layer 517 to strengthen the bond between the thread 508 and the fibrous substrate 510. The thread 508 is maintained in an orientation to keep the lenses uppermost so that the image effects are visible in the windowed zones 514. Both the fibrous substrate 510 and the thread may be overprinted by print elements 518 and the fibrous substrate may be printed 520 on its opposite face.

Figure 22:
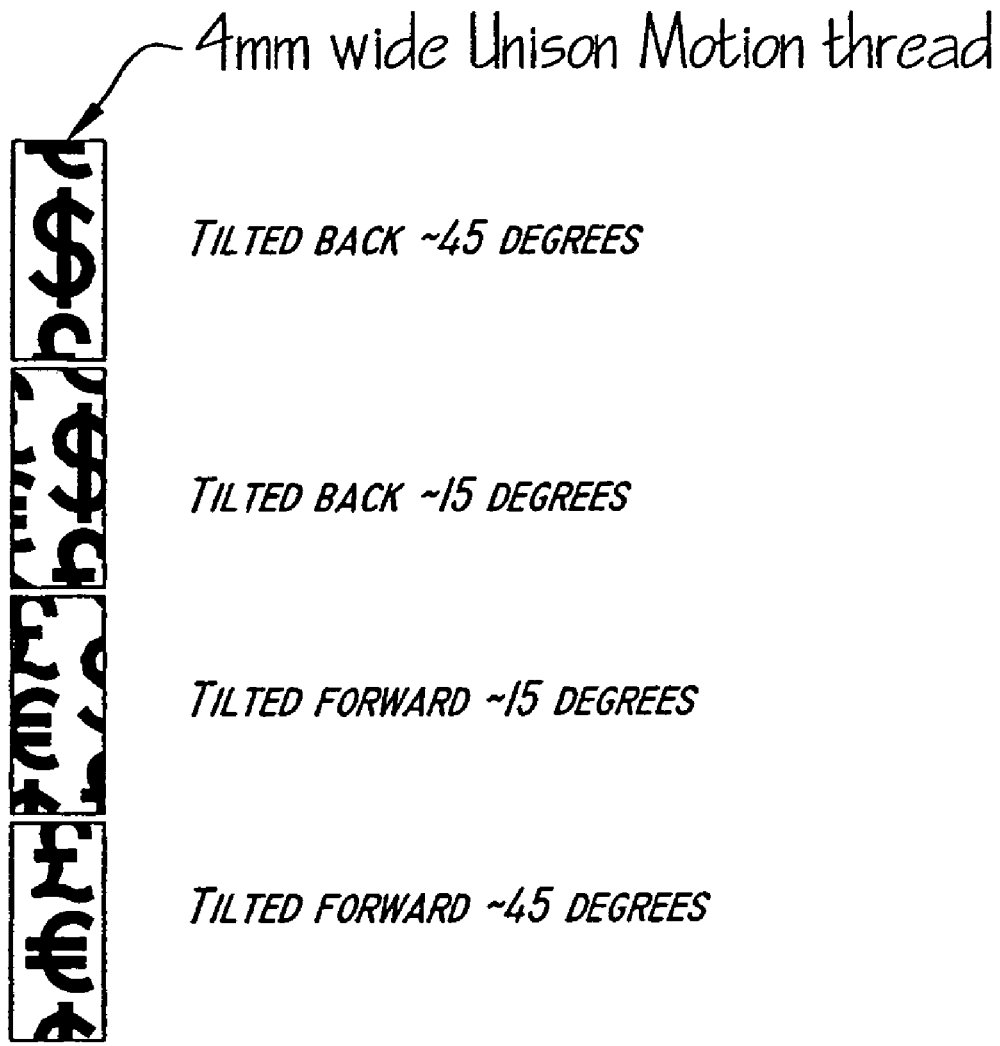
FIG. 22 illustrates the orthoparallactic motion embodiment of the present system of images in connection with a "windowed" security thread.

FIG. 21 illustrates that thread 508 and its image effects 522 are only visible from the upper surface 521 of the substrate 510 in the windowed zones 514. Thread 508 is covered by fibrous substrate material at the inside zones 512 and the image effects 522 are not substantially visible in these zones. OPM effects are particularly dramatic when incorporated into thread 508. (See FIG. 22) As the fibrous substrate 510 is tilted in various directions the OPM image can be made to scan across the width 524 of the thread, producing a startling and dramatic visual effect. This scanning feature of an OPM image makes it possible to present image 522 which is larger than the width of the thread 508. The user examining the document containing a windowed thread 508 can then tilt the document to scan the whole image across the thread, scrolling it like a marquee sign. The effects of the Deep, Float, and Levitate embodiments can also be used to advantage in a windowed thread format.

The thread 508 may be at least partially incorporated in security papers during manufacture by techniques commonly employed in the paper-making industry. For example, thread 508 may be pressed within wet papers while the fibers are unconsolidated and pliable, as taught by U.S. Pat. No. 4,534, 398 which is incorporated herein by reference.

The windowed thread of the present system is particularly well suited for application to currency. A typical total thickness for the thread material is in the range of 22 μ to 34 μ, while the total thickness of currency paper may range as high as 88 μ. It is possible to incorporate a windowed security thread of the present system into currency paper without substantially altering the total thickness of the paper by locally reducing the thickness of the paper by an amount equivalent to the thickness of the thread.

In an exemplary embodiment, thread 508 comprises:
(a) one or more optical spacers;
(b) one or more optionally periodic planar arrays of micro-images or icons positioned within, on, or next to an optical spacer; and
(c) one or more optionally periodic planar arrays of non-cylindrical micro lenses positioned on or next to either an optical spacer or a planar icon array, with each microlens having a base diameter of less than 50 microns.

In another embodiment, the micro-images or icons constitute filled voids or recesses that are formed on a surface of the one or more optical spacers, while the non-cylindrical micro-lenses are aspheric micro-lenses, with each aspheric micro-lens having a base diameter ranging from about 15 to about 35 microns. At least one pigmented sealing or obscuring layer 516 may be positioned on the planar array(s) of micro-images or icons for increasing contrast and thus visual acuity of the icons and also for masking the presence of thread 508 when the thread is at least partially embedded in a security document.

In yet another embodiment of the present invention, thread 508 comprises:
(a) an optical spacer having opposing upper and lower planar surfaces;
(b) a periodic array of micro-images or icons comprising filled recesses formed on the lower planar surface of the optical spacer;

(c) a periodic array of non-cylindrical, flat field, aspheric or polygonal base multi-zonal micro-lenses positioned on the upper planar surface of the optical spacer, wherein each micro-lens have a base diameter ranging from about 20 to about 30 microns; and (d) a pigmented sealing or obscuring layer 516 positioned on the icon array.

The optical spacer(s) may be formed using one or more essentially colorless polymers including, but not limited to, polyester, polypropylene, polyethylene, polyethylene terephthalate, polyvinylidene chloride, and the like. In an exemplary embodiment, the optical spacer(s) is formed using polyester or polyethylene terephthalate and has a thickness ranging from about 8 to about 25 microns.

The icon and micro-lens arrays can be formed using substantially transparent or clear radiation curable material including, but not limited to acrylics, polyesters, epoxies, urethanes and the like. Preferably, the arrays are formed using acrylated urethane which is available from Lord Chemicals under the product designation U107.

The icon recesses formed on the lower planar surface of the optical spacer each measures from about 0.5 to about 8 microns in depth and typically 30 microns in micro-image or icon width. The recesses can be filled with any suitable material such as pigmented resins, inks, dyes, metals, or magnetic materials. In an exemplary embodiment, the recesses are filled with a pigmented resin comprising a sub-micron pigment which is available from Sun Chemical Corporation under the product designation Spectra Pac.

The pigmented sealing or obscuring layer 516 can be formed using one or more of a variety of opacifying coatings or inks including, but not limited to, pigmented coatings comprising a pigment, such as titanium dioxide, dispersed within a binder or carrier of curable polymeric material. Preferably, the sealing or obscuring layer 516 is formed using radiation curable polymers and has a thickness ranging from about 0.5 to about 3 microns.

Thread 508, which is described above, may be prepared in accordance with the following method:

(a) applying a substantially transparent or clear radiation curable resin to the upper and lower surfaces of the optical spacer;

(b) forming a micro-lens array on the upper surface and an icon array in the form of recesses on the lower surface of the optical spacer;

(c) curing the substantially transparent or clear resin using a source of radiation;

(d) filling the icon array recesses with a pigmented resin or ink;

(e) removing excess resin or ink from the lower surface of the optical spacer; and (f) applying a pigmented sealing or obscuring coating or layer to the lower surface of the optical spacer.

In many cases, it is desirable that security threads used in currency and in other high value financial and identification documents be detected and authenticated by high-speed non-contact sensors, such as capacitance sensors, magnetic field sensors, optical transmission and opacity sensors, fluorescence, and/or nuclear magnetic resonance.

Incorporation of fluorescent materials into the lens, substrate, icon matrix, or icon fill elements of a Unison film can enable covert or forensic authentication of the Unison material by observation of the presence and spectral characteristics of the fluorescence. A fluorescing Unison film can be designed to have its fluorescent properties visible from both sides of the material or from only one side of the material. Without an optical isolation layer in the material beneath the icon layer, the fluorescence of any part of a Unison material will be visible from either of its sides. Incorporation of an optical isolation layer makes it possible to separate the visibility of the fluorescence from its two sides. Thus a Unison material incorporating an optical isolation layer beneath the icon plane may be designed to exhibit fluorescence in a number of different ways: fluorescent color A visible from the lens side, no fluorescence visible from the optical isolation layer side, fluorescent color A or B visible from the optical isolation layer side but not from the lens side, and fluorescent color A visible from the lens side and fluorescent color A or B visible from the optical isolation layer side. The uniqueness provided by the variety of fluorescent signatures possible can be used to further enhance the security of the Unison material. The optical isolation layer can be a layer of pigmented or dyed material, a layer of metal, or a combination of pigmented layers and metal layers, that absorbs or reflects the fluorescent emission from one side of the material and prevents it from being seen from the other side.

Icons formed from shaped voids and their inverse, icons formed from shaped posts, are particularly enabling for adding machine-readable authentication features to a Unison material security thread for currency and other high value documents. The icon matrix, the icon fill, and any number of back coats (sealing coats) can all, separately and/or in all combinations, incorporate non-fluorescing pigments, non-fluorescing dyes, fluorescing pigments, fluorescing dyes, metal particles, magnetic particles, nuclear magnetic resonance signature materials, lasing particles, organic LED materials, optically variable materials, evaporated metal, thin film interference materials, liquid crystal polymers, optical upconversion and downconversion materials, dichroic materials, optically active materials (possessing optical rotary power), optically polarizing materials, and other allied materials.

In some circumstances, such as when a dark or colored coating (such as a magnetic material or conductive layer) has been added to a Unison material or when the color of the icon plane is objectionable when seen through the back side of a substrate, it may be desirable to mask or hide the appearance of an embedded, partially embedded, or windowed Unison material security thread from one side of a paper substrate as seen in reflected light, while the thread is visible from the opposite side of the substrate. Other types of currency security threads commonly incorporate a metal layer, typically aluminum, to reflect light that filters through the surface substrate, thereby providing similar brightness to the surrounding substrate. Aluminum or other color neutral reflecting metal can be used in similar manner to mask the appearance of a Unison thread from the back side of a paper substrate by applying the metal layer on the back surface of the Unison material and then optionally sealing it in place. A pigmented layer can be utilized for the same purpose, that of hiding or obscuring the visibility of the security thread from the "back" side of the document, in place of a metallized layer, or in conjunction with it. The pigmented layer can be of any color, including white, but the most effective color is one that matches the color and intensity of the light internally scattered within, and outside of, the fibrous substrate.

The addition of a metallized layer to a Unison material can be accomplished in a number of ways, including direct metallization of the icon or sealing layer of the Unison material by evaporation, sputtering, chemical deposition, or other suitable means, or lamination of the icon or sealing layer of the Unison material to the metallized surface of a second polymer film. It is common practice to create currency security threads by metallizing a film, pattern demetallizing this film to leave narrow 'ribbons' of metallized area, laminating the metallized surface to a second polymer film, then slitting the laminated material such that the metal ribbons are isolated from the edges of the slit threads by the laminating adhesive, thereby protecting the metal from chemical attack at the edges of the thread. This method can also be applied in the case of the subject invention: the Unison material can simply replace the second laminating film. Thus a Unison material can be augmented by the addition of patterned or unpatterned metallized layers.

Synthetic images can be designed as binary patterns, having one color (or absence of color) defining the icons and a different color (or absence of color) defining the background; in this case each icon zone includes a complete single-tone image that utilizes image 'pixels' that are either full on or full off. More sophisticated synthetic images can be produced by providing tonal variations of the selected icon color. The synthetic image tonal variation can be created by controlling the density of the color in each icon image or by effectively 'half-toning' the synthetic image by including or excluding design elements in selected groups of icons.

The first method, controlling the density of the color in each icon image, may be accomplished by controlling the optical density of the material creating the microprinted icon image. One convenient method to do this utilizes the filled void icon embodiment, already described previously.

Figure 23:
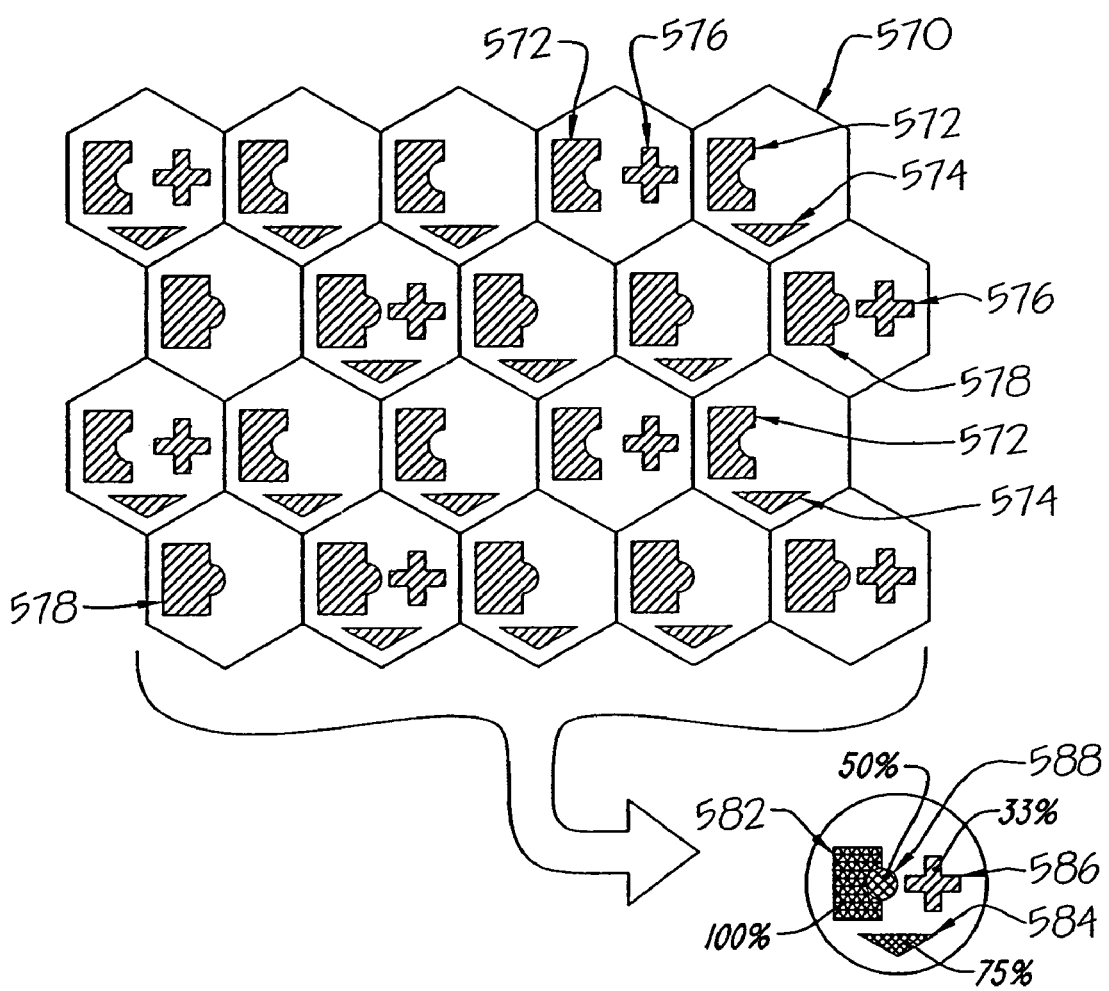
FIG. 23 illustrates half-toning a synthetic image of the present system.

The second method, 'half-toning' the synthetic image by including or excluding design elements in selected groups of icons, illustrated in FIG. 23, accomplished by including image design elements in a proportion of icon zones that is equal to the color density desired. FIG. 23 illustrates this with an example using a hexagonal repeat pattern for the icon zones 570 that would be coordinated with a similar hexagonal repeat pattern of lenses. Each of the icon zones 570 do not contain identical information. All of the icon image elements, 572, 574, 576, and 578 are present at substantially the same color density. Icon image elements 572 and 574 are present in some of the icon zones and different icon image elements are present in other icon zones. Some icon zones contain the single icon image element 570. Specifically, the icon image element 572 is present in half of the icon zones, icon image element 574 is present in three-fourths of the icon zones, icon image element 578 is present in half of the icon zones, and icon image element 576 is present in one-third of the icon zones. The information present in each icon zone determines whether its associated lens will show the color of the icon image pattern or the color of the icon image background from a particular viewing orientation. Either image elements 572 or 578 will be visible in all of the lenses associated with this icon pattern, but the synthetic image 580 space of icon image element 572 overlaps the synthetic image space of icon image element 578. This means that the overlap zone 582 of the synthetic images of icons 572 and 578 will appear at 100% color density, because every lens will project icon image color in this zone. The non-overlapping part of these two synthetic images, 588, is only visible in 50% of the lenses, so it appears at 50% color density. The synthetic image 586 of icon element 576 is visible in only one third of the lenses, so it appears at 33.3 . . . % density. The synthetic image 584 of icon image element 576 correspondingly appears at 75% color density. It is clear within the scope of this teaching that a tremendous range of tonal variations can be obtained in the synthetic image through selective omission of icon image elements in selected percentages of icon zones. For greatest effectiveness the distributions of the icon image elements across the icon image zones should be relatively uniform.

Figure 24A:
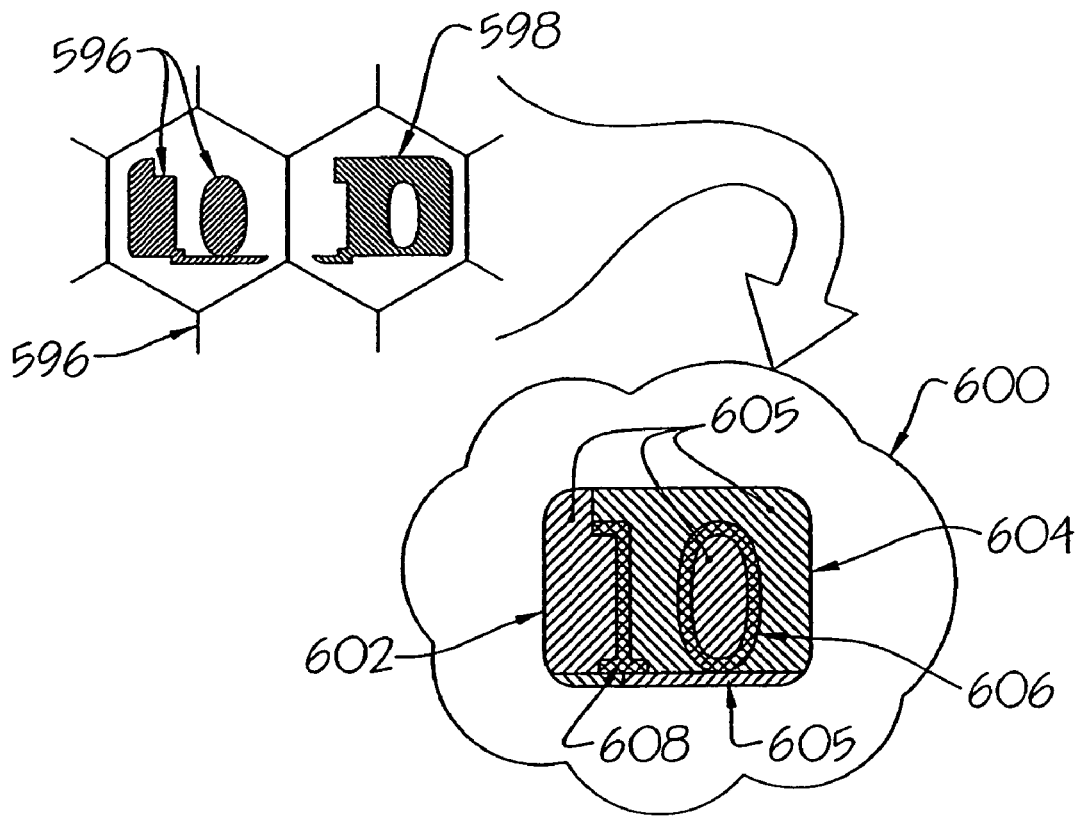
FIG. 24a illustrates use of the present system to create combined synthetic images that are smaller in dimension than the smallest feature of the individual synthetic images.

A related icon image design method, illustrated in FIG. 24a, can be used to create combined synthetic image elements that are smaller in dimension than the smallest feature of the individual synthetic image elements. This is possible in the common circumstance where the smallest feature size of an icon image is larger than the placement accuracy of the feature. Thus an icon image may have minimum features on the order of two microns in dimension, but those features may be placed accurately on any point on a grid of 0.25 micron spacing. In this case the smallest feature of the icon image is eight times larger than the placement accuracy of that feature. As with the previous diagram this method is illustrated using a hexagonal icon pattern 594, but it applies equally well to any other usable pattern symmetry. In similar fashion to the method of FIG. 23, this method relies on the use of different information in at least one icon zone. In the example of FIG. 24a two different icon patterns, 596 and 598, are each present in half of the icon zones (for clarity only one of each pattern is shown in this figure). These icon images produce a composite synthetic image 600 that incorporates synthetic image 602 created by icon image elements 596, and synthetic image 604, created by icon image element 598. The two synthetic images, 602 and 604, are designed to have overlapped areas, 606 and 608, that appear to have 100% color density while the non-overlapped areas 605 have 50% color density. The minimum dimension of the overlapped areas in the composite synthetic image may be as small as the synthetic magnification-scaled positioning accuracy of the icon image elements, and therefore may be smaller than the minimum feature size of the two constituent synthetic images that are designed to overlap in a small region. In the example of FIG. 23, the overlap regions are used to create the characters for the number "10" with narrower lines than would otherwise be possible.

Figure 24B:
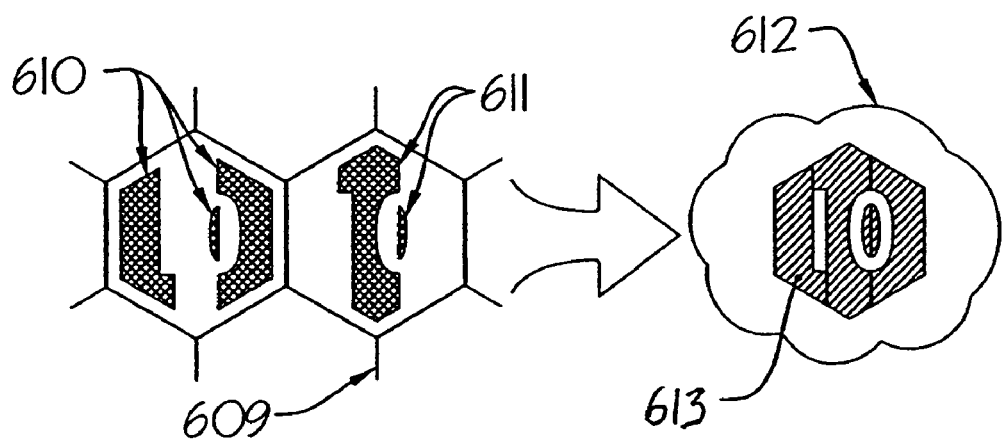
FIG. 24b illustrates use of the present system to create narrow patterns of gaps between icon image elements.

This method can also be used to create narrow patterns of gaps between icon image elements, as shown in FIG. 24b. Hexagonal icon zones 609 could be square or any other suitable shape to make a space-filling array, but hexagonal is preferred. In this example, half the icon patterns the icon image 610, and half of them are the icon image 611. Ideally these two patterns would be relatively uniformly distributed among the icon zones. All of the elements of these patterns are depicted as being of substantially equal and uniform color density. In isolation these two patterns do not clearly suggest the form of the final image, and this can be used as a security element—the image is not obvious until it is formed by the overlying lens array. One instance of the synthetic image 612 formed by the combination of the synthetic image of icon elements 610 with the synthetic image of icon elements 611 is shown, whereby the gaps that remain between the separate synthetic images form the numeral "10". In this case, two synthetic images are combined to form the final synthetic image, so the colored parts of this image 613 show 50% color density. This method is not limited by the details of this example: three icons could have been used instead of two, the gaps defining the desired element in the composite synthetic images can have variable widths and unlimited shape variety, and this method can be combined with either the methods of FIG. 23, 24a,b or 25, or an other icon image design method we have taught.

Figure 25:
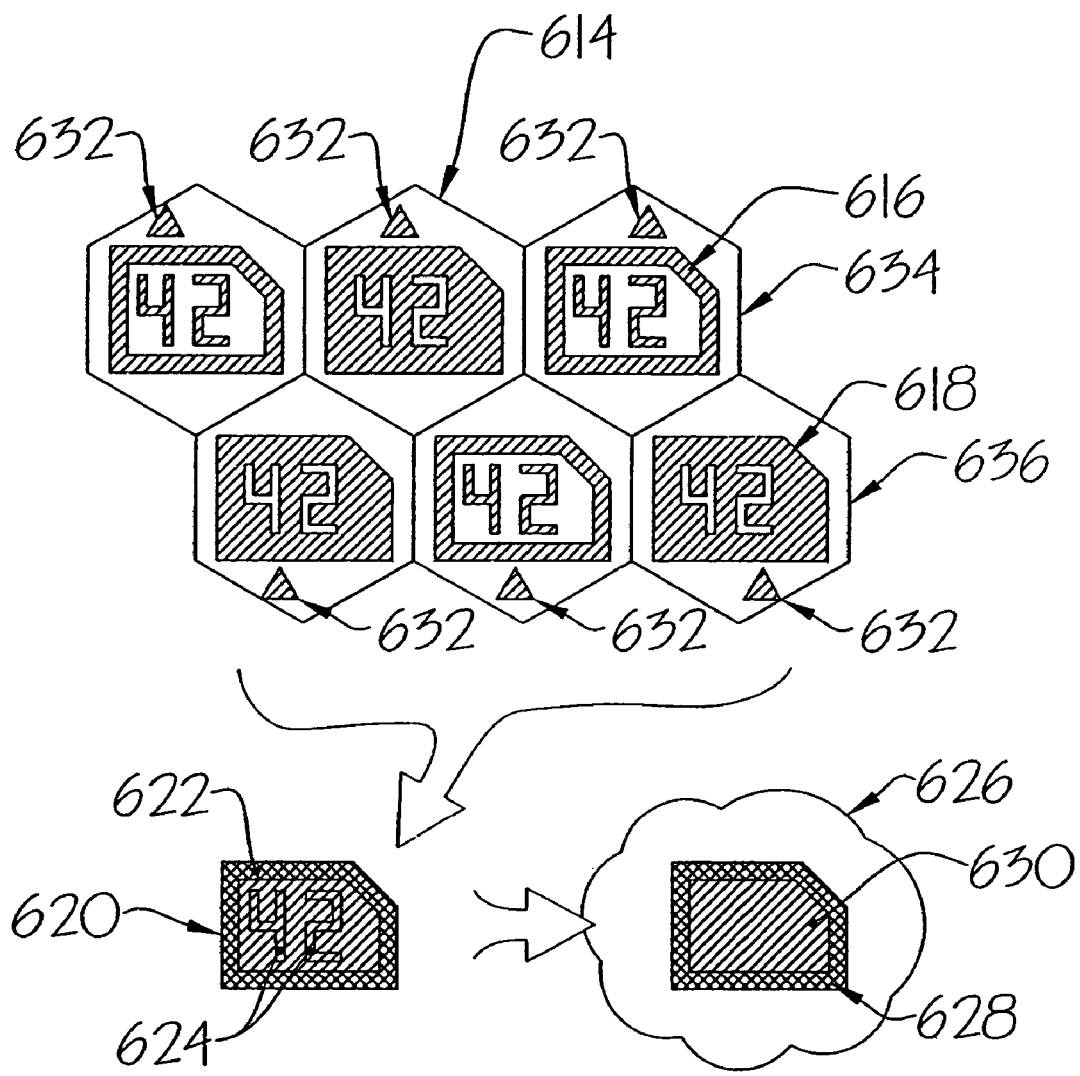
FIG. 25 illustrates incorporation of covert, hidden information into icon images of the present system.

Covert, hidden information can be incorporated into the icon images that cannot be seen in the resulting synthetic images. Having such covert information hidden in the icon images can be used, for example, for covert authentication of an object. Two methods for accomplishing this are illustrated by FIG. 25. The first method is illustrated by the use of matched icon images 616 and 618. Icon image 616 shows a solid border pattern and the number "42" contained inside of the border. Icon image 618 shows a solid shape with the number "42" as a graphical hole in that shape. In this example, the perimeter shapes of icon images 616 and 618 are substantially identical and their relative position within their respective icon zones, 634 and 636, are also substantially identical. When a composite synthetic image 620 is created from these icon images, the border of the composite synthetic image 622 will show 100% color density because all icon images have a pattern in that corresponding area, so there is full overlap in the synthetic images created from icon images 616 and 618. The color density of the interior 624 of the composite synthetic image 620 will be 50%, since the image of the space surrounding the "42" comes from icon images 618 that only fill half the icon zones, and the image of the colored "42" comes from icon images 616 that also fill half the icon zones. Consequently, there is no tonal differentiation between the "42" and its background, so the observed composite synthetic image 626 will show an image having a 100% color density border 628 and a 50% color density interior 630. The "42" covertly present in all of the icon images 616 and 618 is thereby "neutralized" and will not be seen in the observed composite synthetic image 626.

A second method for incorporating covert information into icon images is illustrated by triangles 632 in FIG. 25. Triangles 632 may be randomly placed within the icon zones (not shown in this figure) or they can be placed in an array or other pattern that does not substantially match the period of the icon zones 634, 632. Synthetic images are created from a multiplicity of regularly arrayed icon images that are imaged by a corresponding regular array of micro-lenses. Patterns in the icon plane that do not substantially correspond to the period of the micro-lens array will not form complete synthetic images. The pattern of triangles 632 therefore will not create a coherent synthetic image and will not be visible in the observed synthetic image 626. This method is not limited to simple geometric designs, such as triangles 632: other covert information, such as alpha-numeric information, bar codes, data bits, and large-scale patterns can be incorporated into the icon plane with this method.

Figure 26:
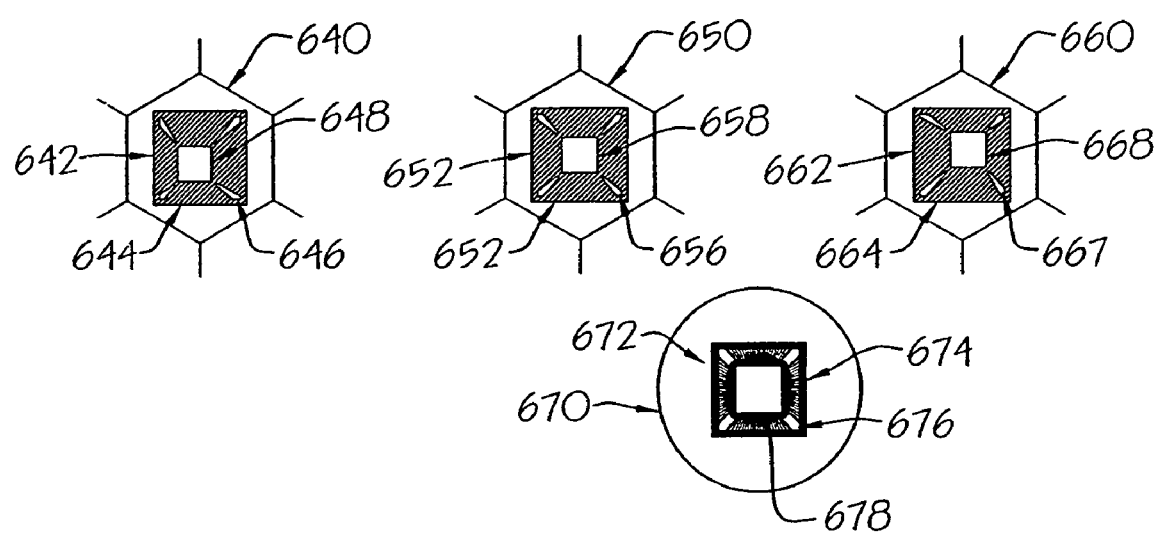
FIG. 26 illustrates creating fully three-dimensional images with the present system.

FIG. 26 illustrates a general approach to creating fully three dimensional integral images in a Unison material (Unison 3-D). A single icon zone 640 contains icon image 642 that represents a scale-distorted view of an object to be displayed in 3-D as seen from the vantage point of that icon zone 640. In this case the icon image 642 is designed to form a synthetic image 670 of a hollow cube 674. Icon image 642 has a foreground frame 644 that represents the nearest side 674 of hollow cube 672, tapered gap patterns 646 that represent the corners 676 of the hollow cube 672, and a background frame 648 that represents the farthest side 678 of the hollow cube 672. It can be seen that the relative proportions of the foreground frame 644 and the background frame 648 in the icon image 642 do not correspond to the proportions of the nearest side 674 and the farthest side 678 of the synthetic image hollow cube 672. The reason for the difference in scale is that images that are to appear further from the plane of the Unison material experience greater magnification, so their size in the icon image must be reduced in order to provide the correct scale upon magnification to form the synthetic image 672.

At a different location on the Unison 3-D material we find icon zone 650 that includes a different icon image 652. As with icon image 642, icon image 652 represents a scale-distorted view of the synthetic image 672 as seen from the different vantage point of this icon zone 650. The relative scaling of foreground frame 654 and background frame 658 are similar to the corresponding elements of icon image 642 (although this will not be true, in general), but the position of the background frame 658 has shifted, along with the size and orientation of the corner patterns 656. Icon zone 660 is located a further distance away on the Unison 3-D material and it presents yet another scale-distorted icon image 662, including icon image 662 with foreground frame 664, tapered gap patterns 667, and background frame 668.

In general, the icon image in each icon zone in a Unison 3-D material will be slightly different from its nearby neighbors and may be significantly different from its distant neighbors. It can be seen that icon image 652 represents a transitional stage between icon images 642 and 662. In general, each icon image in a Unison 3-D material may be unique, but each will represent a transitional stage between the icon images to either side of it.

Synthetic image 670 is formed from a multiplicity of icon images like icon images 640, 650, and 660 as synthetically imaged through an associated lens array. The synthetic image of the hollow cube 674 shows the effects of the different synthetic magnification factors that result from the effective repeat periods of the different elements of each of the icon images. Let us assume that the hollow cube image 674 is intended to be viewed as a SuperDeep image. In this case if icon zone 640 was disposed some distance to the lower left of icon zone 650, and icon zone 660 was disposed some distance to the upper right of icon zone 650, it can be seen that the effective period of the foreground frames 644, 654, and 664 will be less than that of the background frames 648, 658, and 668, thereby causing the closest face 676 of the cube (corresponding to the foreground frames 644, 654, and 664) to lie closer to the plane of the Unison material and the farthest face 678 of the cube to lie deeper and further from the plane of the Unison material, and to be magnified by a greater factor. The corner elements 646, 656, and 667 coordinate with both the foreground and background elements to create the effect of smoothly changing depth between them.

The method of designing icon images for Unison 3-D is more fully described in FIG. 27. This figure isolates the method for a single image projector 680. As previously described, a single image projector includes a lens, an optical spacer, and an icon image; the icon image having substantially the same dimensions as the repeat period of the lens (allowing for the small differences in scale that create the Unison visual effects). The field of view for the lens and its associated icon is shown as the cone 682: this also corresponds to an inversion of the focal cone of the lens, so the proportions of the field of view cone 682 are determined by the F# of the lens. Although the figure shows this cone as having a circular base, the base shape will actually be the same as the shape of an icon zone, such as a hexagon.

In this example we wish to create a Unison 3-D synthetic image that incorporates three copies of the word "UNISON", 686, 690 and 694, at the same visual size at three different SuperDeep image planes 684, 690, and 692. The diameter of the image planes 684, 688, and 692 expands with the field of view cone: in other words, as the depth of image increases, area covered by the field of view cone increases. Thus the field of view at the shallowest depth plane 684 only encompasses portions of "NIS" of the word UNISON, while the middle depth plane 688 encompasses all of "NIS" and portions of "U" and "O" and the deepest depth plane 692 encompasses almost all of "UNISON", lacking only part of the final "N".

The information they presented (UNISONs 686, 690, and 694) by each of these synthetic image planes 684, 688, and 692, must ultimately be incorporated into a single icon image in image projector 680. This is accomplished by capturing the information in the field of view cone 686 at each depth plane

684, 688, and 692, then scaling the resulting icon image patterns to the same dimensions. Icon image 696 represents the field of view of UNISON image 686 as seen at depth plane 684, icon image 704 represents the field of view of UNISON image 690 as seen at depth plane 688, and icon image 716 represents the field of view of UNISON image 694 as seen at depth plane 692.

Within icon image 696 icon image elements 698 originate from a portion of the first "N" of UNISON image 686, icon image element 700 originates from a portion of the "I" of UNISON image 686, and icon image elements 702 originate from portions of the "S" of UNISON image 686. Within icon image 704 icon image element 706 originates from a portion of the "U" of UNISON image 690, icon image element 708 originates from the first "N" of UNISON image 690, icon image element 710 originates from the "S" of UNISON image 690, and icon image element 714 originates from a portion of the "O" of UNISON image 690. Note that although the synthetic images 686, 690, and 694 are presented at similar scale, icon image 704 for the middle depth plane 688 presents its UNISON letters at a smaller scale than those of icon image 696. This accounts for the higher synthetic magnification that icon image 704 will experience (when synthetically combined with a multiplicity of surrounding icon images for the same depth plane). In similar manner, icon image 716 incorporates icon image elements 718 that originate from the UNISON image 694 and the UNISON letters incorporated in its icon image are at a further reduced scale.

Figure 28:
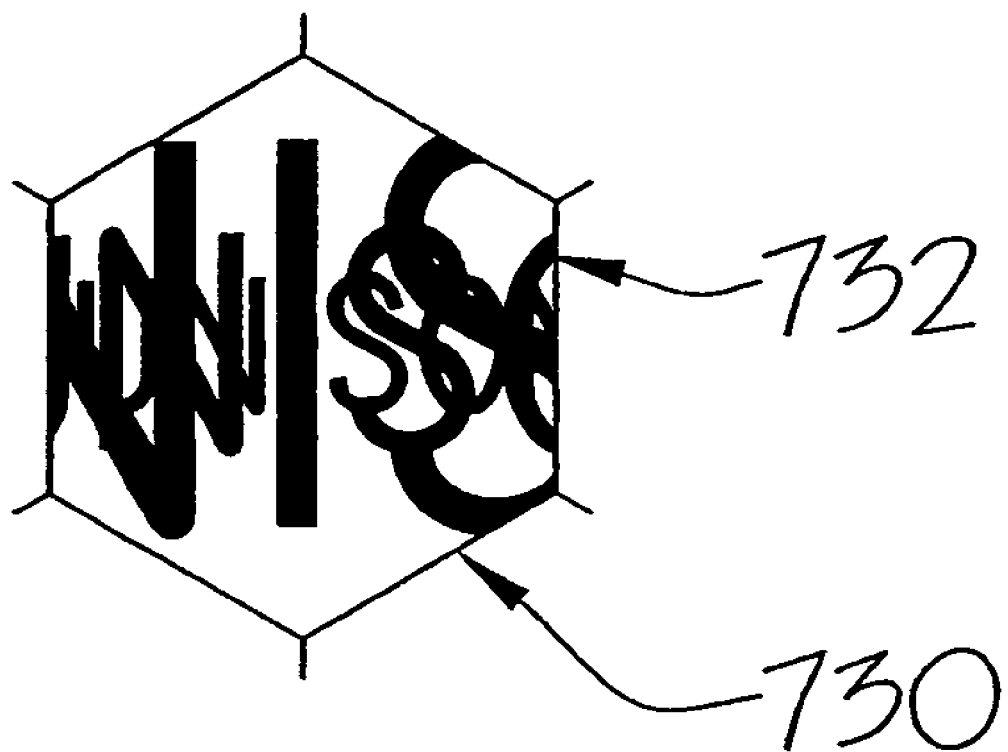
FIG. 28 illustrates the icon image resulting from the method of FIG. 27.

The final icon image for this image projector is created by combining these three icon images 696, 704, and 716 into a single icon image 730, shown in FIG. 28. The combined icon elements 732 incorporate all of the graphical and depth information necessary for the image projector 680 to make its contribution to the synthetic image formed from a multiplicity of image projectors, each incorporating the specific icon image information that results from the intersection of its own field of view cone, centered on the image projector, with the levels and elements of the synthetic image to be produced. Since each image projector is displaced by at least one lens repeat period from every other image projector, each image projector will carry different information resulting from the intersection of its field of view cone with the synthetic image space.

Each of the icon images required to present a chosen 3-D image can be computed from knowledge of the three-dimensional digital model of the synthetic image, desired depth position and depth span to be presented in the synthetic image, the lens repeat period, the lens field of view, and the ultimate graphical resolution of the icon images. This latter factor puts an upper limit on the level of detail that can be presented at each depth plane. Since depth planes that lie further from the plane of the Unison material carry a larger amount of information (because of the increased field of view) the graphical resolution limit of the icons has the greatest impact on the resolution of these synthetic image depth planes.

Figure 29:
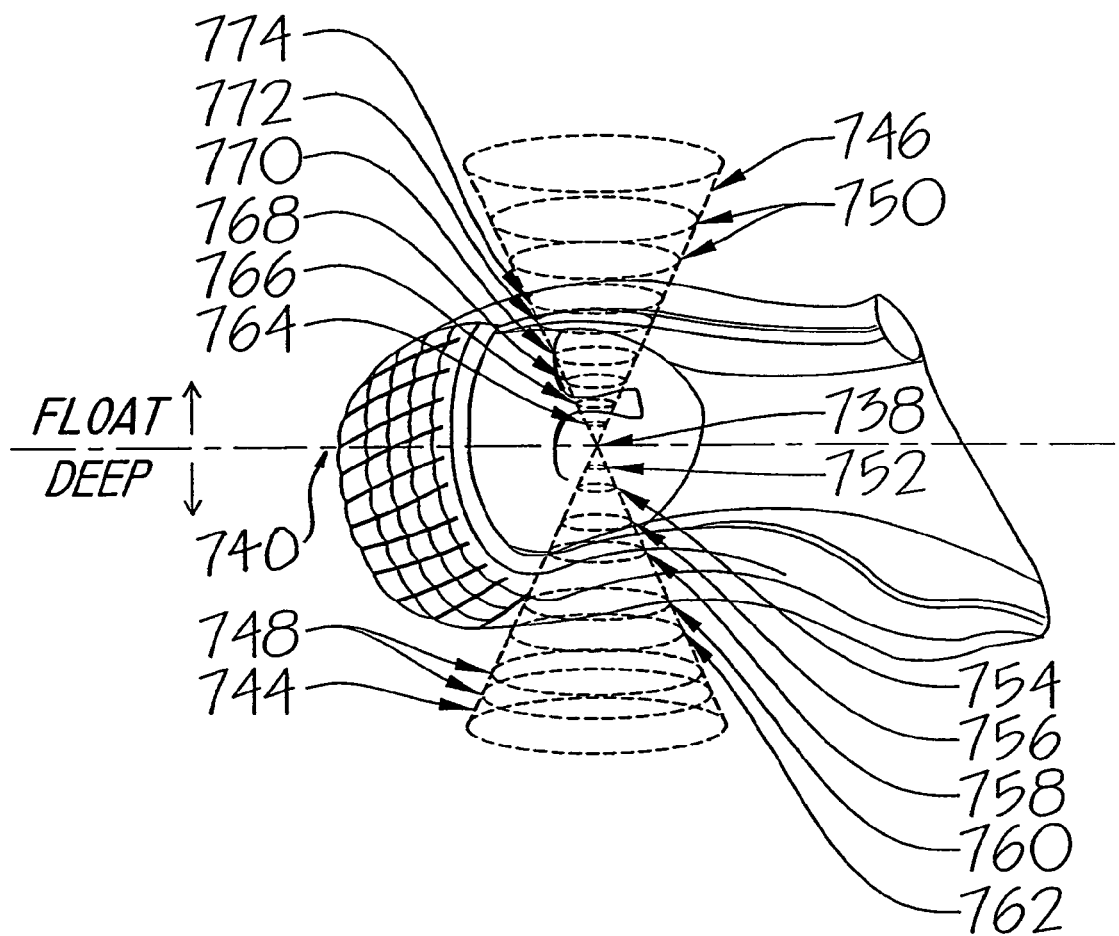
FIG. 29 illustrates how the method of FIG. 27 can be applied to a complex three-dimensional synthetic image.

FIG. 29 illustrates how the method of FIG. 27 can be applied to a complex three-dimensional synthetic image, such as an image of the priceless ice-age carved mammoth ivory artifact, the Lady of Brassempouy 742. Individual image projector 738, incorporating at least a lens, an optical spacing element, and an icon image (not shown in this figure), lies in the plane 740 of a Unison material that separate the float synthetic image space from the deep synthetic image space. In this example the synthetic image space spans the Unison material such that a portion of the image lies in the float synthetic image space and a portion lies in the deep synthetic image space. The image projector 738 has a substantially conical field of view that extends both into the deep synthetic image space 744 and into the float synthetic image space 746. A chosen number of deep image planes are selected, 748 and 752-762, at whatever spacing is required to obtain the deep synthetic image space resolution desired. Similarly, a chosen number of float image planes are selected, 750 and 764-774, at whatever spacing is required to obtain the float synthetic image space resolution desired. Some of these planes, such as deep planes 748 and float planes 750 will extend beyond the synthetic image and will not contribute to the final information in the icon image. For clarity, the number of image planes shown in FIG. 29 is limited to a small number but the actual number of image planes selected may be high, such as 50 or 100 planes, or more, to obtain the desired synthetic image depth resolution.

The method of FIGS. 27 and 28 is then applied to obtain the icon image at each depth plane by determining the shape of the intersection of the surface of the object 742 with the selected depth plane 756-774. The resulting separate icon images are scaled to the final size of the combined icon image. All of the float icon images are first rotated 180 degrees (because they undergo that rotation again when they are projected, thereby returning them to their correct orientation in the synthetic image) then they are combined with the deep icon images to form the final icon image for this image projector 738. This process is repeated for each of the positions of the image projectors to obtain the complete pattern of icon images required to form the full synthetic image 742.

The resolution of the synthetic image depends on the resolution of the optical projectors and the graphical resolution of the icon images. We have obtained icon image graphical resolutions, less than 0.1 micron, that exceed the theoretical optical resolution limit of magnifying optics (0.2 micron). A typical icon image is created with a resolution of 0.25 micron.

Unison materials can be manufactured by sheet or web processing utilizing tools that separately incorporate the lens and icon microstructures. Both the lens tools and the icon tools are originated using photomasks and photoresist methods.

Lens tools are initially designed as semiconductor-type masks, typically black chrome on glass. Masks having sufficient resolution can be created by photoreduction, electron beam writing, or laser writing. A typical mask for a lens tool will incorporate a repeating pattern of opaque hexagons at a chosen period such as 30 microns, with clear lines separating the hexagons that are less than 2 microns wide. This mask is then used to expose photoresist on a glass plate using a conventional semiconductor UV exposure system. The thickness of the resist is selected to obtain the desired sag of the lens. For example, a thickness of 5 microns of AZ 4620 positive photoresist is coated onto a glass plate by suitable means, such as by spin coating, dip coating, meniscus coating, or spraying, to form lenses having a nominal 30 micron repeat and a nominal 35 micron focal length. The photoresist is exposed with the mask pattern, and developed down to the glass in a conventional manner, then dried and degassed at 100° C. for 30 minutes. The lenses are formed by thermal reflow according to standard methods that are known in the art. The resulting photoresist micro-lenses are coated with a conductive metal, such as gold or silver, and a negative nickel tool is created by electroforming.

Icon tools are created in a similar manner. An icon pattern is typically designed with the aid of CAD software and this design is transmitted to a semiconductor mask manufacturer. This mask is used in similar manner to the lens mask, except the thickness of the resist to be exposed is typically in the range of 0.5 micron to 8 microns, depending on the optical density of the desired synthetic image. The photoresist is exposed with the mask pattern, developed down to glass in a conventional manner, coated with a conductive metal, and a negative nickel tool is created by electroforming. According the choice of original mask design and in the choice of resist type used (positive or negative), the icons can be created in the form of voids in the resist pattern or they can be created in the form of "mesas" or posts in the resist pattern, or both.

Unison materials can be manufactured from a variety of materials and a multiplicity of methods that are known in the art of micro-optic and microstructure replication, including extrusion embossing, radiation cured casting, soft embossing, and injection molding, reaction injection molding, and reaction casting. An exemplary method of manufacture is to form the icons as voids in a radiation cured liquid polymer that is cast against a base film, such as 75 gage adhesion-promoted PET film, then to form the lenses from radiation cured polymer on the opposite face of the base film in correct alignment or skew with respect to the icons, then to fill the icon voids with a submicron particle pigmented coloring material by gravure-like doctor blading against the film surface, solidify the fill by suitable means (ex: solvent removal, radiation curing, or chemical reaction), and finally apply an optional sealing layer that may be either clear, dyed, pigmented, or incorporate covert security materials.

The manufacture of Unison Motion material requires that the icon tool and the lens tool incorporate a chosen degree of misalignment of the axes of symmetry of the two arrays. This misalignment of the icon and lens patterns axes of symmetry controls the synthetic image size and synthetic image rotation in the produced material. It is often desirable to provide the synthetic images substantially aligned with either the web direction or the cross-web direction, and in these cases the total angular misalignment of the icons and the lenses is divided equally between the lens pattern and the icon pattern. The degree of angular misalignment required is usually quite small. For example, a total angular misalignment on the order of 0.3 degree is suitable to magnify 30 micron icon images to a size of 5.7 mm in a Unison Motion material. In this example, the total angular misalignment is divided equally between the two tools, so each tool is skewed through an angle of 0.15 degree in the same direction for both tools. The skew is in the same direction because the tools form microstructures on opposite faces of a base film, so the skews of the tools add to each other, instead of canceling each other.

Skew can be incorporated into the tools at the time of the original design of the masks by rotating the whole pattern through the desired angle before writing it. Skew can also be mechanically incorporated into a flat nickel tool by cutting it at the appropriate angle with a numerically controlled mill. The skewed tool is then formed into a cylindrical tool using the skew-cut edge to align the tool to the rotational axis of an impression cylinder.

The synthetic magnification micro-optic system herein can be combined with additional features including but not limited to these embodiments as single elements or in various combinations, such as icon fill materials, back coatings, top coatings, both patterned and non-patterned, fill or inclusions in the lens, optical spacer or icon materials, as a laminate or coating. inks and or adhesives including aqueous, solvent or radiation curable, optically transparent, translucent or opaque, pigmented or dyed Indicia in the form of positive or negative material, coatings, or print including but not limited to inks, metals, fluorescent, or magnetic materials, X-ray, infrared, or ultra-violet absorbent or emitting materials, metals both magnetic and non-magnetic including aluminum, nickel, chrome, silver, and gold; magnetic coatings and particles for detection or information storage; fluorescent dye and pigments as coatings and particles; IR fluorescent coatings, fill, dyes or particles; UV fluorescent coatings, fill, dyes or particles; phosphorescent dye and pigments as coatings and particles, planchettes, DNA, RNA or other macro-molecule taggants, dichroic fibers, radioisotopes, print receptive coatings, sizing, or primers, chemically reactive materials, micro-encapsulated ingredients, field affected materials, conductive particles and coatings both metallic and non-metallic, micro-perforated holes, colored threads or fibers, patches of Unison embedded in the surface of a document, label, or materials surface, bonded to paper or polymer as a carrier to adhere to paper during manufacture, fluorescent Dichroic threads or particles, raman scattering coatings or particles, color shifting coatings or particles, Unison laminated to paper, paper board, card board, plastic, ceramic, fabric, or metal substrate, Unison as a thread, patch, label, over wrap, hot stamp foil, or tear tape, holographic, diffractive, diffractive kinegram, isograms, photographic or refractive optical elements, liquid crystal materials, Up Conversion and Down Conversion materials.

Figure 34:
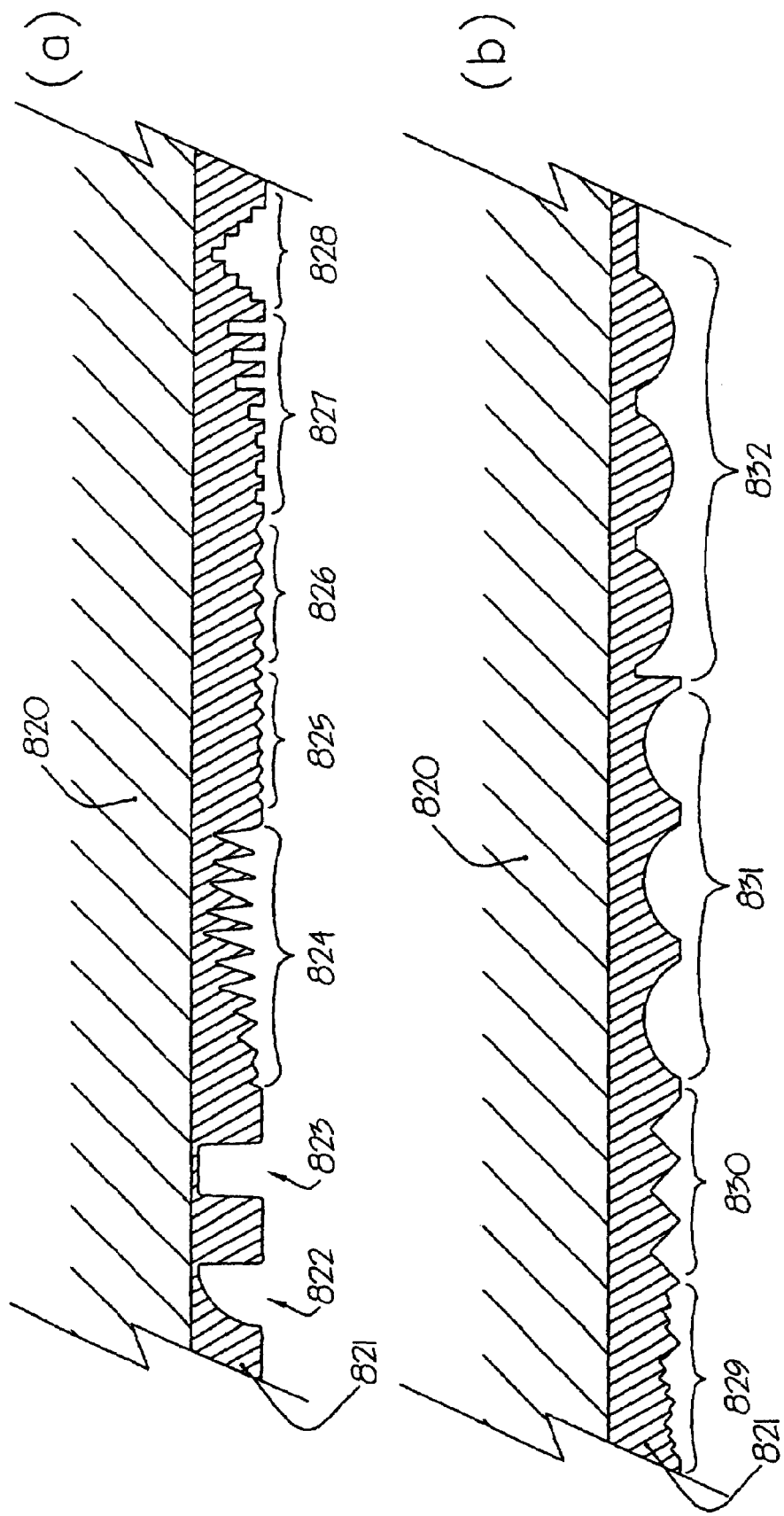
FIGS. 34a,b illustrate alternate embodiments of microstructured icon elements.

While the image icon component has been detailed in conjunction with the aforementioned array of focusing elements, the image icon component can be used to provide image "printing" in other applications. For example, FIG. 34 is a cross-section through the icon layer 821 of one embodiment of a material that bears microstructured icon elements, for example an array of microstructured icon elements. The icon layer 821 shown may constitute the icon layer of the present synthetic magnification micro-optic image projection system, moiré magnification system, the icon layer of a "lock and key" moiré magnification system (described below), a stand-alone layer of micro-images or effective "micro-printing", the icon layer of a micro cylindrical lenticular image film system, or the image or icon layer of another micro-optic system.

The icon layer 821 may be freestanding or it may optionally be provided on a substrate 820 or a transparent substrate 820 (the latter being required if the icon layer constitutes an element in a moiré magnification system wherein the icon layer 821 is optically coupled to a microlens array through the transparent substrate 820). Optional substrate or transparent substrate 820 supports or is in contact with icon layer 821 that incorporates a variety of microstructures that can act as elements of icon images. The microstructured icon elements can be formed as either recesses or raised areas in a layer of material, such as icon layer 821, or in a substrate. Microstructured icon image elements can take a wide variety of forms and geometries, including but not limited to asymmetric void patterns 822, symmetric void patterns 823, light trap patterns 824, holographic surface relief patterns 825, generalized diffractive surface relief patterns 826, binary structured patterns 827, "binary optic", "structural color" and general stepped relief patterns 828, random rough and pseudo-random rough patterns 829, nominally flat-surfaced patterns 830, and concave 831 and convex 832 patterns (as viewed from the lower side, as drawn, of the icon layer).

The icon layer 821 can incorporate an array or pattern of homogeneous microstructures, for example, solely asymmetric void patterns 822. Alternatively, icon layer 821 can incorporate an array or pattern of two or more of microstructure embodiments 822-832. The microstructures serve as icon elements that can be formed into an array of microstructured icon elements that collectively form an image, similar to a group or array of pixels forming a conventional printed image. For example, a system can be created having an array of microstructured icon elements that can be combined with the aforementioned array of focusing elements, wherein the two arrays cooperate to form a synthetic optical image that may or may not be magnified. A system can also be created having an array of microstructured icon elements that collectively form a "micro-printed" image intended to be viewed upon magnification, such as viewing through a magnifying glass or with the aid of a microscope.

The micro-structured icon elements 822-832 of FIG. 34 can be designed to exhibit optical contrast within their parts and between their parts and the surrounding unstructured areas of icon layer 821 when the icon elements are immersed in or in contact with a vacuum, a gas (including mixed gases, such as air), a liquid, or a solid. The optical contrast can arise from refraction, total internal reflection, surface reflection, scattering, partial polarization, polarization, optical rotation, diffraction, optical interference and other optical effects.

Microstructured Icon Elements

Figure 35:
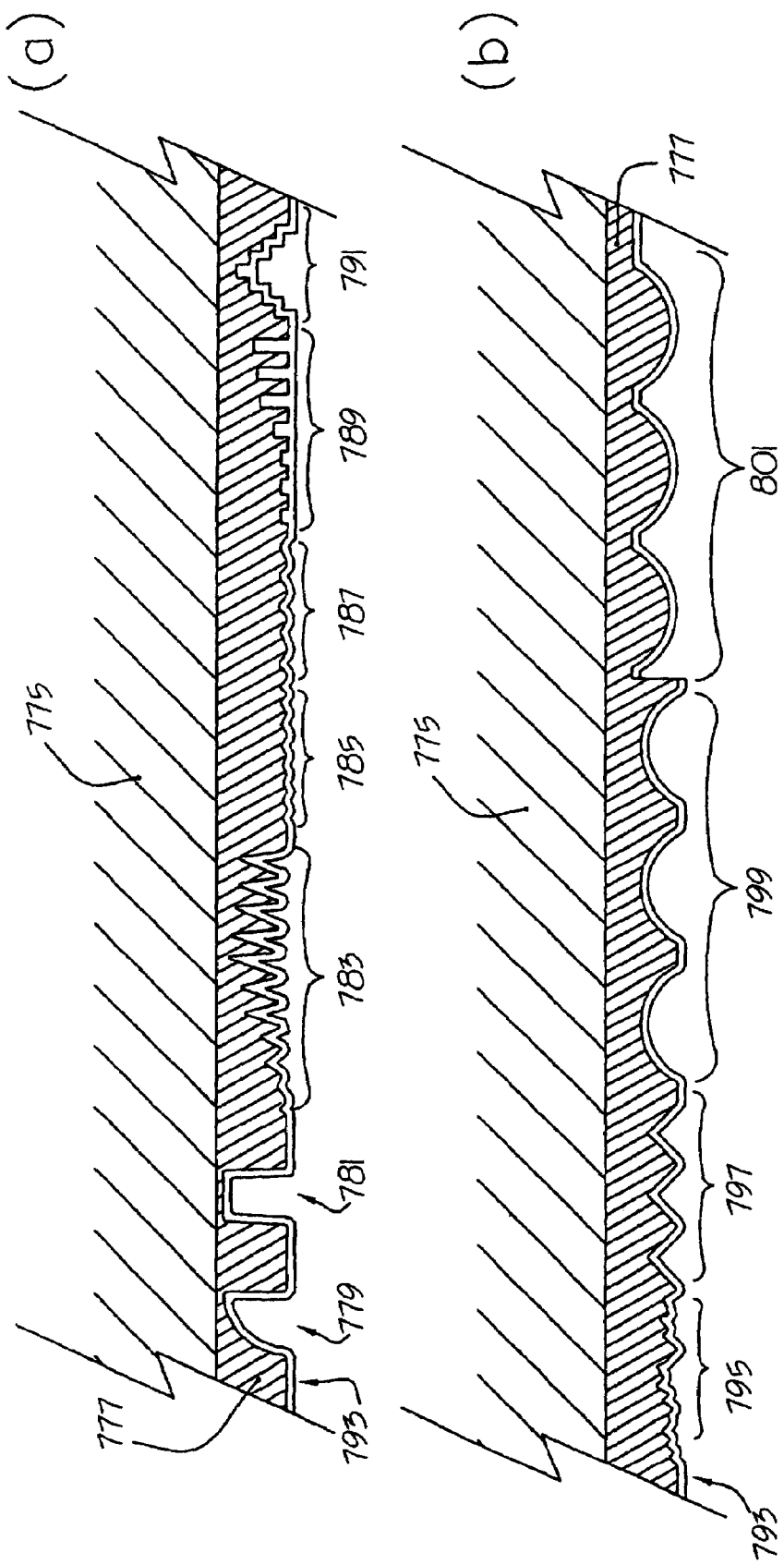
FIGS. 35a,b illustrate the microstructured icon elements of FIGS. 34a,b further including a coating material.

FIG. 35 is a cross-section that illustrates coated icon layer 777 incorporating a number of microstructured icon image element embodiments. The icon layer 777 is similar to icon layer 821 of FIG. 34 and may also be freestanding or it may optionally be provided on a substrate 775 or a transparent substrate 775. The icon element embodiments illustrated can include those of FIG. 34, including asymmetric void patterns 779, symmetric void patterns 781, light trap patterns 783, holographic surface relief patterns 785, generalized diffractive surface relief patterns 787, binary structured patterns 789, "binary optic", "structural color" and general stepped relief patterns 791, random rough and pseudo-random rough patterns 795, nominally flat-surfaced patterns 797, and concave 799 and convex 801 patterns (as viewed from the lower side, as drawn, of the icon layer).

The microstructured icon image elements are formed in the icon layer using any of the aforementioned microstructured icon image elements tooling and methods.

Any icon element microstructure can be coated with a conformal, non-conformal, and/or directional coating material 793.

Patterned Coatings

Coating material 793 can be conformal, non-conformal, continuous, discontinuous, patterned, unpatterned, directional, or it can have different properties or materials than the icon layer 777, or combinations thereof. Patterning of coating material 793 can provide icon image elements that are coordinated with microstructured image element patterns or independent of the microstructured image element patterns, or both. Coating material 793 can be patterned to provide icon image elements on the surface of icon layer 777 whether or not icon layer 777 incorporates any microstructured patterns. The coating material 793, whether patterned or unpatterned need not cover the entire surface of icon layer 777. The coating material can be applied to only selected portions of icon layer 777.

Figure 40:
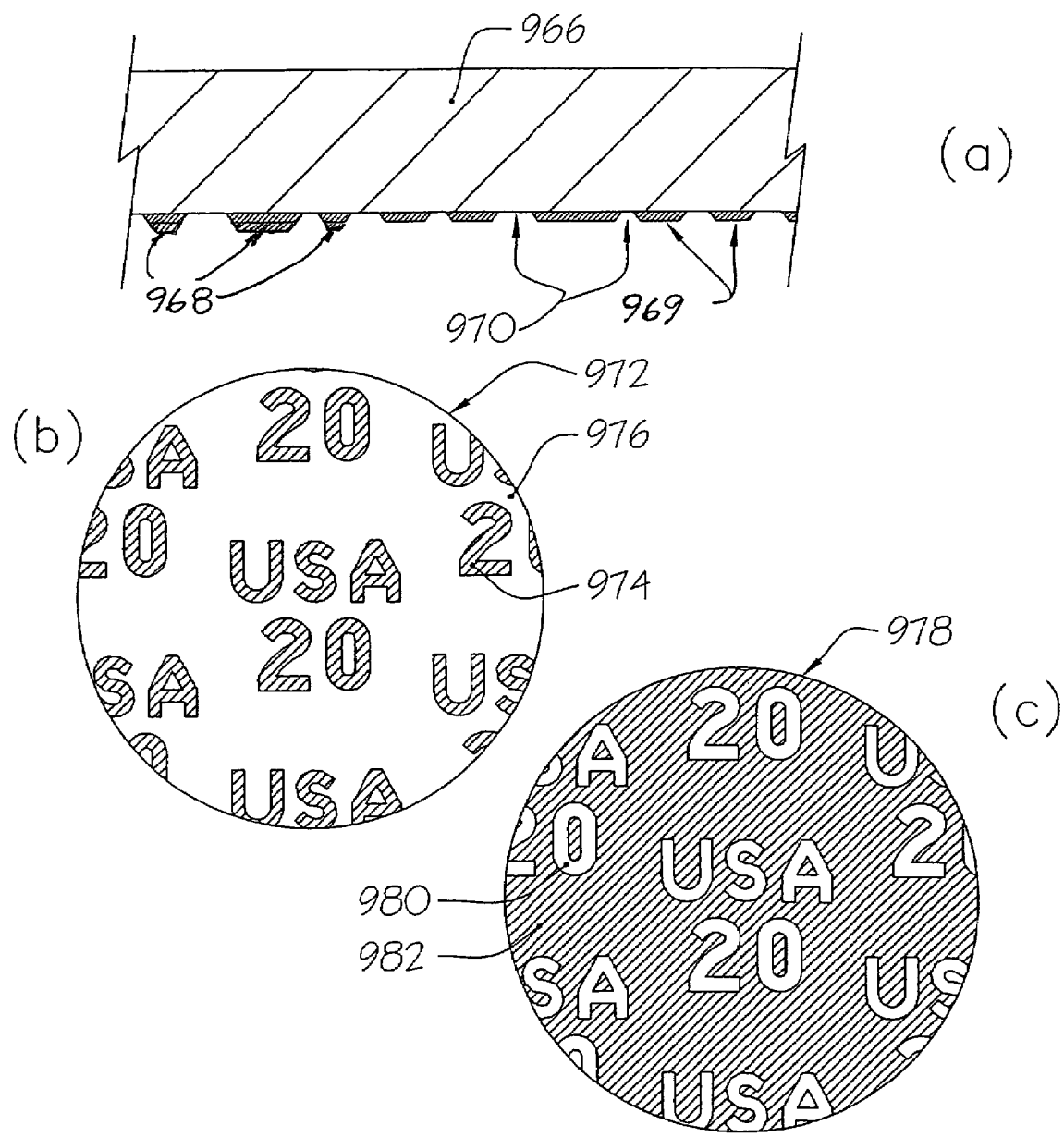
FIGS. 40a-c illustrate the use of a patterned coating material to create icon image elements.

For example, icon image elements can be formed by creating a pattern demetallized aluminum layer as a coating material (as one example of coating material 793) on a polyester icon layer (as one example of icon layer 777) in an area of the polyester icon layer that does not have any microstructure formed into it (such as illustrated in FIG. 40 discussed below). In this example the pattern demetallized aluminum layer provides icon images without the use of microstructured surfaces on the icon layer. Such a pattern demetallized aluminum layer can also be used in conjunction with microstructured icon image elements in another region of the polyester icon layer. The pattern demetallized aluminum layer can coordinate with the microstructured icon image elements, such that their intended appearance is enhanced by the pattern demetallized aluminum layer, or the icon images provided by the pattern demetallized aluminum layer can be independent of the icon layer microstructured icon image elements, such that the pattern demetallized aluminum layer icon images are used to create one synthetic image while the microstructured icon image elements are used to create a second synthetic image.

Positive and Negative Images, Including Patterned Coatings

Both microstructured icon image elements and patterned icon layer coatings can be used to form either positive images or negative images (see also FIG. 40 below), such that any of these image elements can take on either the chosen "foreground" properties or the chosen "background" properties, while the surrounding regions take on the remaining of the properties. Thus the icon image elements can be used to form normal images or color reversed images, and correspondingly normal synthetic images or color reversed synthetic images.

As an example, any of these icon image element methods can be used to provide images (such as a currency denomination—"50") that are opaque or in a first color against a transparent background or a background of a second color, while in a different region of the icon layer 777 the coloring pattern can be reversed, such that the images are transparent or of the second color, while the background is opaque or of the first color.

Icon Image Element Embodiments Used for Micro-Printing

While any and all of the icon image element embodiments of the present disclosure can be used as elements of a moiré magnification system, they can also be used alone as ultra-high resolution micro-printing for a broad range of applications. The icon image element methods of the subject invention can be used to create micro-printing for compact information storage, for covert identification of currency, documents, packaging, and manufactured articles, for bar code and digital tagging of currency, documents, packaging, and manufactured articles, and for all applications that could benefit from ultra-high resolution printing or information tagging. In this embodiment, a pattern or array of microstructured icon elements is provided that collectively form an image or provide certain information that requires magnification to be viewed.

Figure 36:
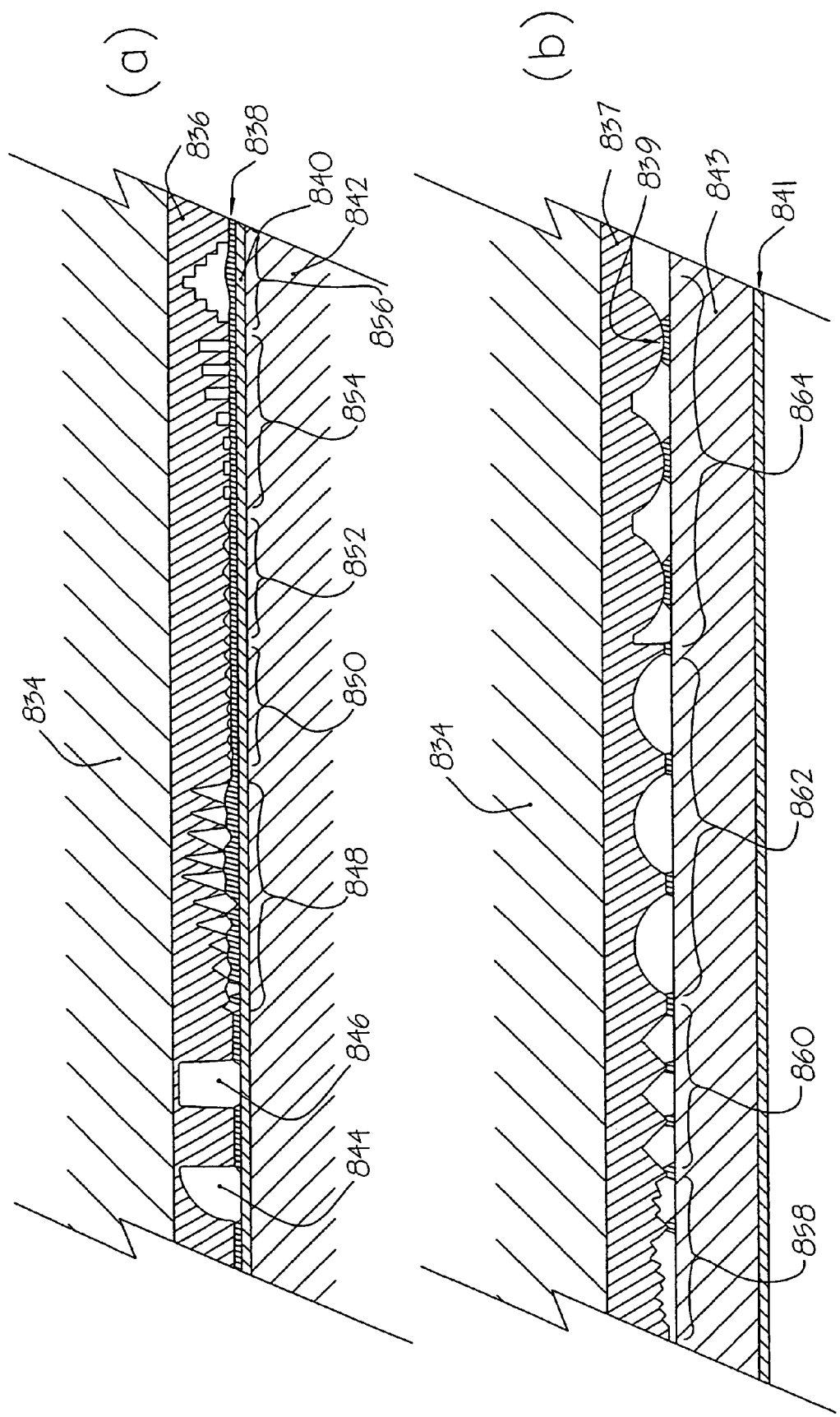
FIGS. 36a,b illustrate the microstructured icon elements of FIGS. 34a,b further including a laminated coating material.

FIGS. 36(*a,b*) present a cross-section through the icon layer 836 of a material that bears a similar set of microstructured icon image elements as in FIGS. 34 and 35 with the addition of coating material layers 838 and 840. The icon layer 836 shown could constitute the icon layer of a moiré magnification system, the icon layer of "lock and key" moiré magnification system (described below), a stand-alone layer of micro-images or effective "micro-printing", the icon layer of a micro cylindrical lenticular image film, or the image or icon layer of another micro-optic system.

The icon layer 836 may be freestanding or it may optionally be provided on a substrate 834 or a transparent substrate 834. Optional substrate or transparent substrate 834 supports or is in contact with icon layer 836 that incorporates a variety of microstructures that can act, either alone or in combination, as elements of icon images. Microstructured icon image elements can take a wide variety of forms and geometries, including but not limited to the embodiments 844-864 corresponding to those of FIG. 34.

As illustrated in FIG. 36(*a*), the icon layer 836 bearing micro-structured icon elements 844-856 is shown as being laminated with laminating adhesive 838 to a coating material layer 840 that may be supported by a substrate or transparent substrate 842. The laminating adhesive 838 may be applied to the icon layer 836 first, then brought into contact with the coating material layer 838, as is indicated by the gaps in the laminating adhesive shown for micro-structured icon elements 844 and 846, or the laminating adhesive 838 may also or instead be applied to the coating material layer 840 first, then brought into contact with the icon layer 836, as indicated by the continuous layer of laminating adhesive 838 shown for micro-structured icon image elements 848-856.

In this embodiment the coating material layer 840 is in close proximity to, or in contact with, the micro-structured icon image elements 844-856. The coating layer is similar to coating layer 793 of FIG. 34 and can have an effect as described in connection with coating layer 793.

In FIG. 36(b), a cross-section is shown of icon layer 837 bearing micro-structured icon image elements 858-864 is shown as being laminated using laminating adhesive 839 to laminate substrate 843 that bears coating material layer 841. While laminating adhesive 839 is shown as having been applied to icon layer 837 and then brought into contact with laminating substrate 843, it should be understood that laminating adhesive 839 may also or instead be applied to laminating substrate 843 first and then brought into contact with icon layer 837.

In this embodiment the coating material layer 841 is separated from the icon layer 837 by the laminating substrate 843. The coating layer 841 can be any of the materials previously listed for coating layers 840 and 793.

While the micro-structured icon image elements 844-864 are shown in FIG. 36(a) as being unfilled, at least a portion of the microstructured icon image elements 844-864 can be optionally filled with an icon fill material, or coated with a conformal, non-conformal, or directional coating material prior to lamination. The microstructured icon elements need not be completely filled. When filled they may only be partially filled, or a portion filled.

Figure 37:
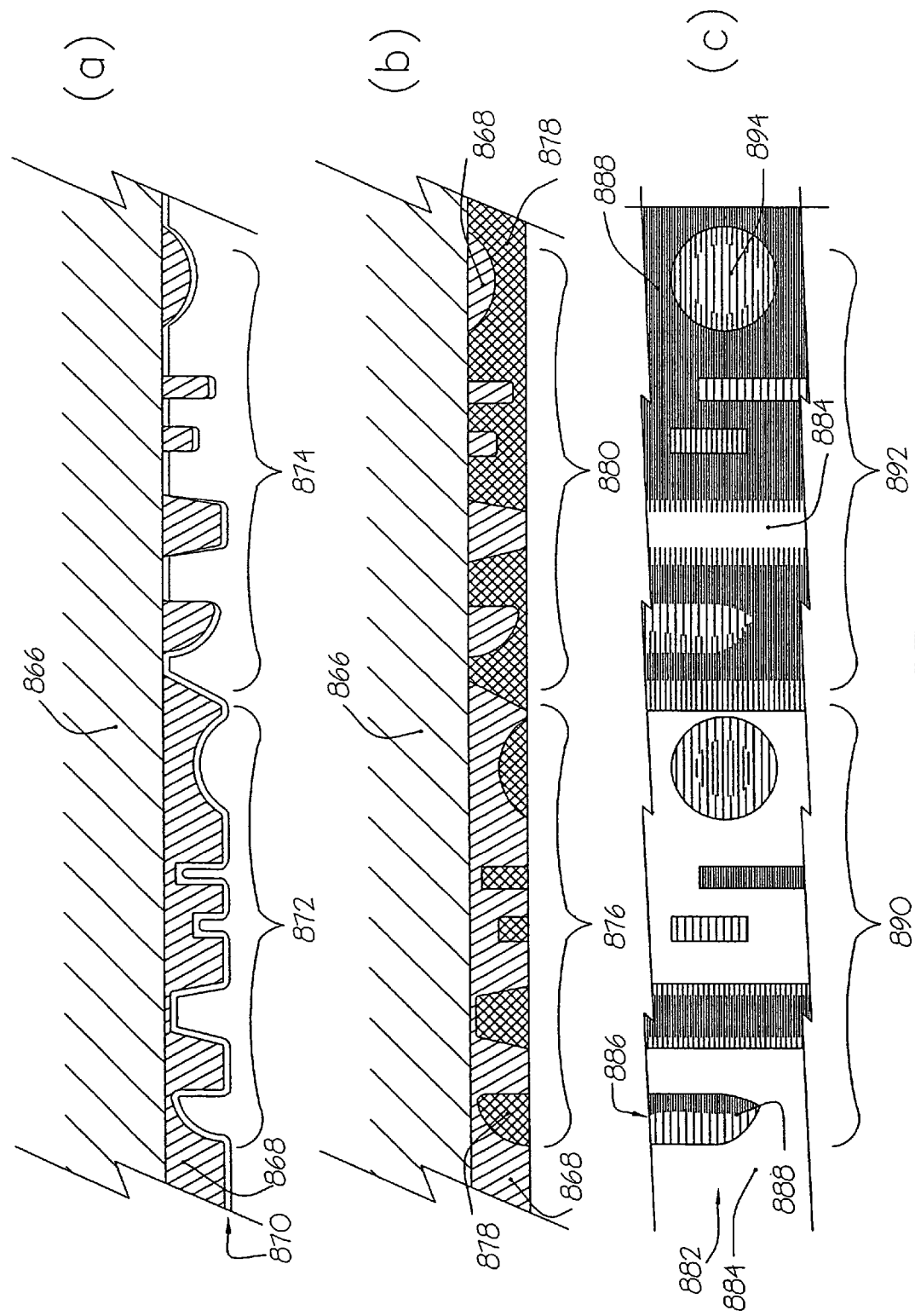
FIGS. 37a-c illustrate positive and negative icon elements.

Micro-structured icon image elements can be presented as either positive or negative images, or both. In FIGS. 37(a-c); icon layer 868 may be freestanding or it may optionally be provided on a substrate 866 or a transparent substrate 866. Icon layer 868 may optionally be provided with a coating material layer 870 that may partially or completely cover icon layer 868.

In FIG. 37(a), icon layer 868 bears two zones of micro-structured icon elements: positive icon elements 872 and negative icon elements 874. For the purposes of illustration, the general forms of the negative icon elements 872 have been mirrored in the forms of the positive icon elements 874. Optional coating material 870 is shown as a conformal coating on the positive icons 872 and a non-conformal coating on the negative icons 874, for example only—both conformal and non-conformal coatings can be employed in conjunction with both positive icons 872 and negative icons 874.

Object patterns of the positive icon image elements 872 are provided as depressions or voids 871 in the icon layer 868 while the background areas of positive icon image elements 872 are provided as raised areas in the positive icon area 872. The background areas of negative icon image elements 874 are provided as depressions 875 in the icon layer 868 and the object patterns of negative icon image elements 874 are provided as raised areas in the icon layer.

FIG. 37(b) illustrates how the effect of positive and negative icon elements and patterns is particularly dramatic when the icons are filled with an icon fill material having different properties from the icon layer 868 material. A different area of icon layer 868 and optional substrate 866 is shown with filled positive icons 876 and filled negative icons 880. Icon fill material 878 forms the object patterns 886 of the positive icon elements 876 but the background of the filled negative icon elements 880.

A detailed plan view 882, see FIG. 37(c), of the filled positive icon elements 890 and the filled negative icon elements 892 shows filled positive icon element 886 that appears different 888 from the surrounding background appearance 884. For example: one common difference between the appearance of a filled positive icon element and the background surrounding it is color. If icon fill material 878 bears a pigment, dye, or other coloring material, then the filled positive icon element 886 will show a high concentration 893 of the icon fill material 886, while the surrounding background area 884 will not. In a similar manner, the background of filled negative icon elements 892 will show a high concentration of the icon fill material 886, while the object patterns of filled negative icon elements 892 will show a deficiency 894 of the icon fill material.

By these means, and in combination with other teachings herein, it can be seen that both positive and negative image icon elements can be made. When used as elements of a moiré magnification system, these positive and negative image icon elements can be employed to produce positive and negative synthetic images. Positive and negative image elements can be used singly or in combination.

Figure 38:
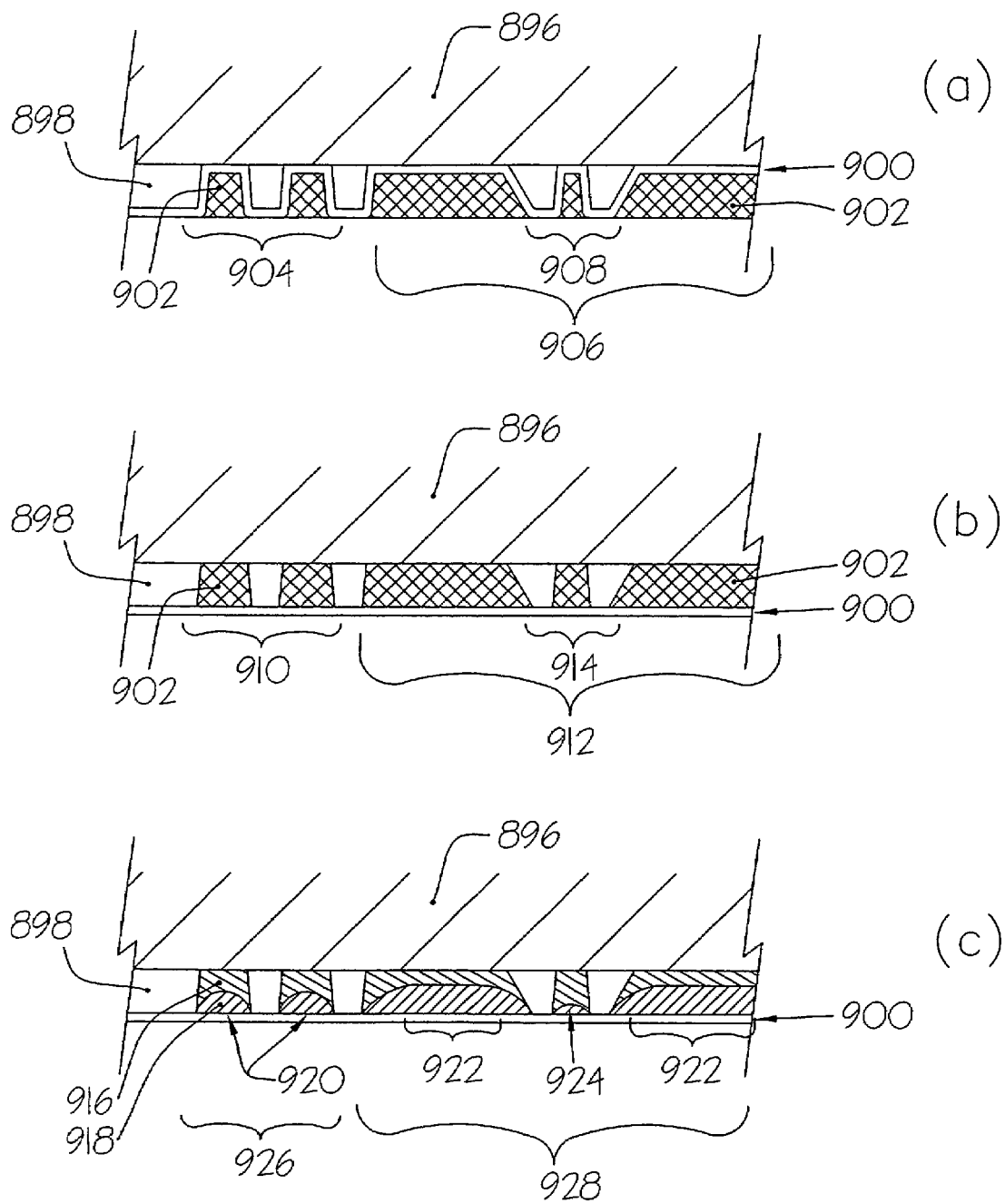
FIGS. 38a-c illustrate the combination of filled and coated microstructured icon elements.

A representative sampling of embodiments combining filled icons and coatings is presented in FIGS. 38(a-c). The icon layer 898 may be freestanding or it may optionally be provided on a substrate 896 or a transparent substrate 896. Optional substrate or transparent substrate 896 supports or is in contact with icon layer 898 that incorporates a variety of microstructures that can act, either alone or in combination, as elements of icon images.

FIG. 38(a) shows coating material 900 that has been applied by suitable means (as described for FIG. 35) to at least a portion of the surface of icon layer 898. Coating material 900 is shown in this figure as being conformal to the icon layer 898 surface, but it could be non-conformal, discontinuous, patterned, or consist of coated areas having different properties and/or materials. Positive icon elements 904 have their object pattern microstructures filled with icon fill material 902 and their background elements unfilled. Negative icon elements 906 have their background microstructures filled with icon fill material 902 while their object pattern microstructures 908 are unfilled.

The embodiment shown in FIG. 38(a) can provide visual enhancement of the icon images through the different optical effects produced by different viewing angles of the coating material 900 and the icon fill material 902. For example, if the coating material 900 is a thin layer of aluminum, such that it is substantially transparent when viewed from a direction normal to the plane of the icon layer 898, the central regions of the filled icon elements will appear substantially the same color as they would without the coating. The reflectivity of a thin aluminum layer increases with increasing angle of incidence, so sloping sides of filled, coated icon elements appear more reflective, resulting in the appearance of a high-contrast outline of the icon elements. If coating material 900 is a single layer or multi-layer dielectric coating the color of the coating may be different at different viewing angles, thereby adding a color tinting or color highlighting effect to the sides of the icon elements. Other types of coating materials can be used for adhesion promotion, to produce additional visual effects, or can provide covert, machine readable, or forensic authentication features to the material. It will be understood that the icon elements need not be filled or coated. One may partially fill only some of the icon elements.

The embodiment shown in FIG. 38(b) reverses the order of icon fill and coating from FIG. 38(a), where the microstructured icons are filled first with icon fill material 902 and then coated with coating material 900. Icon layer 898 may optionally be provided on substrate 896 or transparent substrate 896 or may be free standing. Icon elements 910 and 912 are filled with icon fill material 902 and then optionally covered with coating material 900.

The visual effect of the embodiment of FIG. 38(b) will generally be different from the visual effect of FIG. 38(a), even if the same materials are used for the coating material 900 and the icon fill material 902. The coating material 900 may or may not be visible through the icon fill material 902, depending on the optical properties of the icon fill material 902. The coating material 900 is directly visible in the areas between filled icons.

Provided that the icon elements are substantially completely filled with icon fill material 902, at all places that the coating material 900 is visible, whether seen through the icon fill material 902 or seen directly, the coating material 900 is substantially parallel to the surface of the icon layer 898. Thus the presence of the coating material 900 may modify the overall appearance of the icon fill material 902 but it does not provide an outlining or edge enhancing function as in FIG. 38(a). Coating material 900 may be designed to have other effects or functions in addition to, or in place of, an optical effect—for example, coating material 900 may enable non-contact authentication, detection, or identification of an object to which the icon layer 898 is attached.

If the icon elements are underfilled with icon fill material 902, then coating material 900 may not be substantially parallel to the surface of the icon layer 898. In this case (not illustrated) there may be additional optical effects provided by coating material 900 in the areas that it contacts icon fill material 902 and is substantially non-planar.

The embodiment of FIG. 38(c) is an extension of the embodiment of FIG. 38(b) to include multiple icon fill materials. (Although it is not illustrated here, multiple icon fill materials can also be used with the embodiment of FIG. 38(a), and the following discussion also applies to that embodiment.) Icon layer 898 bears positive micro-structured icon elements 926 and negative microstructured icon elements 928 that are filled with a first icon fill material 916. The microstructured icon elements 926 and 928 are underfilled with first icon fill material 916. This may be accomplished by a number of means, including dispersing the first icon fill material 916 in a solvent, filling the icon microstructures with the solvent dispersed first icon fill material 916, and drying the solvent and consequentially shrinking the volume of the first icon fill material 916. Another means for underfilling the icon microstructures is to fill them with first icon fill material 916 and then to remove some icon fill material 916 by a wiping or scraping means, such as by buffing or by high-pressure wiping with a doctor blade.

The first icon fill material 916 can be optionally stabilized, cured, or dried by drying, by chemical reaction (such as a two-part epoxy or a resin and hardener polymerization reaction), by radiation curing, by oxidation, or by other suitable means. The first icon fill material 916 can also be optionally not stabilized so that it can chemically react in some manner with the second icon fill material 918.

The icon microstructures 926 and 928 are then optionally filled with the second icon fill material 918. Depending on the method used to provide the underfilling of the first icon fill material 916, the relative thicknesses of the first icon fill material 916 and the second icon fill material 918 may differ in different regions or differ for icon element microstructures that have different depth, width, or aspect ratio. Positive icon elements 926 show approximately equal volumes of first icon fill material 916 and second icon fill material 918, with the thickness of the two fill materials being approximately equal in the center of the filled areas 920. The negative icon elements in this drawing show a large difference in aspect ratio, so that the central zones 922 of the two larger filled icon elements show a fill material thickness ratio of about, for example, 1:3 for the first 916 and second 918 icon fill materials, respectively. The center of the smaller negative icon element 924 shows a very different fill material thickness ratio of about, for example, 4:1 for the first 916 and second 918 icon fill materials, respectively. The filled icons can optionally be coated with coating material 900.

Coating material 900 may also be optionally applied to the icon layer 898 prior to filling the icons with the first icon fill material 916 or it may be applied to the icon layer 989 and first icon fill material 916 prior to filling with the second icon fill material 918. These variations are not illustrated in the figure.

Positive icon elements 920 have their object pattern microstructures filled with icon fill materials 916 and 918 and their background elements unfilled. Negative icon elements 928 have their background microstructures filled with icon fill materials 916 and 918 while their object pattern microstructures are unfilled.

Note that any icon layer material in any embodiment of this invention, not limited to those of FIGS. 38(a-c), may itself incorporate pigments, dyes, colorants, fluorescing materials, or filling materials of any suitable kind as previously stated in the Definitions section of this patent. Filling the icon layer renders the distinction between positive and negative icon elements somewhat academic, since a particular microstructured icon element formed in a clear, unpigmented, and uncolored icon layer and then filled with a pigmented icon fill material may be deemed to be a positive icon element, while the very same microstructured icon element formed in a pigmented icon layer and then filled with a clear, unpigmented, and uncolored icon fill material may be deemed to be a negative element. In this example all that has changed between the positive icon element and the negative icon element is the choice of materials for the icon layer and the icon fill material. While it is convenient to speak of positive and negative icon elements, there is really a continuum of possibilities, including icon elements having one color or optical effect present in the background and a second color and/or optic effect present in the object patterns, and visa versa.

If the icon elements of FIGS. 38(a-c) are employed as part of a moiré magnification system then the unique effects provided by the combination of coating materials and icon fill materials will also carry over into the synthetic images produced by the moiré magnification system.

Patterned Coatings on Icons and as Icons

Figure 39:
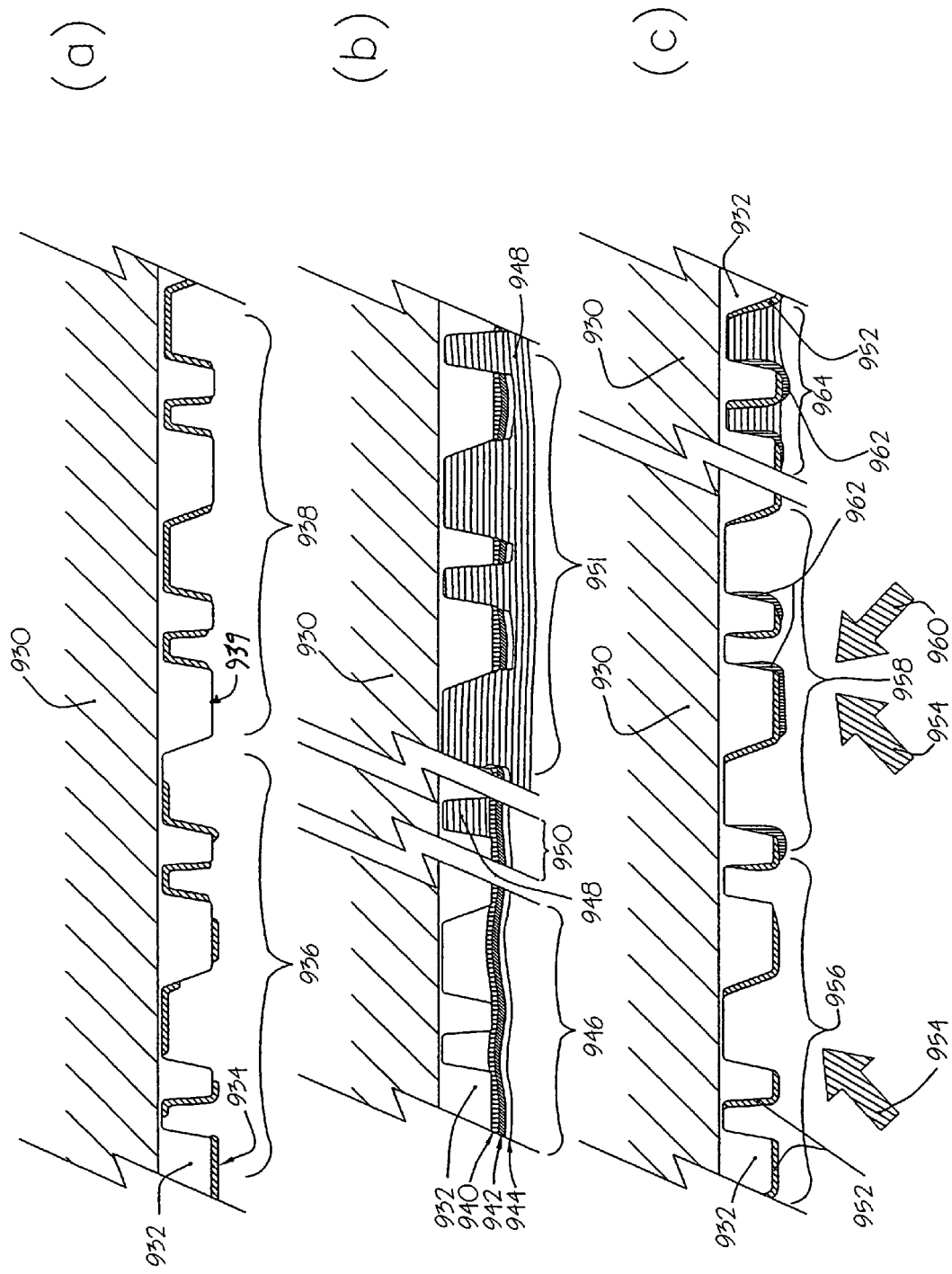
FIGS. 39a-c illustrate the application and combination of patterned coating materials to the microstructured icon elements of FIGS. 34a,b.

FIGS. 39(a-c) illustrate the application and combination of patterned coating materials, hot-stamp foils, directional coatings, and filled icons. In FIG. 39(a) The icon layer 932 may be freestanding or it may optionally be provided on a substrate 930 or a transparent substrate 930. Optional substrate or transparent substrate 930 supports or is in contact with icon layer 932 that incorporates a variety of microstructures that can act, either alone or in combination, as elements of icon images.

In FIG. 39(a) the patterning of coating material 934 constitutes regions where the coating material is present 935 and regions where coating material is absent. The patterning of coating material 934 can be in any form and for any purpose, including the creation of icon elements for a moiré magnification micro-optic system. A number of methods of patterning coatings are known in the art, including printing or depositing a resist material on the coating and chemically etching the exposed coating, then optionally chemically stripping the resist material from the coating. The resist layer may be a photoresist, and the patterning of the resist may be performed by optical exposure methods. An alternative approach to patterning of a coating is to first deposit a patterned resist (or, alternatively, to deposit a resist and subsequently pattern it), then to apply the coating to the surface of the material and the resist, then to chemically remove the resist and the coating that is attached to it. For example—this latter method is common in the manufacture of "demetallized security threads" wherein a resist material is printed onto a polymer substrate, the substrate and resist are coated with aluminum by vacuum metallization or sputtering, and the resist is chemically removed. In the places where the resist was present the aluminum coating is absent, having "lifted-off" when the resist was removed. Instead of chemically removing selected metallized areas, these areas can be mechanically removed, such as by abrasion. It will be understood that only portions of the coating may be patterned.

A patterned metallized coating that is not coordinated with the scale and geometry of the icon elements in a moiré magnification film can be used to produce an effect of partial transparent metal in the synthetic images because the locations of the demetallized areas will vary from icon element to icon element—a synthetic image formed from these icon elements with present an opacity that is proportionate to the percentage of coating present, in a manner similar to half toning methods used in printing.

Alternatively, a patterned demetallized metal coating can be used to create a different set of icon elements from the microstructured icon elements that could be used to generate a second set of synthetic images. One application of such additional synthetic images is for covert authentication of materials for currency, document, and brand protection.

In FIG. 39(*a*) coating material 934 in the area indicated by bracket 936 is patterned in a manner that does not coordinate with the geometry of the microstructured icon elements. The patterned coating material 934 may carry separate information, such as a different pattern of icon elements, or it may carry other graphical or text information, or no information.

In contrast, coating layer 934 in the area indicated by bracket 938 is coordinated with the icon elements, coating the depressed shapes 931 but not coating the "flats" 939 between them. This kind of patterning can be accomplished by coating the whole surface of the icon layer 932 with coating material 934, including both the depressed areas 931 and the "flats" 939, then removing the coating material 932 from the "flats" 939 by scraping, rubbing, brushing, skiving, abrading, chemical etching, adhesive pull-off, or by other suitable means.

A patterned coating material 934 coordinated with the icon elements in this manner can provide strong visual, optical, electromagnetic, magnetic, or other enhancement of the icon elements. For example: an icon layer 932 incorporating microstructured icon elements can be sputtered with gold, then the gold can be removed from the flats 939 by rubbing the coated surface against a fibrous material, such as paper. The gold remaining in the icon elements then provides them with a gold metallic appearance, while the flats are free of gold, so the icon elements appear to be separate gold objects against the background.

FIG. 39(*b*) depicts various icon layer 932 embodiments that incorporate a hot stamp foil coating 942 alone (946) and in combination with (950, 951) an icon fill material 948. A typical hot stamp foil structure is shown, wherein a thermal adhesive layer 940 bonds the foil layer 942 of the hot stamp foil coating to the icon layer 932. A frangible lacquer layer 944 of the hot stamp foil coating is optionally provided to support the hot stamp foil 942. Frangible lacquer layer 944 may incorporate a microstructured pattern, such as a hologram. In the area indicated by bracket 946 a hot stamp foil coating 942 has been applied by well known means to the surface of icon layer 932, sealing over the depressed areas of the microstructured icon elements. In the area indicated by bracket 950 the hot stamp foil 942 has been applied over a microstructured icon containing an icon fill material 948. In the area indicated by bracket 951 the hot stamp foil 942 has been applied to the icon layer 932 and then the hot stamp foil coating material that covered over the depressed areas of the microstructured icon elements has been removed. Suitable means of removing the hot stamp foil coating material include, but are not limited to, a high pressure jet of a gas, a jet of high pressure water or other fluid, and mechanical disruption and abrasion. The microstructured icon elements may subsequently be optionally filled with an icon fill material 948, such the icon microstructures appearance is controlled by the icon fill material 948 and the "flats" appearance is controlled by the hot stamp foil coating material. The icon fill material 948 may be optionally coated over at least a portion of the hot stamp foil coating 942 as shown, or it may be applied so as to only fill the icon depressions (not shown).

FIG. 39(*c*) depicts various icon layer 932 embodiments that incorporate directional coating materials (952 and 962) that may optionally be used in combination with icon fill materials 948. First directional coating 952 is applied to icon layer 932 from the direction indicated by arrow 954. The directional deposition of first directional coating 952 causes it to preferentially coat the "flats" and right sides (as drawn) of the icon elements in the area indicated by bracket 956. Such a coating can provide visual highlighting of one side of a microstructured icon element, producing a "shadowed" or "spot illuminated" effect.

In the area indicated by bracket 958 two directional coatings are employed. Arrow 954 indicates the direction of application of the first directional coating 954 that coats the "flats" and right sides of the microstructured icon elements in this area. The second directional coating 962 is applied from the direction indicated by arrow 960, and coats the left sides of the microstructured icon elements. The first and second directional coatings (952 and 962, respectively) may be either the same material or be different materials, and they may be applied from opposing directions (954 and 960), as shown, or they may be applied from similar directions. For example: if the first directional coating 952 is silver and it is applied from the direction shown by arrow 954, and if the second directional coating 962 is gold and it is applied from the direction shown by arrow 960, then the right sides of the microstructured icon elements will appear silver and their left sides will appear gold, while their centers remain uncoated and may appear transparent. As another example: the conditions of the previous example, except the silver is applied at the angle shown by arrow 954 and the gold is applied from the same general direction, at an angle that is ten degrees closer to the overall icon layer 932 surface normal. The gold will then coat the same sides of the icon elements as the silver, but the gold will coat higher up the right side or onto the center of the icon. The resulting icon element appear to have a silvered right side that blends into a gold color towards the top of the icon element (as drawn). Many other such combinations and variations will be obvious to one skilled in the art.

Yet another variation is shown in the area of FIG. 39(*c*) indicated by bracket 964, wherein microstructured icon elements have two directional coatings, a first directional coating 952 and a second directional coating 962, and then are filled with icon fill material 948. Icon fill material can optionally be added to any of the coated microstructured icon elements of any part of this figure where it is not already shown, including areas 936 and 938 of FIG. 39(*a*) and area 956 of FIG. 39(*c*).

FIG. 40(*a*) illustrates the use of a patterned coating material 967 as a means to create icon image elements. Patterned coating material 967 is provided on a substrate 966 or a transparent substrate 966, said patterning incorporating regions of coating material 968 of a selected thickness and either regions of coating material 969 having a smaller thickness or regions without coating material 970, or both. The different thicknesses of coating material—full thickness (968), partial thickness (969), and zero thickness (970) (or the absence of coating material)—can be patterned to represent icon image information as an element in a moiré magnification system. Either the full thickness coating material or the zero thickness coating material can be used to form object patterns of the icon elements. FIG. 40(*b*) illustrates a plan view 972 of the use of full thickness icon elements to form object patterns (letters and numbers) against a background 976 formed by zero thickness or partial thickness coating material. Since the object patterns of the icon elements shown in plan view 972 are formed by the presence of coating material 967, the icon image is called a positive icon image. FIG. 40*c* presents a plan view 978 of a negative icon image, wherein the background is formed by full thickness coating material 982 and the object patterns are formed by partial or zero thickness coating material 980. Regions of partial thickness coating material 969 can be used to create gray-scale patterns, wherein the optical effect of the coating material 967 provides a modified or reduced intensity effect, depending on the nature of the coating material.

The patterning of coating material 967 can be performed by any of the methods previously described with respect to FIG. 38. Regions of partial thickness coating material can be created by an additional masking and etching step, or by etching the full thickness coating in the pattern of the partial thickness regions, then performing a second coating of coating material 967 to deposit a partial thickness layer over the whole substrate 966 or transparent substrate 966, then optionally masking and etching one more additional time to produce zero thickness regions 970.

Additional coating material layers can be optionally added to the patterned coating material 967. Examples include, but are not limited to, metallization by vacuum deposition, pigmented or dyed coatings, or any of those list previously in the Definitions section of this document. Example: such layers may be directly applied, laminated, hot stamped, coated, or otherwise provided. Application of such additional layers may provide a benefit of altering the appearance of the regions of partial thickness coating material 969 and the regions of zero thickness (absent) coating material 970.

Figure 41:
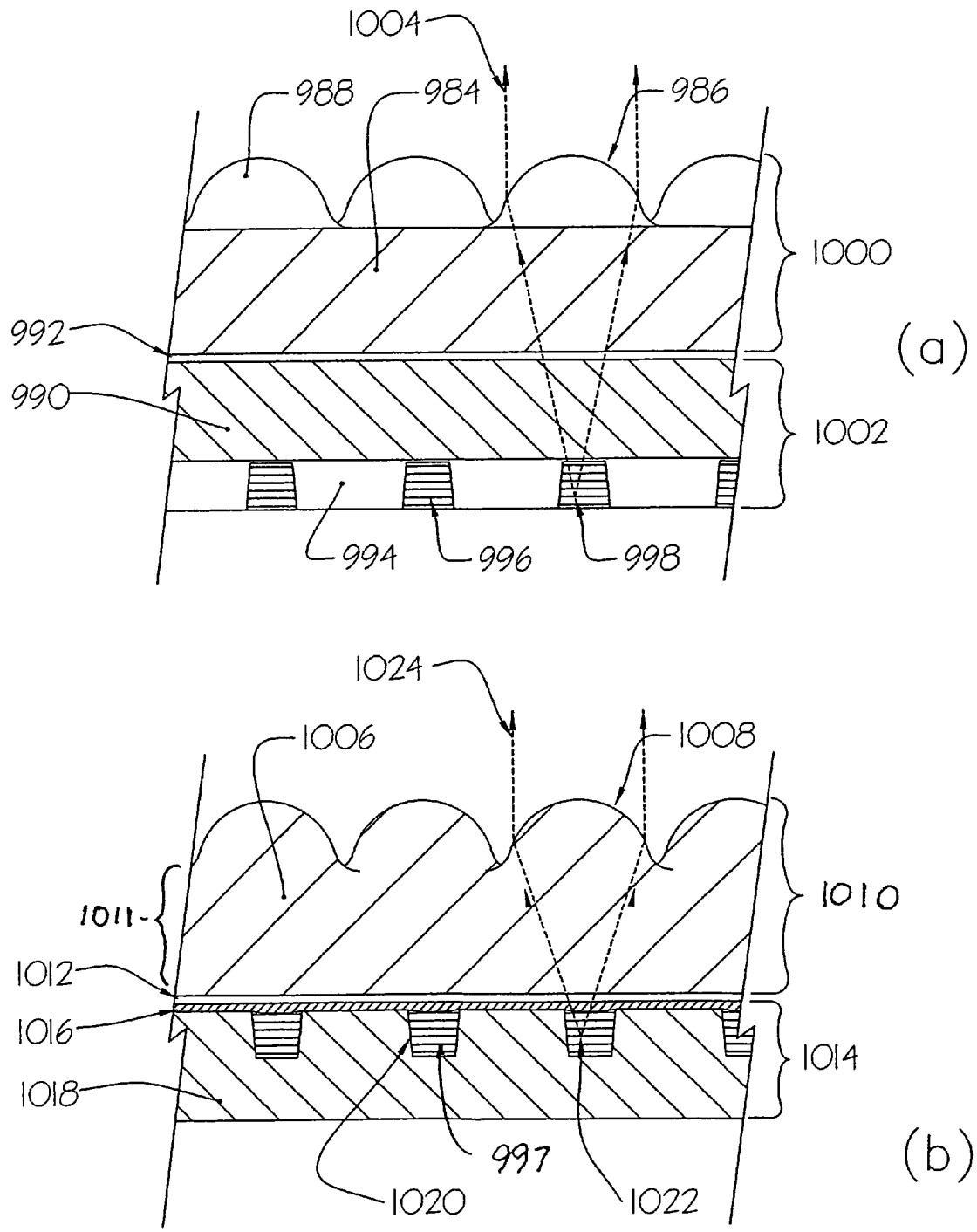
FIGS. 41a,b illustrate a "lock and key" embodiment of the micro-optic system disclosed herein.

FIGS. 41(*a,b*) illustrate two embodiments of a two-part moiré magnification system that can be used as a "lock-and-key" authentication system in which the micro-lens array is a separate piece that acts like a key to "unlock" the information in the icon array piece. In FIG. 41(*a*) an optional transparent substrate 984 carries micro-lenses 986 made from a light transmitting material 988 that may be different or the same as the material used to form the optional transparent substrate 984. The total thickness of the lens sheet 1000, incorporating the micro-lenses 986 plus the optional substrate 984, is less than the focal length 1004 of the micro-lenses 986.

Lens sheet 1000 is not permanently attached to icon sheet 1002, but is a free and separate piece that can be used as an authentication device for icon sheet 1002. When used as an authentication device lens sheet 1000 is brought into contact or close proximity to the surface of icon sheet 1002. The gap 992 between the two sheets will, in general, contain a thin film of air, or gap 992 can optionally be filled with water, glycerin, or other fluid to provide optical or mechanical coupling between the lens sheet 1000 and the icon sheet 1002.

Icon sheet 1002, incorporating optional transparent substrate 990, icon layer 994 and icon elements 996 (shown here optionally filled with an icon fill material 997), is disposed with the icon layer on the surface furthest from the lens sheet 1000. The total thickness of icon sheet 1002 plus lens sheet 1000 is designed to be substantially equal to the focal length 1004 of the micro-lenses 986. When the lens sheet 1000 is placed substantially in proximity, for example in contact with the icon sheet 1002, with or without coupling fluid, the focal point 998 of the micro-lenses 986 should lie somewhere within or near the icon layer 994. The optimal position of the focal point 998 is at, or slightly below, the bottom surface of the icon layer 994.

A system formed according to the embodiments of FIG. 41(*a*) can be used as an anticounterfeiting, authentication or security device. For example, the icon layer 994 of the icon sheet 1002 can be attached, adhered, or otherwise permanently secured to, or incorporated into, an object or document at the time of manufacture, original creation, packaging, or distribution. The icon sheet 1002 by itself does not need to have any visibly distinguishing features. In practice the icon elements 996 will be very small, on the order of a few microns to a few tens of microns in dimension, and will be effectively invisible to the unaided eye. Additional conventional printing or imaging can be provided on or attached to icon sheet 1002, if desired.

An example of such additional imaging could be a person's photograph for identification, such that the icon sheet performs as a background to the photograph. The icon sheet 1002, and by association, the object to which it is securely attached, can be authenticated by placing an appropriately scaled lens sheet 1000 substantially into contact with the icon sheet 1002 and rotating the lens sheet 1000 within its plane until the lenses and icon elements 996 align sufficiently to form a synthetic image of the icon elements 996. (An "appropriately scaled" lens sheet is a lens sheet in which the array of focusing elements has a rotational symmetry and repeat period substantially matching that of the array of icon elements 996 on the icon sheet 1002, with an icon/lens repeat ratio designed to achieve the selected optical effect [SuperDeep, Deep, Motion, Float, SuperFloat, Levitate, 3-D, combinations thereof, etc.])

FIG. 41(*b*) illustrates an alternate embodiment of this aspect of the invention. In this figure lens sheet 1010 includes is monolithic, consisting of a single material including microlenses 1008 on its upper surface and an optional additional thickness of material 1006 to provide optical spacing. The lens sheet 1000 of FIG. 41(*a*) may also be formed in this manner if lens sheet 1000 does not include the optional transparent substrate 984. Likewise, the lens sheet 1010 of FIG. 41(*b*) can be formed using a transparent substrate and a micro-lens layer, as shown in FIG. 41(*a*). The two alternative structures for lens sheets 1000 and 1010 are shown for completeness—either lens sheet, 1000 or 1010 can have either of the two structures shown—monolithic lenses (FIG. 41*b*) or substrate plus lenses (FIG. 41*a*).

The function of the lens sheet 1010 in the embodiment of FIG. 41(*b*) is the same as that of the lens sheet 1000 of FIG. 41(*a*), although the total thickness of lens sheet 1010 will generally be a greater proportion of the micro-lens 1008 focal length 1024 because of the differences in the icon sheet 1014 as compared with the icon sheet 1002. The icon sheet 1014 incorporates a surface bearing icon elements 1020 that may optionally be filled with an icon fill material 997. For the sake of completeness, icon sheet 1014 is shown as being monolithic, with no separate icon layer and substrate layer, but icon sheet 1014 can alternatively be formed in the manner of icon sheet 1002, with a substrate and an attached icon layer. In like manner icon sheet 1002 can be formed according to the structure of icon sheet 1014, as a monolithic sheet.

The functional differences between icon sheet 1014 and icon sheet 1002 are that the former has its icon elements on the surface closest to the lens sheet 1010 while the latter has its icon elements on the surface most distant from the lens sheet 1000. In addition, since the icon elements 1020 of icon sheet 1014 are on its upper surface, the material 1018 that lies beneath the icon elements 1020 does not need to be transparent, whether the icon sheet 1014 is monolithic or whether it has the structure of icon sheet 1002, with an icon layer and a substrate. The substrate 990 of icon sheet 1002 does need to be substantially transparent, since light must pass through the substrate 990 in order for the lenses 986 to form an image of the icon elements 996.

An optional coating material 1016 can be provided on the icon elements 1020 of the icon sheet 1014. A coating material 1016 may be desirable to provide optical or non-contact authentication of the icon sheet by means different from the use of lens sheet 1010. The coating layer 1016 may include other optical features, such as a holographic or diffractive structure. The icon elements of both icon sheet 1002 and icon sheet 1014 can take any form, including any of the icon element embodiments taught herein.

As was the case for the embodiment of FIG. 41(*a*), the lens sheet 1014 of the embodiment of FIG. 41(*b*) is not permanently attached to icon sheet 1014, but is a free and separate piece that can be used as an authentication device for icon sheet 1014. When used as an authentication device lens sheet 1010 is brought into contact or close proximity to the surface of icon sheet 1014. The gap 1012 between the two sheets will, in general, contain a thin film of air, or gap 1012 can optionally be filled with water, glycerin, or other fluid to provide optical or mechanical coupling between the lens sheet 1010 and the icon sheet 1014.

The total thickness of icon sheet 1014 plus lens sheet 1010 is designed to be substantially equal to the focal length 1024 of the micro-lenses 1008. When the lens sheet 1010 is placed substantially in contact with the icon sheet 1014, with or without coupling fluid, the focal point 1022 the micro-lenses 1008 should lie somewhere within or near the icon elements 1020. The optimal position of the focal point 1022 is at, or slightly below, the lower extent of the icon elements 1020.

A system formed according to the embodiment of FIG. 41(*b*) can be used as an anticounterfeiting and authentication device. For example, the lower surface of the icon sheet 1014 can be attached, adhered, or otherwise permanently secured to, or incorporated into, an object or document at the time of manufacture, original creation, packaging, or distribution. The icon sheet 1014 by itself does not need to have any visibly distinguishing features. In practice the icon elements 1020 will be very small, on the order of a few microns to a few tens of microns in dimension, and will be effectively invisible to the unaided eye. Additional conventional printing or imaging can be provided on or attached to icon sheet 1014, if desired. An example of such additional imaging could be a person's photograph for identification, such that the icon sheet performs as a background to the photograph. The icon sheet 1014, and by association, the object to which it is securely attached, can be authenticated by placing an appropriately scaled lens sheet 1010 substantially into contact with the icon sheet 1014 and rotating the lens sheet 1010 within its plane until the lenses and icon elements 1020 align sufficiently to form a synthetic image of the icon elements 1020.

Either structure or form of icon sheet (1002 or 1014) can incorporate multiple patterns of icon elements (996 or 1020, respectively) that form different synthetic images that can be read or authenticated at different lens sheet rotation angles (such as one icon pattern that produces a maximum magnification synthetic image at a lens sheet rotation angle of 0 degrees and a second icon pattern that produces a maximum magnification synthetic image at a lens sheet rotation angle of 30 degrees), different lens repeat period, different lens and icon array geometry (such as one array set having a hexagonal geometry and a second array set having a square geometry), and combinations thereof.

An example of the different lens period authentication method is an icon sheet incorporating an icon element pattern that produces a Deep image when synthetically magnified by a lens sheet having a repeat period of 30 microns and also incorporating a second icon element pattern that produces a Float image when synthetically magnified by a lens sheet having a repeat period of 45 microns. The second icon element pattern can optionally be authenticated at a different rotational angle than the first icon element pattern.

Materials having multiple icon patterns can incorporate one set of information that can be revealed by a first key (lens sheet having a first selected repeat period) and additional sets of information that can each be revealed by additional keys (lens sheets each matched to the scale of their respective icon element repeats). The multiple icon patterns can also be provided in different icon layers requiring focusing elements having differing focal lengths for forming visible synthetic optical images from the different icon layers.

Figure 42:
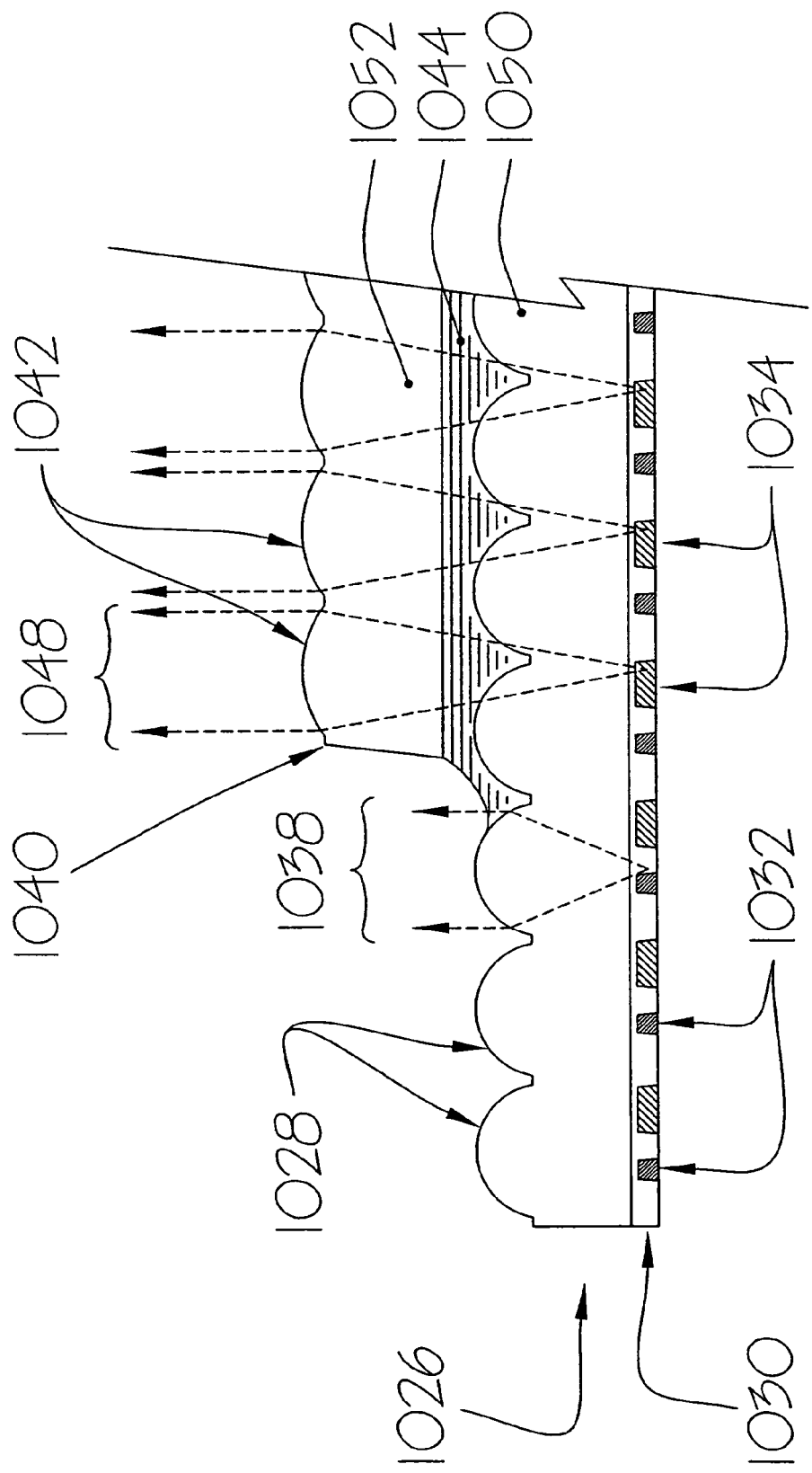
FIG. 42 illustrates an alternate embodiment of the "lock and key" embodiment of FIG. 41.

The embodiment of FIG. 42 is referred to as a 'wet decoder' method and system for incorporating covert information into a moiré magnification system 1026 of the present disclosure that can subsequently be "decoded" or revealed through the use of a covert authentication lens sheet 1040. In this figure the magnification system 1026, including microlenses 1028 and icon layer 1030, incorporates covert icon patterns 1034 in or on the icon layer 1030. Icon layer 1030 may also optionally include overt icon patterns 1032. The magnification system 1026 is designed to produce an overtly viewable synthetic image 1038 of the overt icon patterns 1032, as has previously been taught. In contrast, the repeat period and or rotational symmetry of the covert icon patterns 1034 are purposefully designed so as to not produce overtly viewable synthetic images when viewed by the means of micro-lenses 1028.

For example, the repeat period of the covert icon patterns 1034 can be designed to be substantially different from the repeat period of the micro-lenses 1028; the covert icon pattern 1034 period may be designed to be 37 microns while the micro-lens 1028 period may be designed to be 32 microns. This icon to lens scale ratio (about 1.156) will create a Float synthetic image of the covert icon pattern 1034 having a period of about 205 microns. The features of a covert synthetic image of this size are essentially invisible to the naked eye. (The covert icon period can alternatively be chosen to produce a Deep synthetic image of equivalent period with an icon to lens scale ratio of about 0.865. For a given micro-lens repeat period, the repeat period of the covert icons can be designed to produce synthetic images having any Unison moiré magnification effect, including but not limited to SuperDeep, Deep, Motion, Float, SuperFloat, Morph.) The specific dimensions presented here represent only a single example of the continuum of dimensions that may be chosen.

As another example, the rotational symmetry of the covert icon patterns 1034 can be designed to be substantially different from that of the micro-lenses 1028. In this example we will assume that both the micro-lenses 1028 and the covert icon patterns 1034 are arranged in a hexagonal array, but the orientation of the array of covert icon patterns 1034 is rotated 30 degrees from that of the array of micro-lenses 1028. This misalignment of the two arrays will also prevent the formation of an overtly viewable synthetic image of the covert icon patterns 1034. Yet another method to prevent the formation of covert icon pattern 1034 synthetic images is to arrange the micro-lenses 1028 into one array geometry, such as hexagonal, while the covert icon patterns 1034 are arranged into a different array geometry, such as square.

The covert icon patterns 1034 can be revealed by forming a synthetic image with an additional, separate element, a covert authentication lens sheet 1040 that is brought near to, or substantially in contact with, the micro-lenses 1028 of the magnification system 1026 with an optically coupling material 1044 filling the gaps between them. The optically coupling material is preferably a liquid, such as glycerin or corn syrup, that has a refractive index that is similar to the refractive indices of the material 1052 forming the covert authentication lens sheet and the material 1050 forming the magnification system lenses 1028. The coupling material has the function of partially or fully negating the focusing power of lenses 1028 by immersing them in a medium having a similar refractive index. Other materials that can be used to perform this function include gels (including gelatins), elastomers, and pressure sensitive adhesives.

The properties of the covert authentication lens sheet 1040, including its array geometry, repeat period, and micro-lens focal length, are designed to coordinate with the array geometry and repeat period of the covert icon patterns 1034 and the total distance from the covert authentication lens sheet lenses 1042 and the icon plane 1030.

In practice, a small amount of a fluid such as glycerin is placed on the surface of the magnification system lenses 1028 and the flat surface of the covert authentication lens sheet 1040 is placed in contact with the fluid and pressed substantially into contact with the lenses 1028. The covert authentication lens sheet 1040 is then rotated in its plane to substantially align the orientation of the array of micro-lenses 1042 with the orientation of the array of covert icon patterns 1034. As alignment is approached the covert icon pattern 1034 synthetic image 1048 becomes magnified sufficiently to be distinguished with the naked eye, reaching maximum magnification at the position wherein the two arrays have substantially identical orientations.

An alternative embodiment is to form the covert authentication lens sheet 1040 as a pressure-sensitive label or tape that can be applied to the surface of lenses 1028. In this embodiment the function of the optically coupling material 1044 is performed by a substantially transparent pressure sensitive adhesive applied to the flat surface of the covert authentication lens sheet 1040. A method of aligning the covert authentication lens sheet 1040 to the orientation of the covert icon pattern 1034 is desirable, such as by printed alignment patterns or oriented edges of the magnification system 1026 that the edge of the covert authentication lens sheet 1040 can be matched to at the time of application.

Yet another alternative structure for a 'wet decoder' method and system is to incorporate the covert icon patterns 1034 into a second icon layer. This second icon layer may be either closer to the lenses 1028 or further from the lenses 1028 than the first icon layer 1030. The focal length and thickness of the covert authentication lens sheet 1040 is then designed to cause its focal point to fall in the second icon layer when the covert authentication lens sheet 1040 is applied to lenses 1028 with optically coupling material 1044. In this embodiment, the array properties of the covert icon patterns 1034 can be the same as those of the overt icon patterns, so long as the position of the second icon plane does not enable the lenses 1028 to form a distinguishable overt image of the covert icon patterns 1034.

Figure 43:
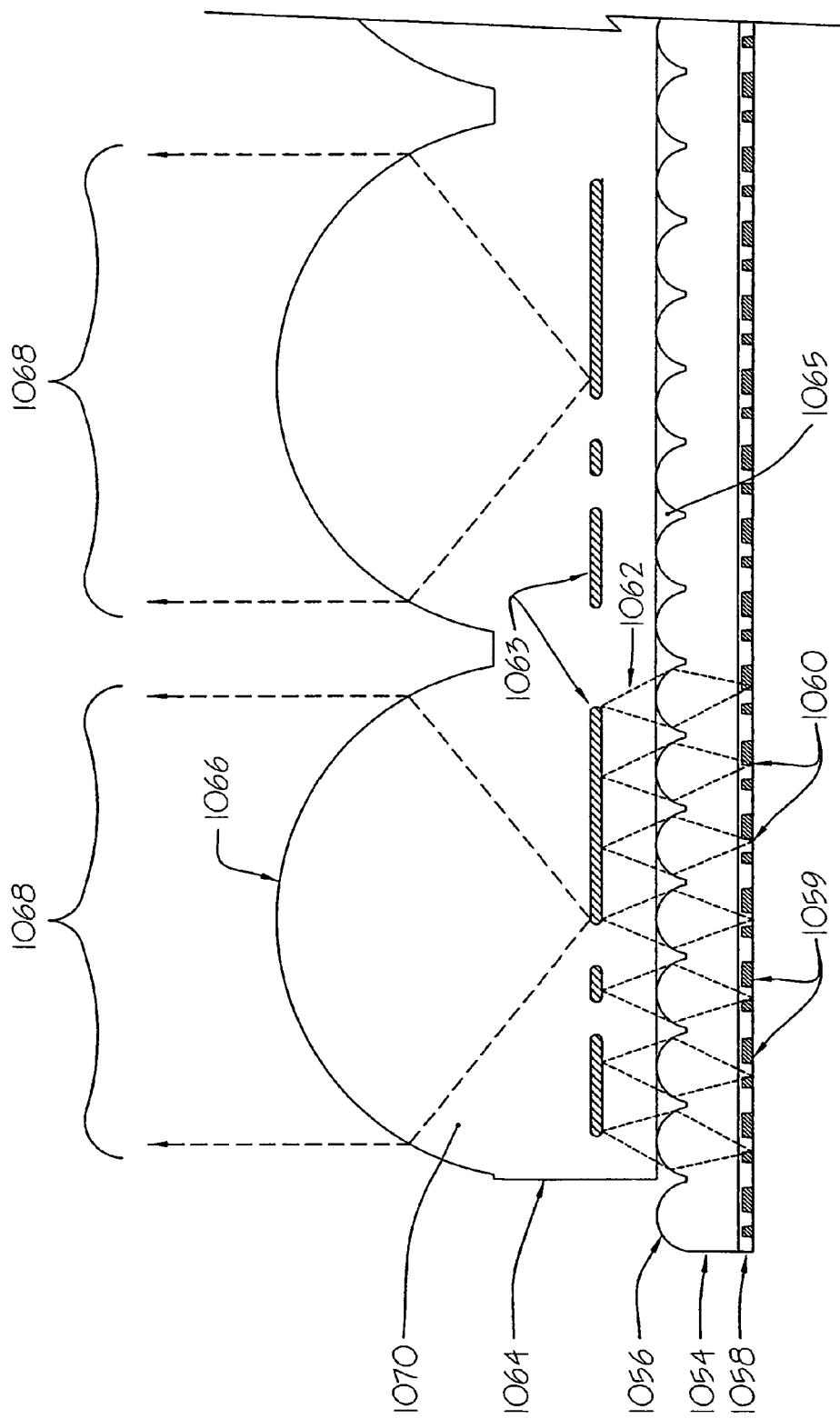
FIG. 43 illustrates a further embodiment of the "lock and key" embodiment of FIG. 41.

The embodiment of FIG. 43 is referred to as a 'dry decoder' method and system for incorporating covert information into a magnification system 1054 that can subsequently be "decoded" or revealed through the use of a covert authentication lens sheet 1064. In this figure the magnification system 1054, including micro-lenses 1056 and icon layer 1058, incorporates covert icon patterns 1060 in or on the icon layer 1058. Icon layer 1058 may also optionally include overt icon patterns 1059. The magnification system 1056 may optionally be designed to produce an overtly viewable synthetic image of the overt icon patterns 1059, as has previously been taught. In contrast, the repeat period and or rotational symmetry of the covert icon patterns 1060 are purposefully designed so as to not produce overtly viewable synthetic images when viewed by the means of micro-lenses 1056.

For example, the repeat period of the covert icon patterns 1060 can be designed to be substantially different from the repeat period of the micro-lenses 1056; the covert icon pattern 1060 period may be designed to be 28.071 microns while the micro-lens 1056 period may be designed to be 28.000 microns. This icon to lens scale ratio (about 1.00255) will create a floating synthetic image 1063 (of the covert icon patterns 1060) having a period of about 392 microns. The features of a covert synthetic image of this size are essentially invisible to the naked eye. (The covert icon period can alternatively be chosen to produce a Deep synthetic image of equivalent period with an icon to lens scale ratio of about 0.99746 For a given micro-lens repeat period, the repeat period of the covert icons can be designed to produce synthetic images having any Unison moiré magnification effect, including but not limited to SuperDeep, Deep, Motion, Float, SuperFloat, Morph.) The specific dimensions presented here represent only a single example of the continuum of dimensions that may be chosen.

As another example, the rotational symmetry of the covert icon patterns 1060 can be designed to be substantially different from that of the micro-lenses 1056. In this example we will assume that both the micro-lenses 1056 and the covert icon patterns 1060 are arranged in a hexagonal array, but the orientation of the array of covert icon patterns 1060 is rotated 30 degrees from that of the array of micro-lenses 1056. This misalignment of the two arrays will also prevent the formation of an overtly viewable synthetic image of the covert icon patterns 1060. Yet another method to prevent the formation of covert icon pattern 1060 synthetic images is to arrange the micro-lenses 1056 into one array geometry, such as hexagonal, while the covert icon patterns 1060 are arranged into a different array geometry, such as square.

The covert synthetic images 1063 can be made visible by forming a second synthetic image by means of an additional, separate element, a covert authentication lens sheet 1064 that is brought near to, or substantially in contact with, the micro-lenses 1056 of the magnification system without the use of an optically coupling material filling the gap 1065 between them. Gap 1065 is filled with air, vacuum, or any other gas that permeates the ambient environment of the magnification system 1054.

The properties of the covert authentication lens sheet 1064, including its array geometry, repeat period, and micro-lens focal length, are designed to coordinate with the array geometry and repeat period of the covert synthetic images 1063 and the total distance from the covert authentication lens sheet lenses 1066 and the position of the covert synthetic images 1063 as they are projected into the material 1070 forming the covert authentication lens sheet 1064.

In practice, the flat surface of the covert authentication lens sheet 1064 is placed in contact with the magnification lenses 1056. The covert authentication lens sheet 1064 is then rotated in its plane to substantially align the orientation of the array of micro-lenses 1066 with the orientation of the array of covert synthetic images 1063. As alignment is approached the covert synthetic images 1063 form a second synthetic image 1068 that becomes magnified sufficiently to be distinguished with the naked eye, reaching maximum magnification at the position wherein the two arrays have substantially identical orientations.

An alternative embodiment is to form the covert authentication lens sheet 1064 as a pressure-sensitive label or tape that can be applied to the surface of lenses 1056. In this embodiment either a very thin (substantially less than the height of micro-lenses 1056) substantially transparent pressure-sensitive adhesive (not shown in the figure) may be applied to the entire flat surface of the covert authentication lens sheet 1064 or a patterned pressure-sensitive adhesive (not shown in the figure) may be applied to this surface. In the first case, application of the very thin substantially transparent pressure-sensitive adhesive-coated covert authentication lens sheet to the magnification system 1056 will cause the adhesive to contact the tops of the lenses 1056 without filling the gap 1065 and obscuring the sides of the lenses, thus preserving the air gap that enables lenses 1056 to form the first covert synthetic images 1063. In the second case the covert authentication lens sheet 1064 will maintain an unfilled gap 1065 in those areas where there is no adhesive. A method of aligning the covert authentication lens sheet 1064 to the orientation of the covert icon pattern 1060 is desirable, such as by printed alignment patterns or oriented edges of the magnification system 1056 that the edge of the covert authentication lens sheet 1064 can be matched to at the time of application.

Yet another alternative structure for a 'dry decoder' method and system is to incorporate the covert icon patterns 1060 into a second icon layer. This second icon layer may be either closer to the lenses 1056 or further from the lenses 1056 than the first icon layer 1058, in any location that enables lenses 1056 to form a real or virtual image of covert icons 1060. The focal length and thickness of the covert authentication lens sheet 1064 is then designed to cause its focal point to fall in the location of the covert synthetic image formed by lenses 1056 when covert authentication lens sheet 1064 is placed substantially in contact with lenses 1056.

Yet another method of revealing hidden information in a magnification system of the present disclosure is illustrated in FIGS. 44(a,b). We have coined the term HydroUnison for moiré magnification systems that utilize the principles of this embodiment. In FIG. 44(a), a HydroUnison moiré magnification system 1078 incorporates an array of micro-lenses 1080, an icon layer 1082, and an optical spacer 1081 between them that may be contiguous with either the micro-lenses 1080, the icon layer 1082, or both. Icon layer 1082 incorporates icon patterns 1084. The thickness of the optical spacer 1081 is substantially greater than the focal length 1086 of the micro-lenses 1080 when they are in air, another gas or vacuum. It can be seen that the air foci 1088 of micro-lenses 1080 are far from the icon patterns 1084 and the icon layer 1082. The in-air synthetic image projection 1090 from micro-lenses 1080 is therefore severely blurred and out of focus, without a distinguishable image.

FIG. 44(b) illustrates the effect of immersing the micro-lenses 1080 in a suitable fluid 1092 such as water. (Immersion is a relative situation—so long as the fluid 1092 lies over micro-lenses 1080 in a layer that is greater than the center height 1091 of the lenses 1080, the lenses are "immersed" from the standpoint of optics.) Changing the refractive index of the medium outside of the HydroUnison moiré magnification system 1078 can change the focal length of the micro-lenses 1080. In this example, increasing the refractive index of the medium outside of the system increases the focal length of micro-lenses 1080. The thickness of optical spacer 1081 is chosen to bring the focal points 1088 of the fluid 1092 immersed micro-lenses 1080 into or near the icon layer 1082. Under these conditions the micro-lenses 1080 can project well-focused synthetic images 1095 of the icon patterns 1084.

HydroUnison system according to this embodiment appears to have no distinct image when it is viewed in a dry state, with the lenses 1080 in air. When the lenses are wetted (immersed) with a liquid having a refractive index substantially equal to the selected immersion fluid 1092 index, a synthetic image suddenly appears. This effect is particularly dramatic if the synthetic image is a combination Float/Deep image or a SuperDeep image. As the HydroUnison system dries the synthetic image fades away and disappears.

Designing a HydroUnison system to produce this effect when immersed in a fluid 1092 having a selected refractive index is accomplished by making the thickness of the optical spacer 1081 to be approximately equal to the fluid 1092 immersed micro-lens 1080 focal length 1094 for a given choice of fluid 1092. A convenient fluid 1092 is water, with a typical refractive index of about 1.33. Although the HydroUnison moiré magnification system 1078 may not be a "thin lens" optical system, the thin-lens system design Lensmaker's Formula can be used to find a suitably accurate design thickness of the optical spacer 1081 for a chosen immersion fluid 1092.

The Lens-maker's formula is:

$$1/f = (n_{lens} - n_0)(1/R_1 - 1/R_2)$$

wherein:

f = the lens focal length when immersed in a medium of refractive index $n_0$
$n_{lens}$ = the refractive index of the lens material
$n_0$ = the refractive index of the immersion medium
$R_1$ = the radius of curvature of the first lens surface
$R_2$ = the radius of curvature of the second lens surface Since the focal point of the lenses 1080 is internal to the HydroUnison moiré magnification system 1078, the only curvature affecting the focal length is the first curvature, $R_1$—the second curvature, $R_2$, can be treated as a flat surface with a radius of infinity, reducing the ratio $1/R_2$ equal to zero. The Lens-maker's formula then simplifies to:

$$1/f = (n_{lens} - n_0)/R_1 \text{ or } f = R_1/(n_{lens} - n_0)$$

For the case of a lens in air, $n_{lens} = 1.487$, and $n_0 = n_{air} = 1.000$:

$$f_{air} = R_1/(1.487 - 1.000) = R_1/0.487 = 2.053\,R_1$$

For the case of a lens immersed in water, $n_{lens} = 1.487$, and $n_0 = n_{H2O} = 1.333$:

$$f_{H2O} = R_1/(1.487 - 1.333) = R_1/0.154 = 6.494\,R_1$$

So the water-immersed focal length of the lenses 1080 is found to be approximately greater than the in-air focal length of the lenses 1080 by a factor of:

$$f_{H2O}/f_{air} = (6.494\,R_1)/(2.053\,R_1) = 3.163$$

For example, if a given micro-lens 1080 formed from a material having a refractive index of 1.487 has an in-air focal length 1086 of 23 microns, then that micro-lens 1080 will have an approximate focal length of 23×3.163=72.7 microns when immersed in water.

Other fluids having a similar refractive index to the selected immersion fluid 1092 refractive index can be used to reveal the hidden image, with the effectiveness of a particular fluid depending, in part, on how closely its refractive index matches that of the selected immersion fluid refractive index 1092. For example, ethyl alcohol has a refractive index of about 1.36. The focal length of the lenses in the example above would be 88.2 microns when immersed in ethyl alcohol, so the synthetic image 1095 would be slightly out of focus if the optical spacer 1081 was designed with a thickness of about 73 microns, corresponding to a selected immersion fluid 1092 having the refractive index of water.

The embodiment of FIGS. 44(*a,b*) can be used for a variety of applications, including but not limited to authentication of articles bearing a HydroUnison system film laminate, label, patch, thread, seal, stamp, or sticker, such as event tickets, lottery tickets, ID cards, visas, passports, drivers licenses, government documents, birth certificates, negotiable instruments, travelers' checks, bank checks, currency, gambling chips, manufactured goods, and other allied and similar articles. HydroUnison systems can also be used to provide decorative, novelty, and wetness indicating utility to articles, documents, and manufactured goods.

Other embodiments of Unison moiré magnification systems as taught previously herein are also wetness indicating—immersing the lenses of these Unison systems in a fluid will generally prevent the materials from forming a synthetic image. The synthetic image returns when the liquid is dried or removed.

The embodiment of FIGS. 44(*a,b*) can be further extended to provide a multiple image HydroUnison system 1096 that can present two or more different Unison moiré magnification synthetic images, in the same or in different colors, when the HydroUnison microlenses 1098 are immersed in different media (1112, 1120, 1128). The example presented in FIGS. 45(*a-c*) illustrates a HydroUnison system 1096 that can produce three different synthetic images (1114, 1126, 1134). The first synthetic image is produced when the lenses are in a medium 1112 of air, vacuum or another gas; the second synthetic image is produced when the lenses are immersed in water 1120 or other liquid with a refractive index on the order of about 1.33; and the third synthetic image is produced when the lenses are immersed in a medium 1128 having a refractive index of about 1.418 (such as a uniform mixture of 62 volumetric percent glycerin and 389 volumetric percent water).

Each of these three synthetic images can be the same color, pattern, and type of Unison effect as the others, or they can be different from the others in color, pattern, and Unison effect. While the type, color, and pattern of a Unison synthetic image can be the same for some or all synthetic images produced by a HydroUnison system, it is important to note that the magnitude of Unison depth effects (SuperDeep, Deep, Float, SuperFloat, Levitate), i.e., the apparent height of float images and the depth of Deep images, is proportional to the f-number of the micro-lenses 1112. Immersing the micro-lenses 1098 in media having different refractive indices changes the f-number of the micro-lenses 1098 and proportionately amplifies the magnitude of the Unison depth effects in the synthetic images respectively produced.

HydroUnison moiré magnification system 1096 incorporates micro-lenses 1098, first optical spacer 1100 separating micro-lenses 1098 from first icon layer 1102, first icon layer 1102 bearing first icon patterns 1117, second optical spacer 1104 separating first icon layer 1102 from second icon layer 1106, second icon layer 1106 bearing second icon patterns 1119, third optical spacer 1108 separating second icon layer 1106 from third icon layer 1110, and third icon layer 1110 bearing third icon patterns 1111.

FIG. 45(*a*) illustrates the function of an exemplary multiple image HydroUnison system 1096. When the micro-lenses 1098 are immersed in a medium having an index substantially equal to 1.000 (such as vacuum, air, and most gases) the micro-lenses 1098 have a focal length 1116 that places their focal points 1118 in or near first icon layer 1102. Icon layer 1102 may be omitted, but if it is present and if it bears suitable icon patterns 1117 in the correct geometric relationship to the micro-lenses 1098 (as has been taught in connection with the various embodiments of the subject invention) then micro-lenses 1098 will project a synthetic image 1114 of the first icon pattern 1117.

In FIG. 45(*b*) the micro-lenses 1098 are shown immersed in a liquid 1120 having a refractive index of approximately 1.33, such as water. The fluid immersed focal length 1122 of the micro-lenses 1098 is now more than three times greater than the in-air focal length 1116 of micro-lenses 1098. The water-immersed focal point 1124 is now approximately at the depth of the second icon layer 1106 and the micro-lenses 1098 can form a synthetic image 1126 of the second icon patterns 1119.

The function of the example multiple image HydroUnison moiré magnification system 1096 when micro-lenses 1098 are immersed in a fluid 1128 have a refractive index of 1.418 is illustrated in FIG. 45(*c*). Since the refractive index of the immersion fluid 1128 is even closer to the refractive index of the micro-lenses 1098, their focal length 1130 is substantially greater—about 7.2 times larger than the in-air focal length 1116. The new focal point 1132 is now approximately at the depth of the third icon layer 1110 and the micro-lenses 1098 can form a synthetic image 1134 of the third icon patterns 1111.

Infinitely many variations of the embodiment of FIGS. 45(*a-c*) are clearly possible within the scope of the subject invention, including the choice of the number of synthetic images that can be projected, the color and type of synthetic image, the presence or absence of specific icon layers, the choice of immersion fluid refractive index, etc.

Applications of the embodiment of FIGS. 45(*a-c*) include, but are not limited to: premium and promotional items, authentication and security materials, gaming devices, wetness indicators, and devices to distinguish different liquids.

Figure 46:
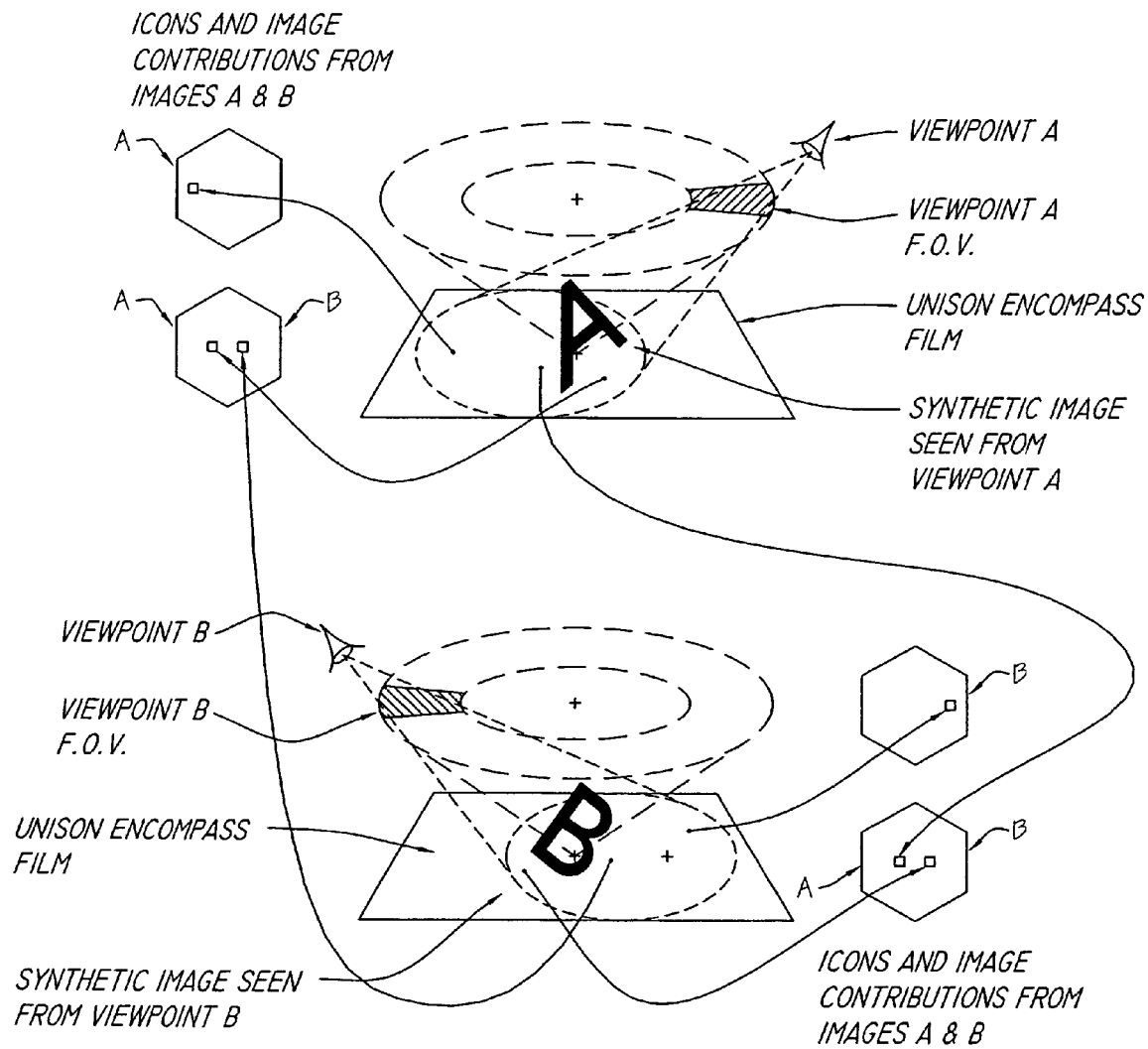
FIG. 46 illustrates an embodiment of the present micro-optic system dependent upon azimuthal viewing angle.

Another effect that can be obtained through the use of the magnification system of the present disclosure is illustrated in FIG. 46. The effect enables the synthetic image seen by a viewer to change as the relative azimuthal angle of the viewer changes. The changing images are seen within a cone of viewing angles displaced away from the normal by a selected amount. When the viewer observes the Unison Encompass moiré magnification system within that hollow viewing cone the image seen can be designed to depend on the particular azimuthal angle of the viewer around that hollow cone. At the top of FIG. 46 the viewer is observing the magnification system from viewpoint A, and from that viewpoint she sees a synthetic image of a capital letter "A". If the viewer moves to a different azimuthal viewpoint, such as viewpoint B shown at the bottom of FIG. 46, then she may see a different synthetic image, such as the image of a capital letter "B".

The method of accomplishing the effect is also illustrated in FIG. 46 at the upper left and lower right of the figure. When the viewer is observing the magnification system from viewpoint A, the micro-lenses in the system are forming synthetic images from the left sides of the icon patterns, as shown in the upper left of the figure. When the viewer is observing the material from viewpoint B, the micro-lenses are forming synthetic images from the right side of the icon patterns, as shown at the lower right of the figure. The specific image elements incorporated into each icon pattern will, in general, be unique for each icon pattern, since each icon pattern carries information about multiple synthetic images as seen from multiple viewpoints.

Figure 47:
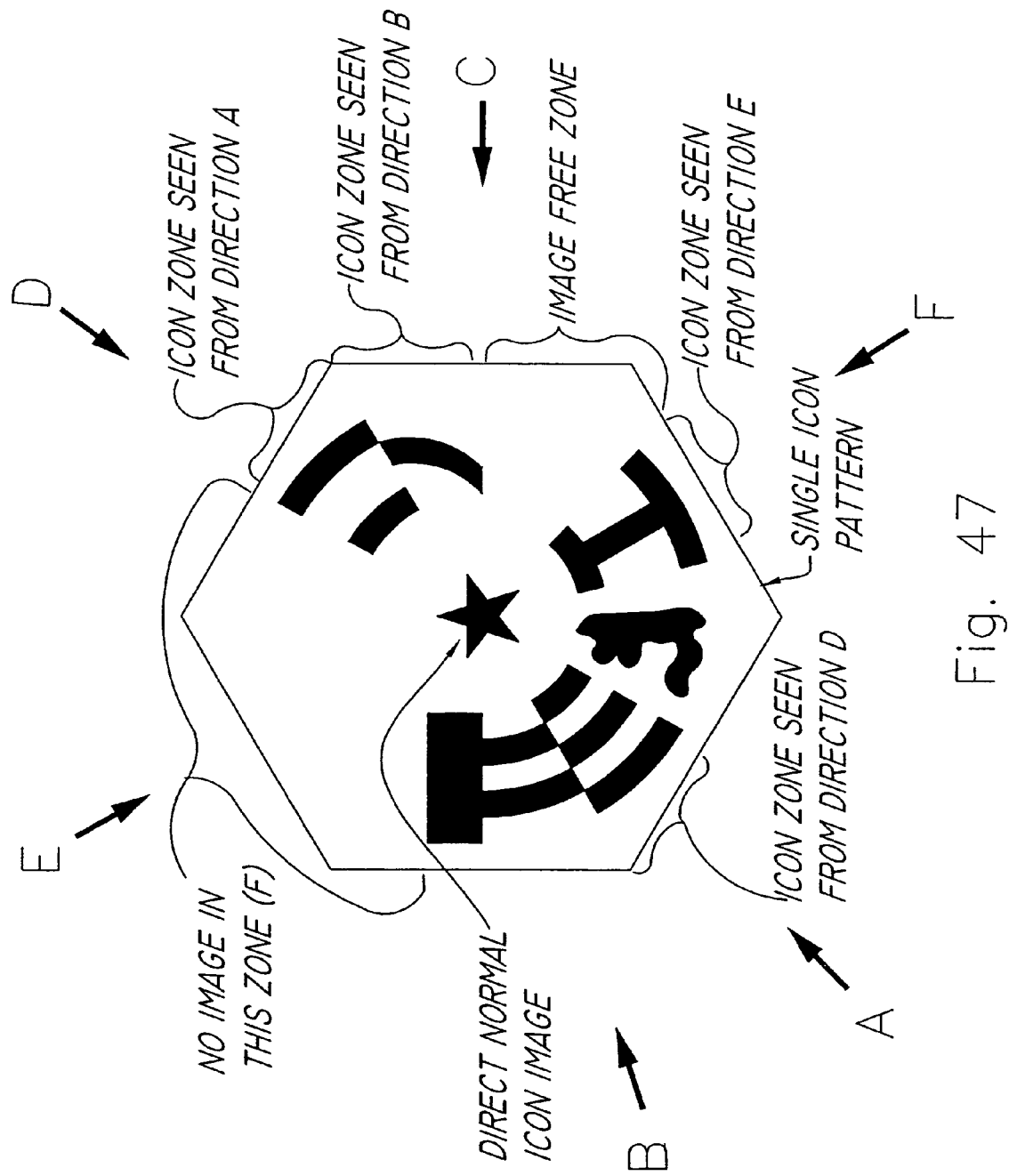
FIG. 47 illustrates an alternate embodiment of the micro-optic system of FIG. 46.

FIG. 47 illustrates the specific image elements incorporated into one representative icon pattern. In this figure it can be seen that the image elements in icon zone A will be visible from a range of altitudes from the azimuthal viewpoint direction A. Similarly, the icon zone B will be seen from the viewpoint direction B, and so on. Note that there are no image elements in the icon zone at the upper left of the icon pattern (zone F), so this would represent a blank area in the synthetic image as seen from the viewpoint of direction F.

This embodiment has a multiplicity of uses. Examples include: a synthetic image that does not appear to change from different azimuthal angles, such that it always faces, or "tracks" the viewer; a series of connected images that form a motion picture or animation can be presented; multiple pages of text or graphical information can be provided such that the viewer "turns the pages" by rotating the material and viewing it from different azimuthal positions; street signs or traffic control signs that present different information to drivers approaching them from different directions; and many other applications.

Figure 48:
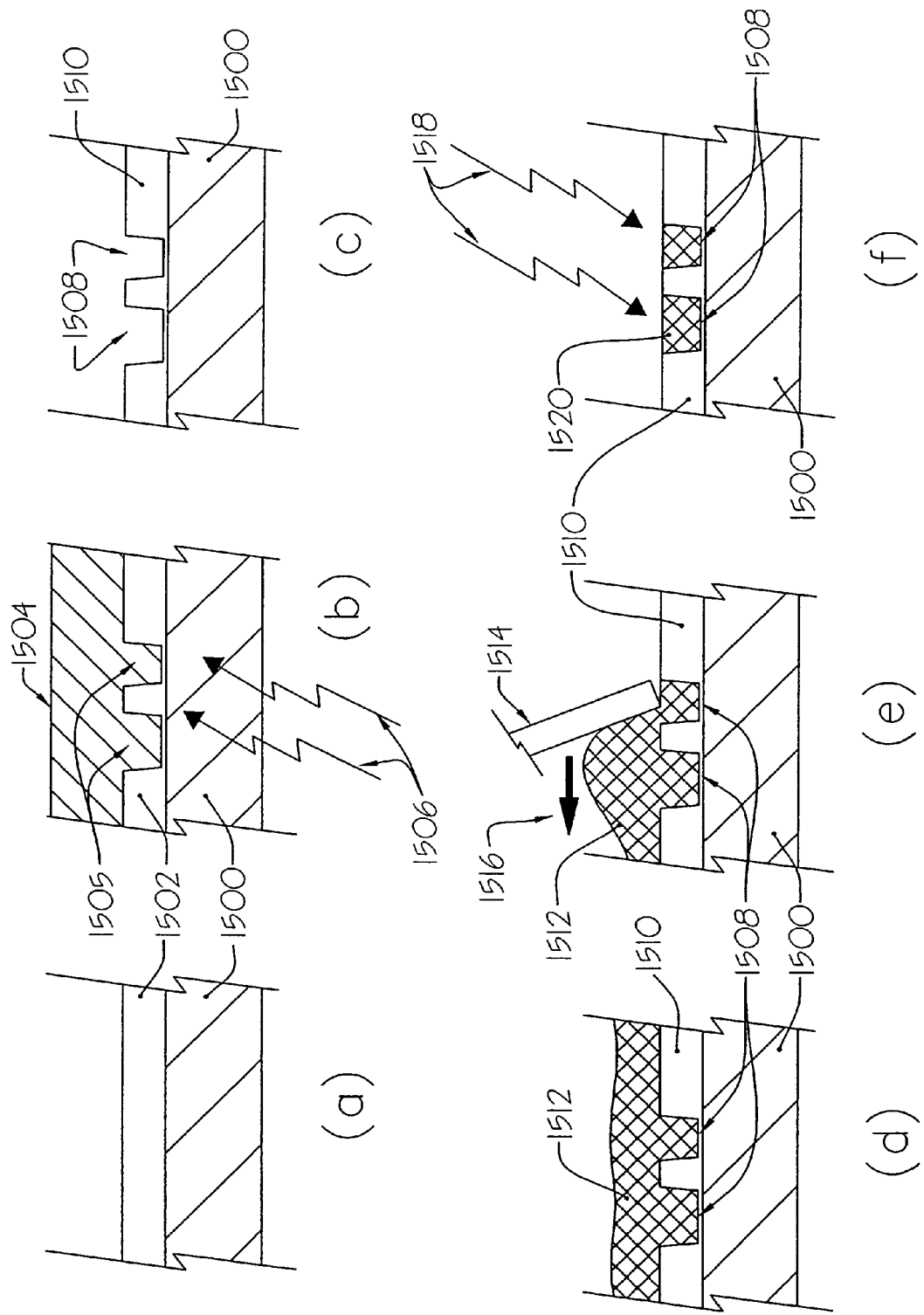
FIGS. 48a-f illustrate a method of creating filled microstructured icon elements for use in an embodiment of the present micro-optic system.

FIGS. 48(*a-f*) illustrate a preferred method of creating filled icon microstructures. In FIG. 48(*a*) a film substrate (preferably 92 gage polyester film) carries a coating of a gel or liquid polymer 1502 (such as Lord Industries U107). In FIG. 48(*b*) the gel or liquid polymer coating 1502 is brought into contact with an icon microstructure tool 1504, typically created by nickel electroforming, and a suitable energy (such as ultraviolet light or electron beam irradiation) is applied to cause the gel or liquid polymer coating 1502 to polymerize and retain the microstructure shape of the icon microstructure tool 1504. When the icon microstructure tool 1504 is removed, FIG. 48*c*, the polymerized coating icon layer 1510 retains negative impressions of the icon microstructure tool, these negative impressions constituting the icon layer 1510 icon microstructures 1508. The icon layer 1510 is then coated with an icon fill material 1512, FIG. 48*d*, that fills the icon microstructures 1508. The icon fill material 1512 is removed from the top surface (as drawn) of the icon layer 1510 by means of a doctor blade 1514 that moves in the direction of arrow 1516. The doctor blade 1514 selectively removes the icon fill material 1512 from the flat upper surface of the icon layer while leaving it behind in the icon microstructures 1508, as shown in FIG. 48*f*. The icon fill material 1520 remaining in the icon microstructures 1508 is then optionally polymerized by the application of a suitable energy source (such as ultraviolet light or electron beam irradiation).

If the icon fill material 1512 is solvent-based, the final process step may include heating to drive off the excess solvent.

The systems and devices herein have many fields of use and applications. Examples include:

Government and defense applications—whether Federal, State or Foreign (such as Passports, ID Cards, Driver's Licenses, Visas, Birth Certificates, Vital Records, Voter Registration Cards, Voting Ballots, Social Security Cards, Bonds, Food Stamps, Postage Stamps, and Tax Stamps);

currency—whether Federal, State or Foreign (such as security threads in paper currency, features in polymer currency, and features on paper currency);

documents (such as Titles, Deeds, Licenses, Diplomas, and Certificates);

financial and negotiable instruments (such as Certified Bank Checks, Corporate Checks, Personal Checks, Bank Vouchers, Stock Certificates, Travelers' Checks, Money Orders, Credit cards, Debit cards, ATM cards, Affinity cards, Prepaid Phone cards, and Gift Cards);

confidential information (such as Movie Scripts, Legal Documents, Intellectual Property, Medical Records/Hospital Records, Prescription Forms/Pads, and "Secret Recipes");

product and brand protection, including Fabric & Home Care (such as Laundry Detergents, fabric conditioners, dish care, household cleaners, surface coatings, fabric refreshers, bleach, and care for special fabrics); beauty care (such as Hair care, hair color, skin care & cleansing, cosmetics, fragrances, antiperspirants & deodorants, feminine protection pads, tampons and pantiliners);

baby and family care (such as Baby diapers, baby and toddler wipes, baby bibs, baby change & bed mats, paper towels, toilet tissue, and facial tissue);

health care (such as Oral care, pet health and nutrition, prescription pharmaceuticals, over-the counter pharmaceuticals, drug delivery and personal health care, prescription vitamins and sports and nutritional supplements; prescription and non-prescription eyewear; Medical devices and equipment sold to Hospitals, Medical Professionals, and Wholesale Medical Distributors (ie: bandages, equipment, implantable devices, surgical supplies);

food and beverage packaging;

dry goods packaging;

electronic equipment, parts & components;

apparel and footwear, including sportswear clothing, footwear, licensed and non-licensed upscale, sports and luxury apparel items, fabric;

biotech pharmaceuticals;

aerospace components and parts;

automotive components and parts;

sporting goods;

tobacco Products;

software;

compact disks and DVD's;

explosives;

novelty items (such as gift wrap and ribbon)

books and magazines;

school products and office supplies;

business cards;

shipping documentation and packaging;

notebook covers;

book covers;

book marks;

event and transportation tickets;

gambling and gaming applications (such as Lottery tickets, game cards, casino chips and items for use at or with casinos, raffle and sweepstakes);

home furnishing (such as towels, linens, and furniture);

flooring and wallcoverings;

jewelry & watches;

handbags;

art, collectibles and memorabilia;

toys;

displays (such as product Point of Purchase and Merchandising displays);

product marking, labeling and packaging (such as labels, hangtags, tags, threads, tear strips, over-wraps, securing a tamperproof image applied to a branded product or document for authentication or enhancement, as camouflage, and as asset tracking).

Suitable materials for the embodiments described above include a wide range of polymers. Acrylics, acrylated polyesters, acrylated urethanes, polypropylenes, urethanes, and polyesters have suitable optical and mechanical properties for both the microlenses and the microstructured icon elements. Suitable materials for the optional substrate film include most of the commercially available polymer films, including acrylic, cellophane, Saran, nylon, polycarbonate, polyester, polypropylene, polyethylene, and polyvinyl. Microstructured icon fill materials can include any of the materials listed above as suitable for making microstructured icon elements, as well as solvent based inks and other commonly available pigment or dye vehicles. Dyes or pigments incorporated into these materials should be compatible with the chemical makeup of the vehicle. Pigments must have a particle size that is substantially smaller than the smallest dimensions of any component of an icon element. Optional sealing layer materials can include any of the materials listed above as suitable for making microstructured icon elements, plus many different commercially available paints, inks, overcoats, varnishes, lacquers, and clear coats used in the printing and paper and film converting industries. There is no preferred combination of materials—the choice of materials depends o the details of the material geometry, on the optical properties of the system, and on the optical effect that is desired.

Although exemplary embodiments have been shown and described, it will be clear to those of ordinary skill in the art that a number of changes, modifications, or alterations to the invention as described can be made. All such changes, modifications, and alterations should therefore be seen as within the scope of the disclosure.

We claim:

1. A synthetic optical image system, comprising
   a) an array of image icon elements including microstructured icon elements having a physical relief; and
   b) an array of image icon focusing elements, the array of the image icon focusing elements being disposed in relation to the array of the image icon elements at a distance sufficient for at least a portion of the image icon focusing elements to form at least one synthetically magnified image of at least a portion of the image icon elements, wherein the system comprising the array of image icon elements and the array of image icon focusing elements has a thickness of less than 50 microns, or image icon focusing elements having an effective diameter of less than 50 microns, or both.

2. The synthetic optical image system of claim 1, wherein the microstructured icon elements are either incorporated into an icon layer, or in a coating layer formed on a substrate.

3. The synthetic optical image system of claim 2, wherein the microstructured icon elements are formed either as recesses or as raised areas, or both.

4. The synthetic optical image system of claim 2, wherein the microstructured icon elements are selected from one or more of asymmetric void patterns, symmetric void patterns, light trap patterns, asymmetric raised patterns, symmetric raised patterns, holographic surface relief patterns, generalized diffractive relief patterns, binary structured patterns, binary optic patterns, stepped relief patterns, random rough and pseudo-random rough patterns, nominally flat-surfaced patterns, and concave or convex patterns.

5. The synthetic optical image system of claim 2, wherein the icon layer is free standing.

6. The synthetic optical image system of claim 2, wherein the icon layer is provided on a substrate.

7. The synthetic optical image system of claim 2, wherein at least a portion of the microstructured icon elements have a coating.

8. The synthetic optical image system of claim 7, wherein the coating is conformal, non-conformal, or directional.

9. The synthetic optical image system of claim 7, wherein the coating is continuous, discontinuous, or patterned.

10. The synthetic optical image system of claim 7, wherein the coating is a metal material.

11. The synthetic optical image system of claim 7, wherein the coating is laminated to the icon layer.

12. The synthetic optical image system of claim 11, wherein at least a portion of the microstructured icon elements are filled with an icon fill material prior to lamination.

13. The synthetic optical image system of claim 11, wherein at least a portion of the microstructured icon elements are coated with a coating prior to lamination.

14. The synthetic optical image system of claim 7, wherein the coating is supported by a substrate.

15. The synthetic optical image system of claim 2, wherein a portion of the microstructured icon elements forms either a positive image or a negative image or both.

16. The synthetic optical image system of claim 15, wherein a portion of the microstructured icon elements forms a color reversed image.

17. The synthetic optical image system of claim 15, wherein a portion of the microstructured icon elements forms either an image that is opaque against a transparent background or an image that is transparent against an opaque background.

18. The synthetic optical image system of claim 2, wherein at least a portion of the microstructured icon elements are filled with an icon fill material.

19. The synthetic optical image system of claim 2, further including a coating material applied to at least a portion of the surface of the layer.

20. The synthetic optical image system of claim 19, wherein the coating material is conformal to the layer, non-conformal to the layer, discontinuous, patterned, unpatterned, directional, or has coated areas having different properties or materials than the layer.

21. The synthetic optical image system of claim 19, wherein the coating material is a multi-layer dielectric material and the color of the coating appears different at different viewing angles.

22. The synthetic optical image system of claim 19, further including a fill material filling at least partially at least a portion of the microstructured icons.

23. The synthetic optical image system of claim 22, wherein at least a portion of the microstructured icons are filled with different amounts of different materials.

24. The synthetic optical image system of claim 19, wherein the coating material is patterned.

25. The synthetic optical image system of claim 24, the coating material being patterned by printing, depositing a resist material on the coating and chemically etching at least a portion of the exposed coating or chemically or mechanically removing at least a portion of the resist material.

26. The synthetic optical image system of claim 19, wherein the coating material is a patterned metallized coating.

27. The synthetic optical image system of claim 19, the coating material being a hot stamp foil.

28. The synthetic optical image system of claim 27, further including a fill material coated over at least a portion of the hot stamp foil coating or applied to the icon layer so as to only fill at least a portion of a plurality of depressions in the microstructured icon elements.

29. The synthetic optical image system of claim 19, the coating material including a directional coating.

30. The synthetic optical image system of claim 29, further including a fill material filling at least partially a portion of a plurality of depressions in the microstructured icon elements.

31. The synthetic optical image system of claim 2, further including a fill material filling at least partially at least a portion of the microstructured icons.

32. The synthetic optical image system of claim 31, wherein at least a portion of the microstructured icons are filled with different amounts of different materials.

33. The synthetic optical image system of claim 2, further including an optical spacer between the array of focusing elements and the array of image icon elements.

34. The synthetic optical image system of claim 1, wherein the synthetic optical image seen by a viewer changes as the azimuthal angle of view of the image system changes.

35. The synthetic optical image system of claim 1, wherein the synthetic optical system is one or more of a micro-optic system, a synthetic magnification micro-optic image projection system, a moire magnification system, or a micro cylindrical lenticular image system.

36. The synthetic optical image system of claim 1, the array of microstructured icon elements including areas having microstructures and areas that are unstructured, and wherein the microstructured icon elements are designed to exhibit optical contrast between the microstructures and the areas of the icon array that are unstructured when the icon array is immersed in or in contact with a vacuum, a gas, a liquid or a solid.

37. The synthetic optical image system of claim 36, wherein the optical contrast arises from at least one of refraction, internal reflection, surface reflection, scattering, polarization, optical rotation, diffraction, or optical interference.

38. The synthetic optical image system of claim 1, comprising microprinting formed from the array of image icon elements and the array of focusing elements, the arrays cooperating to form a synthetic optical image.

39. The synthetic optical image system of claim 38, wherein the microprinting is used for compact information storage.

40. The synthetic optical image system of claim 38, wherein the microprinting is used for identification of currency, in a security thread for currency, documents, packaging or manufactured articles.

41. The synthetic optical image system of claim 1, the microstructured icon elements being formed from patterned coating material provided on selected portions of a substrate, the patterned coating material forming either positive or negative object patterns of the icon elements.

42. The synthetic optical image system of claim 41, further including an additional coating layer added to the patterned coating material.

43. The synthetic optical image system of claim 1, wherein the system operates as an authentication system in which the array of focusing elements is separate from the array of image icon elements and is used to read information contained in the array of image icon elements.

44. The synthetic optical image system of claim 43, wherein the array of focusing elements is formed as a sheet and the array of image icon elements is formed as a sheet and the two sheets are adapted to be optically or mechanically coupled, and the focal length of the focusing elements is greater than the thickness of the sheet including the focusing elements.

45. The synthetic optical image system of claim 44, wherein the two sheets are coupled with a coupling fluid.

46. The synthetic optical image system of claim 44, wherein the array of image icon elements is positioned on or in a surface of its sheet and the focal point of the focusing elements is at or slightly off of said surface of said image icon elements sheet when the two sheets are coupled to form a synthetic optical image, the surface of the image icon elements sheet including the microstructured icon elements designed to form the synthetically magnified image.

47. The synthetic optical image system of claim 44, wherein the image icon elements sheet is secured to or incorporated into an object as an authentication or security device.

48. A synthetic optical image system, comprising
an array of focusing elements, and
an image system including an array of microstructured icon elements designed to collectively form an image,
wherein the array of focusing elements and the image system cooperate to form a synthetic optical image and,
wherein at least a portion of the microstructured icon elements have a coating, the coating being a metal material, and
wherein the metal coating material has selected portions that have been omitted.

49. A synthetic optical image system, comprising
an array of focusing elements, and
an image system including an array of microstructured icon elements designed to collectively form an image,
wherein the array of focusing elements and the image system cooperate to form a synthetic optical image and,
wherein at least a portion of the microstructured icon elements have a coating,
wherein the coating is patterned and the patterned coating provides an icon image independent of the microstructured icon elements such that the patterned coating creates a first synthetic image while the microstructured icon elements create a second synthetic image.

50. The synthetic optical image system of claim 49, wherein a portion of the patterned coating forms either a positive image or a negative image.

51. The synthetic optical image system of claim 50, wherein a portion of the patterned coating forms a color reversed image.

52. The synthetic optical image system of claim 50, wherein a portion of the patterned coating forms either an image that is opaque against a transparent background or an image that is transparent against an opaque background.

53. The synthetic optical image system of claim 49,
the coating material being a patterned coating material that creates a set of icon elements that collectively form an image in addition to the image collectively formed by the microstructured icon elements.

54. The synthetic optical image system of claim 49,
the coating material being patterned with a geometry that does not coordinate with the geometry of the microstructured icon elements.

55. The synthetic optical image system of claim 49,
the coating material carrying information different than information carried by the microstructured icon elements.

56. A synthetic optical image system, comprising
an array of focusing elements, and
an image system including an array of microstructured icon elements designed to collectively form an image, wherein the array of focusing elements and the image system cooperate to form a synthetic optical image and, wherein at least a portion of the microstructured icon elements have a coating, the coating being supported by a substrate, and wherein the substrate is positioned between the icon layer and the coating.

57. A synthetic optical image system, comprising
an array of focusing elements, and
an image system including an array of microstructured icon elements designed to collectively form an image,
wherein the array of focusing elements and the image system cooperate to form a synthetic optical image and,
wherein the microstructured icon elements are either incorporated into an icon layer, or in a coating layer formed on a substrate, and
wherein the layer is formed of either or both of positive icon image elements in which the positive image icon elements are formed as depressions or voids in the layer and background areas in the layer are formed as raised areas in the layer or of negative icon image elements in which the negative image icon elements are formed as raised areas in the layer and background areas in the layer are formed as depressions or voids in the layer.

58. The synthetic optical image system of claim 57, wherein at least a portion of the depressions or voids are filled with a fill material having a different property than the layer material.

59. The synthetic optical image system of claim 58, wherein the fill material includes a coloring material.

60. A synthetic optical imacie system, comprising
an array of focusing elements, and
an image system including an array of microstructured icon elements designed to collectively form an image,
wherein the array of focusing elements and the image system cooperate to form a synthetic optical image and,
wherein the microstructured icon elements are either incorporated into an icon layer, or in a coating layer formed on a substrate, and a coating material is applied to at least a portion of the surface of the layer, and
wherein the coating material is aluminum that is substantially transparent when viewed from a direction normal to the plane of the layer and the reflectivity of the coating increases with increasing angle of incidence so that the sides of the coated icon elements appear more reflective resulting in the appearance of a high-contrast outline of the icon elements.

61. A synthetic optical image system, comprising
an array of focusing elements, and
an image system including an array of microstructured icon elements designed to collectively form an image,
wherein the array of focusing elements and the image system cooperate to form a synthetic optical image,
wherein the system operates as an authentication system in which the array of focusing elements is separate from the array of image icon elements and is used to read information contained in the array of image icon elements;
wherein the array of focusing elements is formed as a sheet and the array of image icon elements is formed as a sheet and the two sheets are adapted to be optically or mechanically coupled, and the focal length of the focusing elements is greater than the thickness of the sheet including the focusing elements;
wherein the array of image icon elements is positioned on or in a surface of its sheet and the focal point of the focusing elements is at or slightly off of said surface of said image icon elements sheet when the two sheets are coupled to form a synthetic optical image, the surface of the image icon elements sheet including the microstructured icon elements designed to form the synthetically magnified image;
the array of focusing elements and the array of image icon elements having a rotational symmetry and a repeat period that substantially match.

62. The synthetic optical image system of claim 61, wherein the image icon elements sheet includes multiple patterns of icon elements that form different synthetic images in cooperation with the array of focusing elements.

63. The synthetic optical image system of claim 62, wherein the different synthetic images are formed at different angles of rotation of the focusing element sheet in relation to the image icon elements sheet.

64. The synthetic optical image system of claim 62, wherein the different synthetic images are formed through use of different separate focusing element sheets, the different separate focusing element sheets having arrays of focusing elements that differ in one or more of the repeat period of the focusing element array, the focal length of the focusing elements, or their rotational symmetry.

65. The synthetic optical image system of claim 62, wherein one icon pattern has a differing repeat period or differing rotational symmetry or both from another icon element pattern.

66. The synthetic optical image system of claim 65, wherein different focusing element sheets are required to form synthetic images from the different icon element patterns.

67. The synthetic optical image system of claim 66, wherein a second focusing element sheet is placed over a first focusing element sheet to form synthetic images of two differing icon element patterns, one of the focusing element sheets having focusing elements with a different focal length than the focusing elements of the other focusing element sheet.

68. The synthetic optical image system of claim 67, wherein the first and second focusing element sheets have arrays of focusing elements that differ in one or more of the repeat period of the focusing element arrays, the focal length of the focusing elements, or their rotational symmetry.

69. The synthetic optical image system of claim 62, wherein the differing icon patterns are provided in at least two different image icon element layers.

70. The synthetic optical image system of claim 69, wherein the different image icon element layers are provided in different image icon element sheets.

71. A synthetic optical image system, comprising
an array of focusing elements, and
an image system including an array of microstructured icon elements designed to collectively form an image,
wherein the array of focusing elements and the image system cooperate to form a synthetic optical image,
wherein the system operates as an authentication system in which the array of focusing elements is separate from the array of image icon elements and is used to read information contained in the array of image icon elements;
wherein the array of focusing elements is formed as a sheet and the array of image icon elements is formed as a sheet and the two sheets are adapted to be optically or mechanically coupled, and the focal length of the focusing elements is greater than the thickness of the sheet including the focusing elements;

further including a surface coating on the image icon elements sheet.

72. A synthetic optical image system, comprising
an array of focusing elements, and
an image system including an array of microstructured icon elements designed to collectively form an image,
wherein the array of focusing elements and the image system cooperate to form a synthetic optical image and,
wherein the microstructured icon elements are either incorporated into an icon layer, or in a coating layer formed on a substrate,
further including an optical spacer between the array of focusing elements and the array of image icon elements,
wherein the thickness of the optical spacer is greater than the focal length of the focusing elements such that the synthetic optical image is not distinguishable without placing another material over the array of focusing elements, the refractive index of the another material being sufficient to change the focal length of the focusing elements to focus on the icon elements of the image system, thereby providing a synthetic optical image.

73. The synthetic optical image system of claim 72, further including different icon element layers that provide different synthetic optical images with the addition of materials having different indices of refraction.

74. The synthetic optical image system of claim 72, wherein the another material is a liquid thereby providing a wetness-indicating synthetic optical image.

75. A synthetic optical image system, comprising
an array of focusing elements, and
an image system including an array of microstructured icon elements designed to collectively form an image,
wherein the array of focusing elements and the image system cooperate to form a synthetic optical image incorporated into currency or into a security thread for currency.

76. Image icons for use in a synthetic magnification optical system, the synthetic magnification optical system including:
(a) an array of image icons; and
(b) an array of image icon focusing elements, wherein the array of image icon focusing elements is disposed in relation to the array of image icons at a distance and in a manner sufficient for the image focusing elements to form at least one synthetically magnified image of at least a portion of the image icons;
the image icons including image icons formed as recesses in a substrate, the recesses forming voids that are optionally filled with a material providing a contrast with the substrate.

77. The image icons of claim 76, wherein the image icons are filled with at least one of a material having a different refractive index than the substrate, a dyed material, a metal, or a pigmented material.

78. The image icons of claim 76, wherein the synthetic magnification optical system is incorporated in a security or authentication device.

79. The image icons of claim 78, wherein the voids are filled with a material having a different refractive index than the substrate, a dyed material, a metal, or a pigmented material.

80. The image icons of claim 76, wherein the image icons include image icons formed from patterns of colorless, transparent, opaque, ink, colored, tinted or dyed material.

81. The image icons of claim 76, wherein the image icons include image icons that are either positive or negative icons in relation to their background and are transparent, translucent, pigmented, fluorescent, phosphorescent, metallized, substantially retroreflective, or display optically variable color.

82. The image icons of claim 76, wherein the image icons include image icons that are either positive or negative icons in relation to their background and have a background that is transparent, translucent, pigmented, fluorescent, phosphorescent, metallized, substantially retroreflective, or displays optically variable color.

83. The image icons of claim 76, wherein the image icons include image icons that are either positive or negative icons in relation to their background and are formed from printing, microstructures, deposited metallization, patterned metallization, patterned demetallization, or combinations thereof.

84. The image icons of claim 76, wherein the image icons include image icons that are either positive or negative icons in relation to their background and are formed in a photographic emulsion.

85. The image icons claim 76, wherein the image icons include image icons that are either positive or negative icons in relation to their background and are formed of non-fluorescing pigments, non-fluorescing dyes, fluorescing pigments, fluorescing dyes, metal, metal particles, magnetic particles, nuclear magnetic resonance signature materials, lasing particles, organic LED materials, optically variable materials, evaporated materials, sputtered materials, chemically deposited materials, vapor deposited materials, thin film interference materials, liquid crystal polymers, optical upconversion and/or downconversion materials, dichroic materials, optically active materials, or optically polarizing materials.

86. The image icons of claim 76, wherein the image icons include image icons that are either positive or negative icons in relation to their background and are formed by direct metallization or lamination.

87. The image icons of claim 76, wherein the image icons include image icons that are either positive or negative icons in relation to their background and are formed by evaporation, sputtering or chemical deposition, or chemical vapor deposition process.

88. The image icons of claim 87, wherein the formation process involves a metal material.

89. The image icons of claim 76, wherein the image icons include image icons that are either positive or negative icons in relation to their background and are formed by patterned demetallization.

90. The image icons of claim 76, wherein the icon recesses have a recess depth of about 0.5 microns to about 8 microns.

* * * * *